United States Patent
Damnjanovic et al.

(10) Patent No.: US 10,263,737 B2
(45) Date of Patent: *Apr. 16, 2019

(54) TECHNIQUES FOR MANAGING TRANSMISSIONS OF UPLINK DATA OVER AN UNLICENSED RADIO FREQUENCY SPECTRUM BAND

(71) Applicant: QUALCOMM Incorporated, San Diego, CA (US)

(72) Inventors: Aleksandar Damnjanovic, Del Mar, CA (US); Durga Prasad Malladi, San Diego, CA (US); Wanshi Chen, San Diego, CA (US); Yongbin Wei, La Jolla, CA (US); Madhavan Srinivasan Vajapeyam, San Diego, CA (US); Tao Luo, San Diego, CA (US); Peter Gaal, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,374

(22) Filed: Sep. 19, 2017

(65) Prior Publication Data

US 2018/0006778 A1    Jan. 4, 2018

Related U.S. Application Data

(63) Continuation of application No. 14/723,765, filed on May 28, 2015, now Pat. No. 9,787,443.

(Continued)

(51) Int. Cl.
*H04L 5/00* (2006.01)
*H04L 5/14* (2006.01)
(Continued)

(52) U.S. Cl.
CPC ............ *H04L 5/0007* (2013.01); *H04J 11/00* (2013.01); *H04L 5/14* (2013.01); *H04W 56/001* (2013.01);
(Continued)

(58) Field of Classification Search
CPC .......... H04L 5/0007; H04L 5/14; H04J 11/00; H04J 2011/0096; H04W 56/001; H04W 74/08; H04W 72/042; H04W 72/0446
See application file for complete search history.

(56) References Cited

U.S. PATENT DOCUMENTS 9,491,752 B2    11/2016    Damnjanovic et al.
9,509,486 B2    11/2016    Yerramalli et al.
(Continued)

FOREIGN PATENT DOCUMENTS

EP        2696516 A2    2/2014

OTHER PUBLICATIONS

ISA/EP, International Search Report and Written Opinion of the International Searching Authority, Int'l Application No. PCT/US2015/033104, dated Oct. 29, 2015, European Patent Office, Rijswijk, NL, 17 pgs.

(Continued)

*Primary Examiner* — Habte Mered
(74) *Attorney, Agent, or Firm* — Liem T. Do

(57) ABSTRACT

Techniques are described for wireless communication. A first method may include performing a clear channel assessment (CCA) on an unlicensed radio frequency spectrum band; transmitting an indication of a time division duplexing (TDD) configuration over the unlicensed radio frequency spectrum band when the CCA is successful; and transmitting downlink data over the unlicensed radio frequency spectrum band in accordance with the TDD configuration when the CCA is successful. A second method may include performing a CCA on an unlicensed radio frequency spectrum band; dynamically determining, based at least in part on at least one grant to a user equipment (UE), and for a period following the CCA, a number of uplink subframes for communication over the unlicensed radio frequency spectrum band; and transmitting downlink data over the unlicensed radio frequency spectrum band in accordance with the timing of the number of uplink subframes when the CCA is successful.

44 Claims, 35 Drawing Sheets

Related U.S. Application Data

(60) Provisional application No. 62/005,495, filed on May 30, 2014.

(51) Int. Cl.
 *H04W 72/04* (2009.01)
 *H04J 11/00* (2006.01)
 *H04W 56/00* (2009.01)
 *H04W 74/08* (2009.01)

(52) U.S. Cl.
 CPC ..... *H04W 72/042* (2013.01); *H04W 72/0446* (2013.01); *H04J 2011/0096* (2013.01); *H04W 74/08* (2013.01)

(56) References Cited

U.S. PATENT DOCUMENTS

| | | | |
|---|---|---|---|
| 2012/0207038 | A1 | 8/2012 | Choi et al. |
| 2013/0208587 | A1 | 8/2013 | Bala et al. |
| 2013/0315114 | A1 | 11/2013 | Seo et al. |
| 2014/0003387 | A1 | 1/2014 | Lee et al. |
| 2014/0086112 | A1 | 3/2014 | Stern-Berkowitz et al. |
| 2014/0112289 | A1 | 4/2014 | Kim et al. |
| 2014/0161002 | A1 | 6/2014 | Gauvreau et al. |
| 2014/0204854 | A1 | 7/2014 | Freda et al. |
| 2015/0245246 | A1 | 8/2015 | Golitschek |
| 2015/0312793 | A1 | 10/2015 | Jeon et al. |
| 2015/0349931 | A1 | 12/2015 | Damnjanovic |
| 2016/0255507 | A1 | 9/2016 | Cao et al. |
| 2016/0337869 | A1 | 11/2016 | Dai et al. |
| 2017/0005775 | A1 | 1/2017 | Cheng et al. |

OTHER PUBLICATIONS

ISA/EPO, Partial International Search Report of the International Searching Authority, Int'l. App. No. PCT/US2015/033104, dated Aug. 17, 2015, European Patent Office, Rijswijk, NL, 7 pgs.

Ratasuk et al., "License-Exempt LTE Deployment in Heterogeneous Network," IEEE International Symposium on Wireless Communication Systems (ISWCS), Aug. 28, 2012, 5 pgs., XP032263759, DOI: 10.1109/ISWCS. 2012.6328367, ISBN: 978-1-4673-0762-8/12, Institute of Electrical and Electronics Engineers.

| TDD Configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

FIG. 6

TECHNIQUES FOR MANAGING TRANSMISSIONS OF UPLINK DATA OVER AN UNLICENSED RADIO FREQUENCY SPECTRUM BAND

CROSS REFERENCES

The present Application for Patent is a Continuation of U.S. patent application Ser. No. 14/723,765 by Damnjanovic et al., entitled "Techniques for Managing Transmission of Uplink Data Over an Unlicensed Radio Frequency Spectrum Band," filed May 28, 2015, which claims priority to U.S. Provisional Patent Application No. 62/005,495 by Damnjanovic et al., entitled "Techniques For Managing Transmissions of Uplink Data Over an Unlicensed Radio Frequency Spectrum Band," filed May 30, 2014, assigned to the assignee hereof, and expressly incorporated by reference herein.

FIELD OF THE DISCLOSURE

The present disclosure, for example, relates to wireless communication systems, and more particularly to techniques for managing transmissions of uplink data over an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from the base station to the UE) and uplink channels (e.g., for transmissions from the UEs to the base station).

Some modes of communication may enable communications with a UE over different radio frequency spectrum bands (e.g., a licensed radio frequency spectrum band or an unlicensed radio frequency spectrum band) of a cellular network. With increasing data traffic in cellular networks that use a licensed radio frequency spectrum band, offloading of at least some data traffic to an unlicensed radio frequency spectrum band may provide a cellular operator with opportunities for enhanced data transmission capacity. Prior to gaining access to, and communicating over, the unlicensed radio frequency spectrum band, a transmitting apparatus may, in some examples, perform a listen before talk (LBT) procedure to contend for access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

In some cases, transmissions by one or more nodes over an unlicensed radio frequency spectrum band (e.g., Wi-Fi nodes or nodes of other operators) may prevent a base station or UE from gaining access to the unlicensed radio frequency spectrum, resulting in the base station or UE being "starved" of use of the unlicensed radio frequency spectrum band. In some cases, this starvation problem may be mitigated by using an LBT protocol configured for load based equipment (LBT-LBE) instead of an LBT protocol configured for frame based equipment (LBT-FBE). In an LBT-LBE protocol, an extended CCA (ECCA) including a plurality of N CCAs may be performed. An ECCA performed in conjunction with an LBT-LBE protocol may provide a base station or UE a better chance to gain access to an unlicensed radio frequency spectrum band (e.g., compared to a single CCA performed in conjunction with an LBT-FBE protocol).

SUMMARY

The present disclosure, for example, relates to one or more techniques for managing transmissions of uplink data over an unlicensed radio frequency spectrum band. When a base station, eNB, or UE uses an LBT-LBE protocol to contend for access to an unlicensed radio frequency spectrum band, there may be uncertainty regarding if and when the UE will be able to transmit uplink data over the unlicensed radio frequency spectrum band. The techniques disclosed herein enable a base station, eNB, or UE to better manage when a UE will transmit uplink data. The techniques are applicable, in some examples, to a secondary serving cell and UE that communicate over an unlicensed radio frequency spectrum band in a carrier aggregation mode.

In a first set of illustrative examples, another method of wireless communication is described. In one configuration, the method may include receiving, at a user equipment (UE), an indication of a time division duplexing (TDD) configuration over an unlicensed radio frequency spectrum band, wherein the indication of the TDD configuration comprises at least one of: an indication of a consecutive number of downlink subframes, an indication of a consecutive number of uplink subframes, or a grant associated with an unlicensed radio frequency spectrum band; performing a clear channel assessment (CCA) on the unlicensed radio frequency spectrum band at a beginning of an uplink period in accordance with the TDD configuration; and transmitting uplink data from the UE over the unlicensed radio frequency spectrum band in accordance with the TDD configuration when the CCA is successful.

In some examples of the method, the TDD configuration may include a semi-static TDD configuration selected from a plurality of semi-static TDD configurations. In these examples, the indication of the TDD configuration may include an index associated with the semi-static TDD configuration.

In some examples, the method may include transitioning from a first TDD configuration to a second TDD configuration during a frame. In these examples, the indication of the TDD configuration may indicate both the first TDD configuration and the second TDD configuration for the frame.

In some examples of the method, the indication of the TDD configuration may be received over the unlicensed radio frequency spectrum band in a first downlink subframe of a frame. In some examples, the method may include periodically synchronizing a transmission timing of the UE with a timing of an eNB configured to operate on the unlicensed radio frequency spectrum band. In some examples, the CCA may include an ECCA.

In some examples, the method may include transmitting a preamble over the unlicensed radio frequency spectrum band when the CCA is successful. The preamble may indicate a start of an uplink subframe according to the TDD configuration.

In some examples, the UE may be a first UE. In these examples, the method may include aligning a first pseudo-random number generator for the first UE with a second pseudo-random generator for a second UE such that the ECCA performed by the first UE is synchronized with an ECCA performed by the second UE at the beginning of the uplink period.

In some examples, the at least one grant may include an uplink grant indicating a subframe for an uplink transmission; and wherein the successful CCA indicates that subframes following the CCA and prior to the subframe indicated by the grant are downlink subframes.

In some examples, the method may include dynamically determining, based at least in part on the at least one grant, a timing of a number of uplink subframes in a frame for a communication over the unlicensed radio frequency spectrum band; wherein performing the CCA comprises performing a CCA on the unlicensed radio frequency spectrum band at a beginning of an uplink period including the number of uplink subframes; and wherein transmitting uplink data from the UE over the unlicensed radio frequency spectrum band in accordance with at least one of the number of uplink subframes when the CCA is successful.

In some examples of the method, a first portion of a plurality of subframes in the frame may be semi-statically configured for downlink use and a remaining portion of the plurality of subframes in the frame may be dynamically configured for uplink or downlink use based at least in part on the at least one grant. In some examples of the method, the at least one grant may include an uplink grant, a downlink grant, or both. In some examples, the method may include periodically synchronizing a transmission timing of the UE with a timing of an eNB configured to operate on the unlicensed radio frequency spectrum band. In some examples of the method, the CCA may include an ECCA.

In some examples of the method, the at least one grant may include an uplink grant for a first uplink subframe. In these examples, when the CCA is not successful until after a start of the first uplink subframe, the method may include associating the uplink grant with a second uplink subframe.

In some examples of the method, the at least one grant may include an uplink grant for a first uplink subframe. In these examples, when the CCA is not successful until after a start of the first uplink subframe, the method may include allowing the uplink grant to expire.

In some examples, the method may include transmitting a preamble over the unlicensed radio frequency spectrum band when the CCA is successful. The preamble may indicate a start of an uplink subframe according to the timing of the number of uplink subframes.

In some examples of the method, the UE may be a first UE. In these examples, the method may include aligning a first pseudo-random number generator for the first UE with a second pseudo-random generator for a second UE such that the ECCA performed by the first UE is synchronized with an ECCA performed by the second UE at the beginning of the uplink period.

In a second set of illustrative examples, another apparatus for wireless communication is described. In one configuration, the apparatus may include means for receiving, at a UE, an indication of a TDD configuration over an unlicensed radio frequency spectrum band, wherein the indication of the TDD configuration comprises at least one of: an indication of a consecutive number of downlink subframes, an indication of a consecutive number of uplink subframes, or a grant associated with an unlicensed radio frequency spectrum band; means for performing a CCA on the unlicensed radio frequency spectrum band at a beginning of an uplink period in accordance with the TDD configuration; and means for transmitting uplink data from the UE over the unlicensed radio frequency spectrum band in accordance with the TDD configuration when the CCA is successful. In some examples, the apparatus may further include means for implementing one or more aspects of the method for wireless communication described above with respect to the fifth set of illustrative examples.

In a third set of illustrative examples, another apparatus for wireless communication is described. In one configuration, the apparatus may include a processor, memory in electronic communication with the processor, and instructions stored in the memory. The instructions may be executable by the processor to receive, at a UE, an indication of a TDD configuration over an unlicensed radio frequency spectrum band, wherein the indication of the TDD configuration comprises at least one of: an indication of a consecutive number of downlink subframes, an indication of a consecutive number of uplink subframes, or a grant associated with an unlicensed radio frequency spectrum band; perform a CCA on the unlicensed radio frequency spectrum band at a beginning of an uplink period in accordance with the TDD configuration; and transmit uplink data from the UE over the unlicensed radio frequency spectrum band in accordance with the TDD configuration when the CCA is successful. In some examples, the instructions may also be executable by the processor to implement one or more aspects of the method for wireless communication described above with respect to the fifth set of illustrative examples.

In a fourth set of illustrative examples, another computer program product for communication by a wireless communication apparatus in a wireless communication system is described. The computer program product may include a non-transitory computer-readable medium storing instructions executable by a processor to cause the wireless communication apparatus to receive, at a UE, an indication of a TDD configuration over an unlicensed radio frequency spectrum band, wherein the indication of the TDD configuration comprises at least one of: an indication of a consecutive number of downlink subframes, an indication of a consecutive number of uplink subframes, or a grant associated with an unlicensed radio frequency spectrum band; perform a CCA on the unlicensed radio frequency spectrum band at a beginning of an uplink period in accordance with the TDD configuration; and transmit uplink data from the UE over the unlicensed radio frequency spectrum band in accordance with the TDD configuration when the CCA is successful. In some examples, the instructions may also be executable by the processor to cause the wireless communication apparatus to implement one or more aspects of the method for wireless communication described above with respect to the fifth set of illustrative examples.

In a fifth set of illustrative examples, a method of wireless communication is described. In one configuration, the method may include performing a CCA on an unlicensed radio frequency spectrum band; transmitting, for a period following the CCA, an indication of a time division duplexing (TDD) configuration over the unlicensed radio frequency spectrum band when the CCA is successful; and transmitting downlink data over the unlicensed radio frequency spectrum band in accordance with the TDD configuration when the CCA is successful.

In some examples, the indication of the TDD configuration is at least one of an indication of a consecutive number of downlink subframes and a consecutive number of uplink subframes that follow the CCA or at least one grant to a user equipment.

In some examples, the method may include selecting the TDD configuration from a plurality of predetermined semi-static TDD configurations. In these examples, transmitting the indication of the TDD configuration may include transmitting an index associated with the selected TDD configuration.

In some examples, the method may include transitioning from a first TDD configuration to a second TDD configuration during a frame associated with the CCA. In these examples, the indication of the TDD configuration may indicate both the first TDD configuration and the second TDD configuration In some examples of the method, the indication of the TDD configuration may be transmitted over the unlicensed radio frequency spectrum band in a first downlink subframe of a frame associated with the CCA. In some examples of the method, the indication of the TDD configuration may include an indication of a consecutive number of downlink subframes and a consecutive number of uplink subframes that follow the CCA. In some examples of the method, the CCA may include an extended CCA (ECCA).

In some examples, the method may include receiving a preamble from a UE. The preamble may indicate a start of an uplink subframe according to the TDD configuration.

In some examples, the method may include periodically synchronizing a transmission timing of at least one eNB configured to operate on the unlicensed radio frequency spectrum band with a timing of at least one UE configured to operate on the unlicensed radio frequency spectrum band. In some examples, the synchronizing may occur at one or more of: an OFDM symbol boundary, a slot boundary, or a subframe boundary.

In some examples, the at least one grant may include an uplink grant indicating a subframe for an uplink transmission; and wherein the successful CCA indicates that subframes following the CCA and prior to the subframe indicated by the grant are downlink subframes.

In some examples, the method may include dynamically determining, based at least in part on at least one grant to a UE, and for a period following the CCA, a timing of a number of uplink subframes for communication over the unlicensed radio frequency spectrum band; and wherein transmitting downlink data over the unlicensed radio frequency spectrum band in accordance with the timing of the number of uplink subframes when the CCA is successful.

In some examples of the method, a first portion of a plurality of subframes in the period following the CCA may be semi-statically configured for downlink use and a remaining portion of the plurality of subframes in the period following the CCA may be dynamically configured for uplink or downlink use based at least in part on the at least one grant. In some examples of the method, the at least one grant may include an uplink grant, a downlink grant, or both.

In some examples, the method may include receiving a preamble from a UE. The preamble may indicate a start of an uplink subframe during the period following the CCA. In some examples of the method, the CCA may include an ECCA.

In some examples, the method may include periodically synchronizing a timing of at least one eNB configured to operate on the unlicensed radio frequency spectrum band with a timing of at least one UE configured to operate on the unlicensed radio frequency spectrum band. In some examples, the synchronizing may occur at one or more of: an OFDM symbol boundary, a slot boundary, or a subframe boundary.

In a sixth set of illustrative examples, an apparatus for wireless communication is described. In one configuration, the apparatus may include means for performing a CCA on an unlicensed radio frequency spectrum band; means for transmitting an indication of a TDD configuration over the unlicensed radio frequency spectrum band when the CCA is successful; and means for transmitting downlink data over the unlicensed radio frequency spectrum band in accordance with the TDD configuration when the CCA is successful. In some examples, the apparatus may further include means for implementing one or more aspects of the method for wireless communication described above with respect to the first set of illustrative examples.

In a seventh set of illustrative examples, another apparatus for wireless communication is described. In one configuration, the apparatus may include a processor, memory in electronic communication with the processor, and instructions stored in the memory. The instructions may be executable by the processor to perform a CCA on an unlicensed radio frequency spectrum band; transmit an indication of a TDD configuration over the unlicensed radio frequency spectrum band when the CCA is successful; and transmit downlink data over the unlicensed radio frequency spectrum band in accordance with the TDD configuration when the CCA is successful. In some examples, the instructions may also be executable by the processor to implement one or more aspects of the method for wireless communication described above with respect to the first set of illustrative examples.

In an eighth set of illustrative examples, a computer program product for communication by a wireless communication apparatus in a wireless communication system is described. The computer program product may include a non-transitory computer-readable medium storing instructions executable by a processor to cause the wireless communication apparatus to perform a CCA on an unlicensed radio frequency spectrum band; transmit an indication of a TDD configuration over the unlicensed radio frequency spectrum band when the CCA is successful; and transmit downlink data over the unlicensed radio frequency spectrum band in accordance with the TDD configuration when the CCA is successful. In some examples, the instructions may also be executable by the processor to cause the wireless communication apparatus to implement one or more aspects of the method for wireless communication described above with respect to the first set of illustrative examples.

In a ninth set of illustrative examples, another method of wireless communication is described. In one example the method may include receiving, at a first base station for a period following a clear channel assessment (CCA), an indication of a time division duplexing (TDD) configuration, from a second base station, over an unlicensed radio frequency spectrum band, wherein the indication of the TDD configuration is at least one of an indication of a consecutive number of downlink subframes and a consecutive number of uplink subframes that follow the CCA or at least one grant associated with an unlicensed radio frequency spectrum band, and refraining from accessing the unlicensed radio frequency spectrum band during a transmission of the uplink subframes. Refraining from accessing the unlicensed radio frequency spectrum may include refraining from performing a CCA based at least in part on the TDD configuration.

In some examples, the method may include decoding the at least one or more grants, and dynamically determining, based at least in part on the at least one grant, a timing of a number of uplink subframes in a frame for communication over the unlicensed radio frequency spectrum band. In some examples, the at least one grant may include an uplink grant, a downlink grant, or both.

In a tenth set of illustrative examples, another apparatus for wireless communication is described. In one configuration, the apparatus may include means for receiving, at a first base station, an indication of a time division duplexing (TDD) configuration, from a second base station, over an unlicensed radio frequency spectrum band, wherein the indication of the TDD configuration is at least one of an indication of a consecutive number of downlink subframes and a consecutive number of uplink subframes that follow the CCA or at least one grant associated with an unlicensed radio frequency spectrum band, and means for refraining from accessing the unlicensed radio frequency spectrum band during a transmission of the uplink subframes.

In an eleventh set of illustrative examples, another apparatus for wireless communication is described. In one configuration, the apparatus may include a processor, memory in electronic communication with the processor, and instructions stored in the memory. The instructions may be executable by the processor to receive, at a first base station, an indication of a time division duplexing (TDD) configuration, from a second base station, over an unlicensed radio frequency spectrum band, wherein the indication of the TDD configuration is at least one of an indication of a consecutive number of downlink subframes and a consecutive number of uplink subframes that follow the CCA or at least one grant associated with an unlicensed radio frequency spectrum band, and to refrain from accessing the unlicensed radio frequency spectrum band during a transmission of the uplink subframes.

In an twelfth set of illustrative examples, another computer program product for communication by a wireless communication apparatus in a wireless communication system is described. The computer program product may include a non-transitory computer-readable medium storing instructions executable by a processor to cause the wireless communication apparatus to receive, at a first base station, an indication of a time division duplexing (TDD) configuration, from a second base station, over an unlicensed radio frequency spectrum band, wherein the indication of the TDD configuration is at least one of an indication of a consecutive number of downlink subframes and a consecutive number of uplink subframes that follow the CCA or at least one grant associated with an unlicensed radio frequency spectrum band, and to refrain from accessing the unlicensed radio frequency spectrum band during a transmission of the uplink subframes.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 6 shows seven TDD configurations that may be used for LTE/LTE-A communications in an LBT radio frame transmitted over an unlicensed radio frequency spectrum band, in accordance with various aspects of the present disclosure;

DETAILED DESCRIPTION

Figure 1:
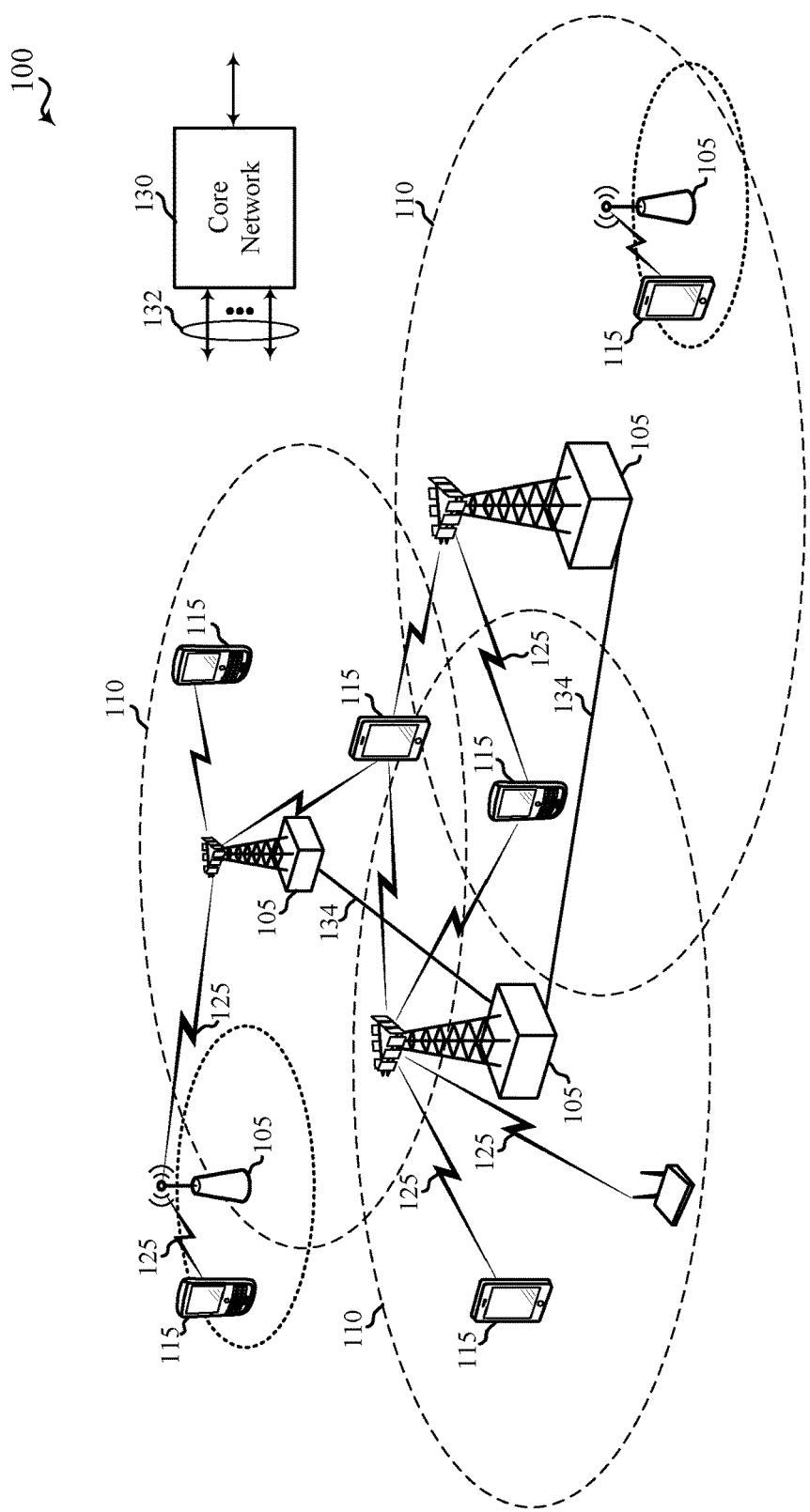
FIG. 1 shows a block diagram of a wireless communication system, in accordance with various aspects of the present disclosure.

Techniques are described in which transmissions of uplink data over an unlicensed radio frequency spectrum band are managed. In some examples, the unlicensed radio frequency spectrum band may be used for cellular communications (e.g., Long Term Evolution (LTE) communications or LTE-Advanced (LTE-A) communications). In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band).

With increasing data traffic in cellular networks that use a licensed radio frequency spectrum band, offloading of at least some data traffic to an unlicensed radio frequency spectrum band may provide a cellular operator (e.g., an operator of a public land mobile network (PLMN) or a coordinated set of base stations defining a cellular network, such as an LTE/LTE-A network) with opportunities for enhanced data transmission capacity. Prior to gaining access to, and communicating over, the unlicensed radio frequency spectrum band, a transmitting apparatus may, in some examples, perform an LBT procedure to gain access to the unlicensed radio frequency spectrum band. Such an LBT procedure may include performing a CCA (e.g., an ECCA) to determine whether a channel of the unlicensed radio frequency spectrum band is available. When it is determined that a channel is not available, a CCA (or ECCA) may be performed for the channel again at a later time.

When a base station, eNB, or UE uses an LBT-LBE protocol to contend for access to an unlicensed radio frequency spectrum band, there may be uncertainty regarding if and when the UE will be able to transmit uplink data over the unlicensed radio frequency spectrum band. The techniques disclosed herein enable a base station, eNB, or UE to better manage when a UE will transmit uplink data. The techniques are applicable, in some examples, to a secondary serving cell and UE that communicate over an unlicensed radio frequency spectrum band in a carrier aggregation mode.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more eNBs), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, or pico base stations). The base stations 105 may also utilize different radio technologies, such as cellular or WLAN radio access technologies. The base stations 105 may be associated with the same or different access networks or operator deployments (e.g., collectively referred to herein as "operators"). The coverage areas of different base stations 105, including the coverage areas of the same or different types of base stations 105, utilizing the same or different radio technologies, or belonging to the same or different access networks, may overlap.

In some examples, the wireless communication system 100 may include an LTE/LTE-A communication system (or network), which LTE/LTE-A communication system may support one or more modes of operation or deployment in a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., an unlicensed radio frequency spectrum band such as an unlicensed radio frequency spectrum band for which apparatuses may need to contend for access because the radio frequency spectrum band is available for unlicensed use, such as Wi-Fi use, or a licensed radio frequency spectrum band for which apparatuses may need to contend for access because the radio frequency spectrum band is available for use by two or more operators on a contention basis). In other examples, the wireless communication system 100 may support wireless communication using one or more access technologies different from LTE/LTE-A. In LTE/LTE-A communication systems, the term evolved NodeB or eNB may be, for example, used to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, or other type of cell. Small cells such as pico cells, femto cells, or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) or via backhaul 132 (e.g., through core network 130). The wireless communication system 100 may support synchronous or asynchronous operation. For synchronous operation, the eNBs may have similar frame or gating timing, and transmissions from different eNBs may be approximately aligned in time. For asynchronous operation, the eNBs may have different frame or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over the first radio frequency spectrum band or the second (e.g., unlicensed) radio frequency spectrum band, and a set of component carriers used in a particular mode of communication may all be received (e.g., at a UE 115) over the first radio frequency spectrum band, all be received (e.g., at a UE 115) over the second (e.g., unlicensed) radio frequency spectrum band, or be received (e.g., at a UE 115) over a combination of the first radio frequency spectrum band and the second (e.g., unlicensed) radio frequency spectrum band.

The communication links 125 shown in wireless communication system 100 may include uplink channels (using component carriers) for carrying uplink (UL) communications (e.g., transmissions from a UE 115 to a base station 105) or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications or uplink communications may be made using the first radio frequency spectrum band, the second (e.g., unlicensed) radio frequency spectrum band, or both.

In some examples of the wireless communication system 100, LTE/LTE-A may be deployed under different scenarios using the second (e.g., unlicensed) radio frequency spectrum band. The deployment scenarios may include a supplemental downlink mode in which LTE/LTE-A downlink communications in the first radio frequency spectrum band may be offloaded to the second (e.g., unlicensed) radio frequency spectrum band, a carrier aggregation mode in which both LTE/LTE-A downlink and uplink communications may be offloaded from the first radio frequency spectrum band to the second (e.g., unlicensed) radio frequency spectrum band, or a standalone mode in which LTE/LTE-A downlink and uplink communications between a base station 105 and a UE 115 may take place in the second (e.g., unlicensed) radio frequency spectrum band. Base stations 105 as well as UEs 115 may in some examples support one or more of these or similar modes of operation. OFDMA waveforms may be used in the communication links 125 for LTE/LTE-A downlink communications in the first radio frequency spectrum band or the second (e.g., unlicensed) radio frequency spectrum band, while OFDMA, SC-FDMA or resource block interleaved FDMA waveforms may be used in the communication links 125 for LTE/LTE-A uplink communications in the first radio frequency spectrum band or the second (e.g., unlicensed) radio frequency spectrum band.

Figure 2:
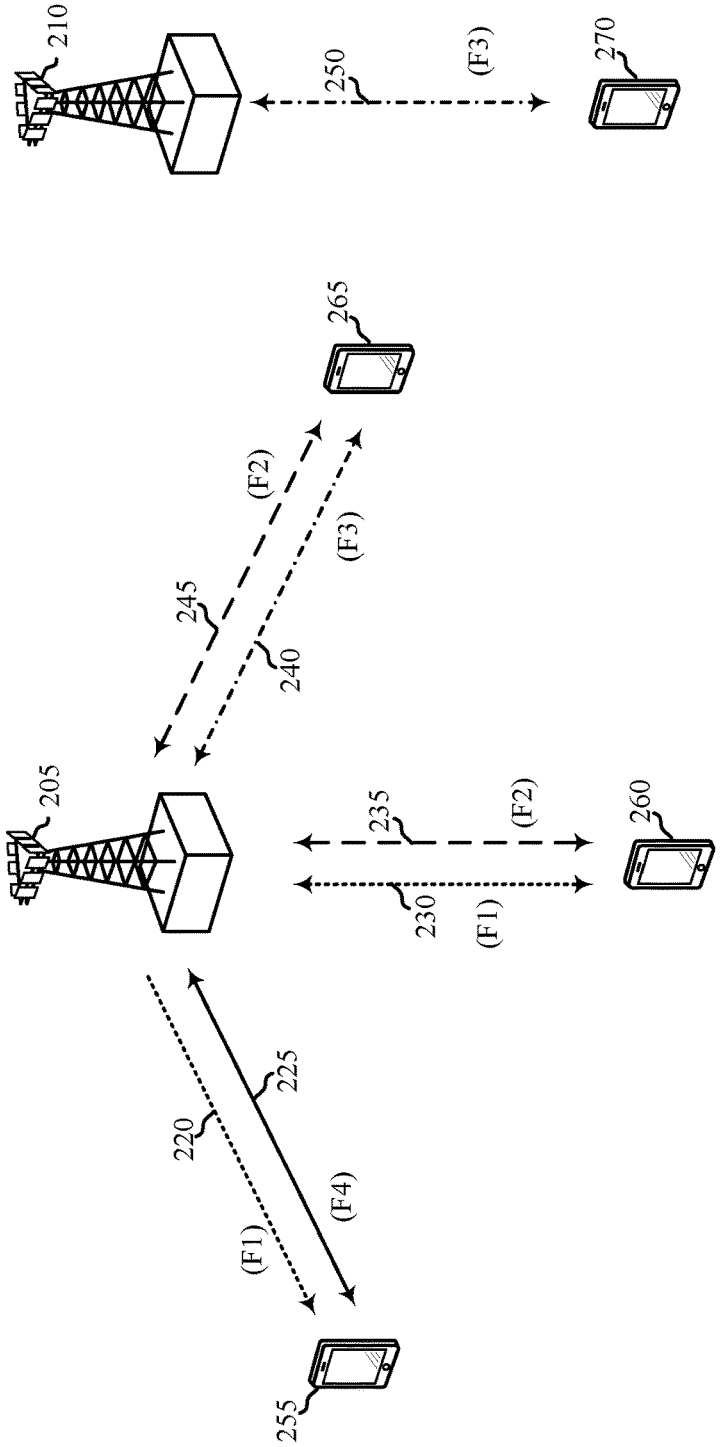
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 210 may be examples of aspects of one or more of the base stations 105 described with reference to FIG. 1, while a first UE 255, a second UE 260, a third UE 265, and a fourth UE 270 may be examples of aspects of one or more of the UEs 115 described with reference to FIG. 1.

In the example of a supplemental downlink mode in the wireless communication system 200, the first base station 205 may transmit OFDMA waveforms to the first UE 255 using a downlink channel 220. The downlink channel 220 may be associated with a frequency F1 in an unlicensed radio frequency spectrum band. The first base station 205 may transmit OFDMA waveforms to the first UE 255 using a first bidirectional link 225 and may receive SC-FDMA waveforms from the first UE 255 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., a mobile network operator (MNO)) that uses a licensed radio frequency spectrum and needs to relieve some of the traffic or signaling congestion.

In one example of a carrier aggregation mode in the wireless communication system 200, the first base station 205 may transmit OFDMA waveforms to the second UE 260 using a second bidirectional link 230 and may receive OFDMA waveforms, SC-FDMA waveforms, or resource block interleaved FDMA waveforms from the second UE 260 using the second bidirectional link 230. The second bidirectional link 230 may be associated with the frequency F1 in the unlicensed radio frequency spectrum band. The first base station 205 may also transmit OFDMA waveforms to the second UE 260 using a third bidirectional link 235 and may receive SC-FDMA waveforms from the second UE 260 using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic or signaling congestion.

In another example of a carrier aggregation mode in the wireless communication system 200, the first base station 205 may transmit OFDMA waveforms to the third UE 265 using a fourth bidirectional link 240 and may receive OFDMA waveforms, SC-FDMA waveforms, or resource block interleaved waveforms from the third UE 265 using the fourth bidirectional link 240. The fourth bidirectional link 240 may be associated with a frequency F3 in the unlicensed radio frequency spectrum band. The first base station 205 may also transmit OFDMA waveforms to the third UE 265 using a fifth bidirectional link 245 and may receive SC-FDMA waveforms from the third UE 265 using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and unlicensed access radio frequency spectrum for capacity offload.

As described above, one type of service provider that may benefit from the capacity offload offered by using LTE/LTE-A in unlicensed access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using unlicensed access radio frequency spectrum may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 210 may transmit OFDMA waveforms to the fourth UE 270 using a bidirectional link 250 and may receive OFDMA waveforms, SC-FDMA waveforms, or resource block interleaved FDMA waveforms from the fourth UE 270 using the bidirectional link 250. The bidirectional link 250 may be associated with the frequency F3 in the unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105, 205, or 210 described with reference to FIG. 1 or 2, or one of the UEs 115, 255, 260, 265, or 270 described with reference to FIG. 1 or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based at least in part on the LBT protocol specified in European Telecommunications Standards Institute (ETSI) (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting device whether a channel of an unlicensed radio frequency spectrum band is available or in use for the gating interval (also referred to as an LBT radio frame or a CCA frame). When a CCA indicates that the channel is available (e.g., "clear" for use) for a corresponding LBT radio frame, the transmitting apparatus may reserve or use the channel of the unlicensed radio frequency spectrum band during part or all of the LBT radio frame. When the CCA indicates that the channel is not available (e.g., that the channel is in use or reserved by another apparatus), the transmitting apparatus may be prevented from using the channel during the LBT radio frame.

In some cases, it may be useful for a transmitting apparatus to generate a gating interval on a periodic basis and synchronize at least one boundary of the gating interval with at least one boundary of a periodic interval. For example, it may be useful to generate a periodic gating interval for a cellular downlink in an unlicensed radio frequency spectrum band, and to synchronize at least one boundary of the periodic gating interval with at least one boundary of a periodic interval (e.g., a periodic LTE/LTE-A radio interval) associated with the cellular downlink. Examples of such synchronization are shown in FIG. 3.

Figure 3:
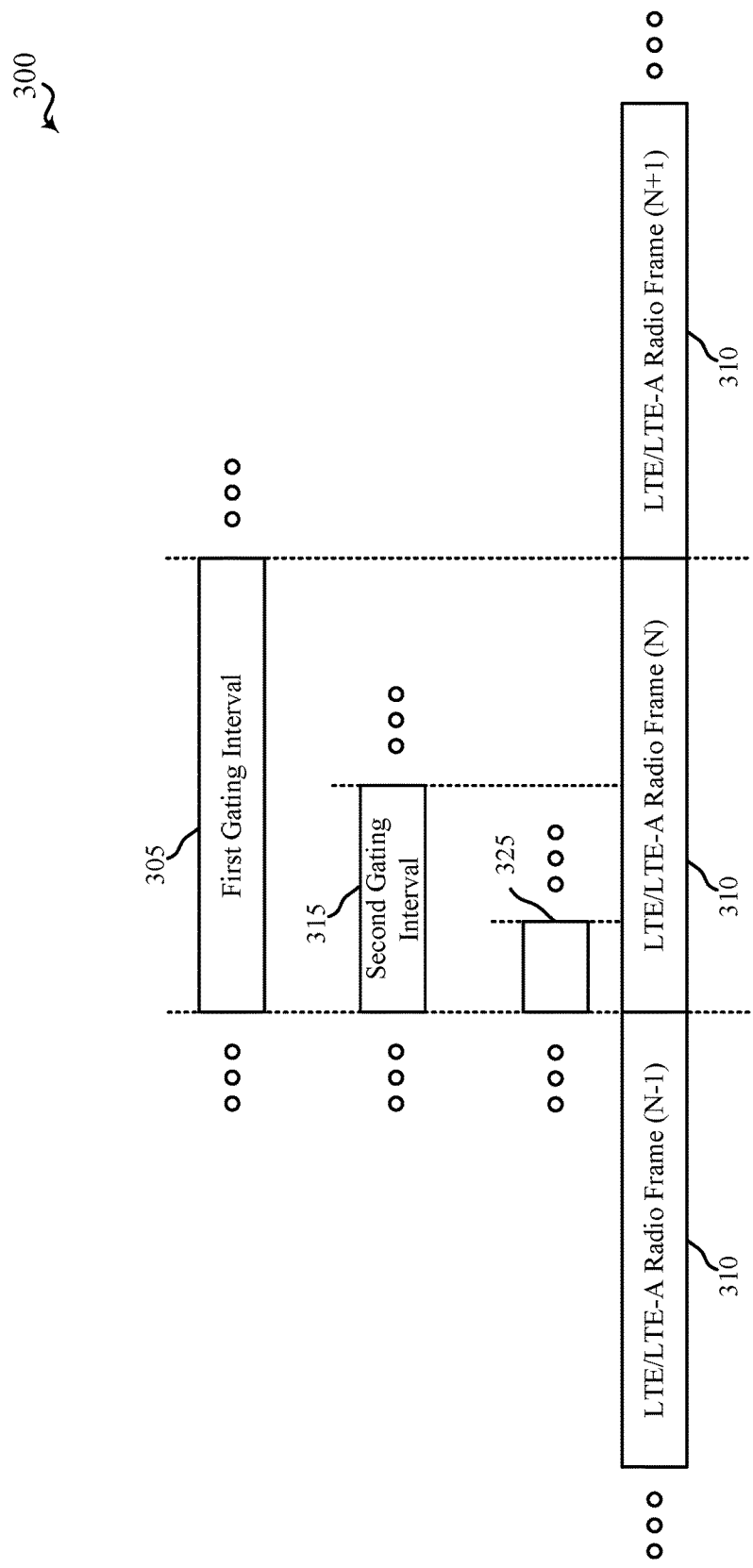
FIG. 3 shows examples of a gating interval (or LBT radio frame) for a cellular downlink in an unlicensed radio frequency spectrum band, in accordance with various aspects of the present disclosure.

FIG. 3 shows examples 300 of a gating interval (or LBT radio frame) for a cellular downlink in an unlicensed radio frequency spectrum band, in accordance with various aspects of the present disclosure. A first gating interval 305, a second gating interval 315, or a third gating interval 325 may be used as a periodic gating interval by an eNB or UE that supports transmissions over the unlicensed radio frequency spectrum band. Examples of such an eNB may include the base stations 105, 205, or 210 described with reference to FIG. 1 or 2, and examples of such a UE may include the UEs 115, 255, 260, 265, or 270 described with reference to FIG. 1 or 2. The first gating interval 305, the second gating interval 315, or the third gating interval 325 may in some examples be used with the wireless communication system 100 or 200 described with reference to FIG. 1 or 2.

By way of example, the duration of the first gating interval 305 is shown to be equal to (or approximately equal to) a duration of an LTE/LTE-A radio frame 310 of a periodic interval associated with a cellular downlink. In some examples, "approximately equal" means the duration of the first gating interval 305 is within a cyclic prefix (CP) duration of the duration of the periodic interval.

At least one boundary of the first gating interval 305 may be synchronized with at least one boundary of the periodic interval that includes the LTE/LTE-A radio frames N−1 to N+1. In some cases, the first gating interval 305 may have boundaries that are aligned with the frame boundaries of the periodic interval. In other cases, the first gating interval 305 may have boundaries that are synchronized with, but offset from, the frame boundaries of the periodic interval. For example, the boundaries of the first gating interval 305 may be aligned with subframe boundaries of the periodic interval, or with subframe midpoint boundaries (e.g., the midpoints of particular subframes) of the periodic interval.

In some cases, the periodic interval may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 315 and the third gating interval 325 are shown to be sub-multiples of (or approximate sub-multiples of) the duration of the periodic interval associated with the cellular downlink. In some examples, an "approximate sub-multiple of" means the duration of the second gating interval 315 or the third gating interval 325 is within a cyclic prefix (CP) duration of the duration of a sub-multiple of (e.g., half or one-fifth) the periodic interval. For example, the second gating interval 315 may have a duration of five milliseconds and the third gating interval 325 may have a duration of two milliseconds. The second gating interval 315 or the third gating interval 325 may be advantageous over the first gating interval 305 because its shorter duration may facilitate more frequent sharing of an unlicensed radio frequency spectrum band.

Figure 4:
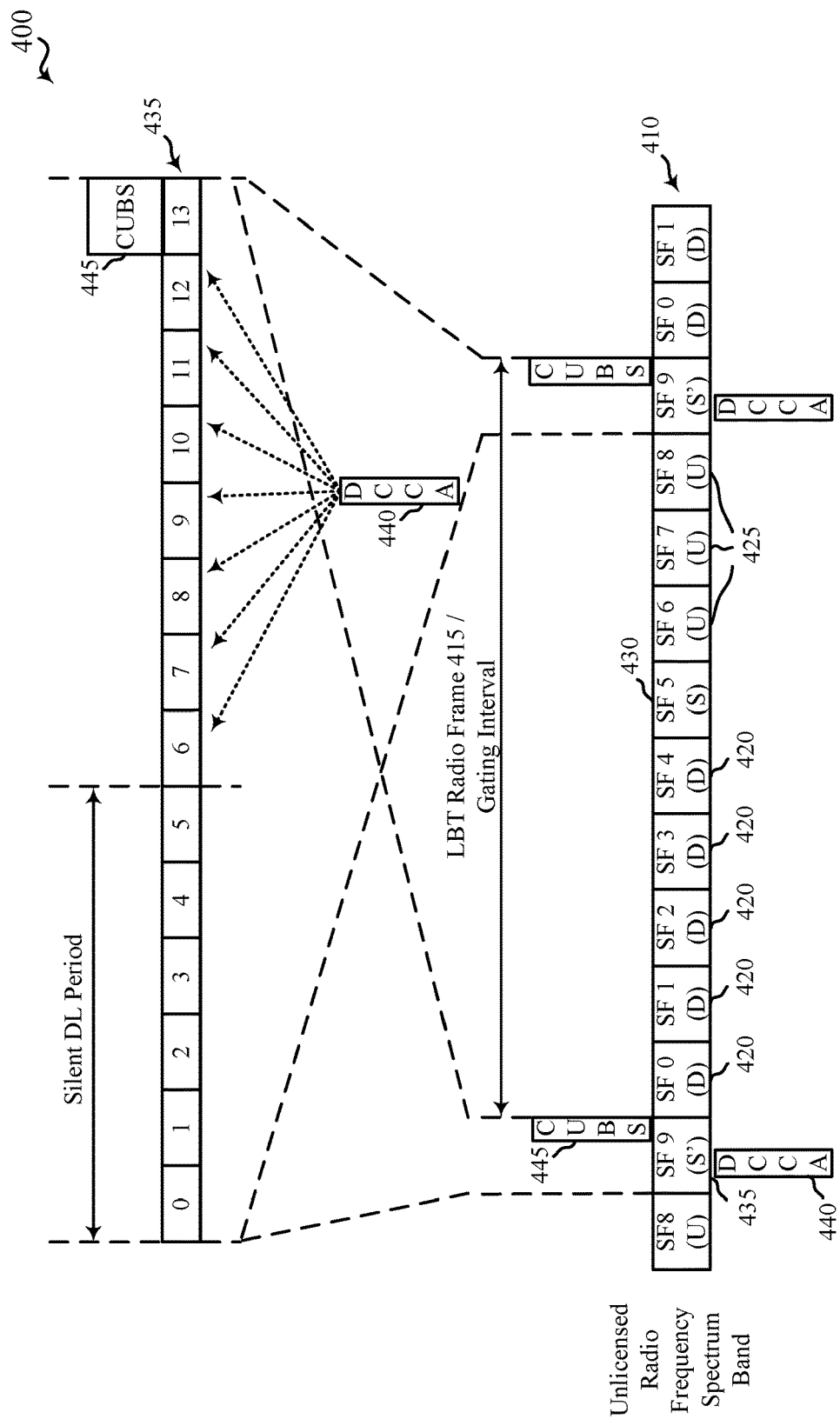
FIG. 4 shows an example of a wireless communication over an unlicensed radio frequency spectrum band, in accordance with various aspects of the present disclosure.

FIG. 4 shows an example 400 of a wireless communication 410 over an unlicensed radio frequency spectrum band, in accordance with various aspects of the present disclosure. An LBT radio frame 415, which may correspond to a gating interval such as the first gating interval 305 described with reference to FIG. 3, may have a duration of ten milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 535 may provide a transition between uplink subframes 425 and downlink subframes 420. During the S' subframe 435, a downlink clear channel assessment (DCCA) procedure 440 may be performed by one or more base stations, such as one or more of the base stations 105, 205, or 210 described with reference to FIG. 1 or 2, to reserve, for a period of time, the channel over which the wireless communication 410 occurs. Following a successful DCCA 440 by a base station, the base station may transmit a channel usage beacon signal (CUBS) 445 to provide an indication to other base stations or apparatuses (e.g., UEs, Wi-Fi access points, etc.) that the base station has reserved the channel. In some examples, a CUBS 445 may be transmitted using a plurality of interleaved resource blocks. Transmitting a CUBS 445 in this manner may enable the CUBS 445 to occupy at least a certain percentage of the available frequency bandwidth in the unlicensed radio frequency spectrum band and satisfy one or more regulatory requirements (e.g., a requirement that the CUBS 445 occupy at least 80% of the available frequency bandwidth). The CUBS 445 may in some examples take a form similar to that of an LTE/LTE-A cell-specific reference signal (CRS) or channel state information reference signal (CSI-RS). When the DCCA 440 fails, the CUBS 445 is not transmitted.

The S' subframe 435 may include 14 OFDM symbols, numbered 0 through 13 in FIG. 4. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for the DCCA 440. In the example 400, the S' subframe 435 includes seven DCCA slots, included in symbols 6 through 12. Use of the DCCA slots by different network operators may be coordinated to provide more efficient system operation. In some examples, in order to determine which of the seven possible DCCA slots to use to perform a DCCA 440, a base station 105 may evaluate a mapping-function of the form:

$$F_D(GroupID, t) \in \{1,2,3,4,5,6,7\}$$

where GroupID is a "deployment group-id" assigned to the base station 105, and t is the LBT radio frame number corresponding to a gating interval or frame for which the DCCA 440 is performed.

Figure 5:
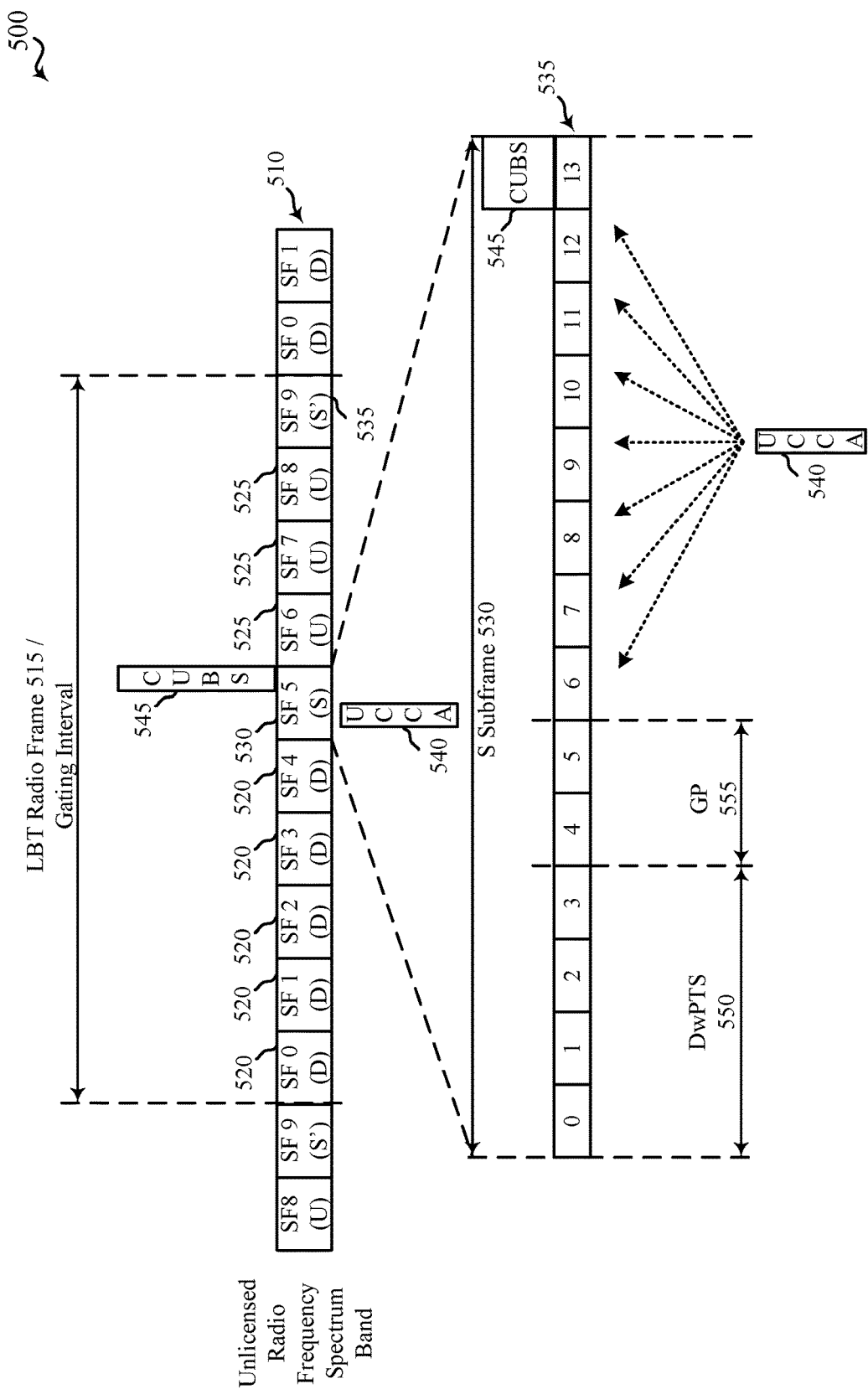
FIG. 5 shows an example of a wireless communication over an unlicensed radio frequency spectrum band, in accordance with various aspects of the present disclosure.

FIG. 5 shows an example 500 of a wireless communication 510 over an unlicensed radio frequency spectrum band, in accordance with various aspects of the present disclosure. An LBT radio frame 515, which may correspond to a gating interval such as the first gating interval 305 described with reference to FIG. 3 or the LBT radio frame 415 described with reference to FIG. 4, may have a duration of ten milliseconds and include a number of downlink subframes 520, a number of uplink subframes 525, and two types of special subframes (e.g., an S subframe 530 and an S' subframe 535. The S subframe 530 may provide a transition between downlink subframes 520 and uplink subframes 525, while the S' subframe 535 may provide a transition between uplink subframes 525 and downlink subframes 520. During the S subframe 530, an uplink CCA (UCCA) procedure 540 may be performed by one or more UEs, such as one or more of the UEs 115, 255, 260, 265, or 270 described above with reference to FIG. 1 or 2, to reserve, for a period of time, the channel over which the wireless communication 510 occurs. Following a successful UCCA 540 by a UE, the UE may transmit a CUBS 545 to provide an indication to other UEs or apparatuses (e.g., base stations, Wi-Fi access points, etc.) that the UE has reserved the channel. In some examples, a CUBS 545 may be transmitted using a plurality of interleaved resource blocks. Transmitting a CUBS 545 in this manner may enable the CUBS 545 to occupy at least a certain percentage of the available frequency bandwidth in the unlicensed radio frequency spectrum band and satisfy one or more regulatory requirements (e.g., a requirement that the CUBS 545 occupy at least 80% of the available frequency bandwidth). The CUBS 545 may in some examples take a form similar to that of an LTE/LTE-A cell-specific reference signal (CRS) or channel state information reference signal (CSI-RS). When the UCCA 540 fails, the CUBS 545 is not transmitted.

The S subframe 530 may include 14 OFDM symbols, numbered 0 through 13 in FIG. 5. A first portion of the S subframe 530, symbols 0 through 3 in this example, may be used as a downlink pilot time slot (DwPTS) 550, and a second portion of the S subframe 530 may be used as a guard period (GP) 555. A third portion of the S subframe 530 may be used for UCCA 540. In the example 500, the S subframe 530 includes seven UCCA slots, included in symbols 6 through 12. Use of the UCCA slots by different UEs may be coordinated to provide more efficient system operation. In some examples, in order to determine which of the seven possible UCCA slots to use to perform a UCCA 540, a UE may evaluate a mapping-function of the form:

$$F_U(GroupID, t) \in \{1,2,3,4,5,6,7\}$$

where GroupID is a "deployment group-id" assigned to the UE, and t is the LBT radio frame number corresponding to a frame for which a UCCA 540 is performed.

The mapping function for a DCCA 440 or a UCCA 540 may be constructed based at least in part on different criteria, depending on whether the mapping function will have an orthogonalization or a non-orthogonalization property. In examples with orthogonal LBT access, the mapping function may have an orthogonalization property according to:

$F_{D/U}(x, t) \neq F_{D/U}(y, t)$

GroupID x, y$\in\{1,2,3,4,5,6,7\}$ for all time t, whenever x≠y represent different group-ids. In this case, base stations or UEs with different group-ids may perform CCAs (e.g., DCCAs 440 or UCCAs 540) during non-overlapping CCA slots. In the absence of interference, the base station or UE with the group-id which maps to an earlier CCA slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier CCA slot (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, leading to enhanced system throughput. Base stations or UEs of different deployments may be assigned different group-ids, so that with orthogonal CCA slot mapping, access to the channel is mutually exclusive.

In examples with non-orthogonal, or overlapping, CCA slot access, the mapping function may allow more than seven group ids. In some situations, for example, it may be useful to support more than seven deployment group-ids, in which case it is not possible to maintain the orthogonality property of CCA slot mapping functions. In such cases, it may be desirable to reduce the frequency of collision between any two group-ids. In some examples, non-orthogonal CCA slot mapping sequences may also be used to provide fair channel access among deployments without tight coordination on LBT opportunities. One example of a non-orthogonal CCA slot mapping sequence is given by:

$F_{D/U}(x, t) = R_{1,7}(x, t)$

GroupID x=$\in\{1, 2, \ldots 2^{16}\}$ where $R_{1,7}(x,t)$ is a pseudo-random number generator between 1 and 7 chosen independently for GroupID x. In this case, there could be potential collisions between base stations or UEs of different GroupID's in the same LBT radio frame t.

Thus, CCA slots may be selected according to the noted mapping functions and used for a DCCA 440 or a UCCA 540.

In each of FIGS. 4 and 5, the period between successful performance of a DCCA 440 and the start of a transmission period for which the DCCA 440 was performed (see, e.g., FIG. 4), or the period between successful performance of a UCCA 540 and the start of a transmission period for which the UCCA 540 was performed (see, e.g., FIG. 5), may be referred to as a preamble. Because of variability in when a DCCA 440 or UCCA 540 is performed, the length of a preamble may vary. However, in each of the examples shown in FIGS. 4 and 5, the preamble ends following transmission of the CUBS 445 (see, e.g., FIG. 4) or the CUBS 545 (see, e.g., FIG. 5).

FIG. 6 shows seven TDD configurations 605 that may be used for LTE/LTE-A communications in an LBT radio frame transmitted over an unlicensed radio frequency spectrum band, in accordance with various aspects of the present disclosure. In some examples, the TDD configurations 605 may be used in conjunction with the LBT radio frame 415 or 515 described with reference to FIG. 4 or 5. Each of the TDD configurations 605 has one of two DL-to-UL switch-point periodicities 610—a five ms switch-point periodicity or a ten ms switch-point periodicity. More particularly, the TDD configurations numbered 0, 1, 2, and 6 have a five ms switch-point periodicity (i.e., a half-frame switch-point periodicity, and the TDD configurations numbered 3, 4, and 5 have a ten ms switch-point periodicity. The TDD configurations having a five ms switch-point periodicity provide a number of DL subframes, a number of UL subframes, and two S subframes per radio frame. The TDD configurations having a ten ms switch-point periodicity provide a number of DL subframes, a number of UL subframes, and one S subframe per radio frame.

Figure 7:
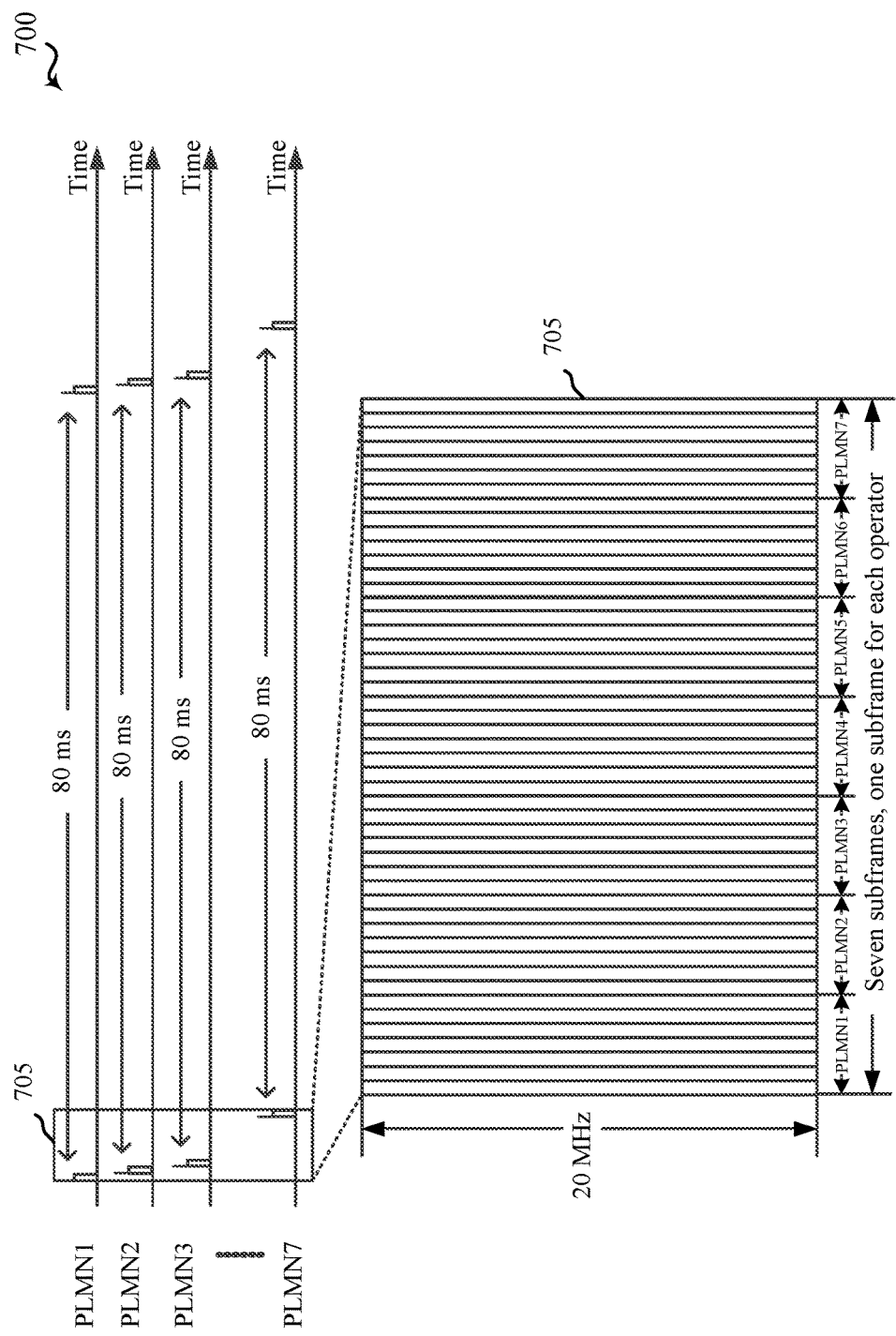
FIG. 7 shows an example of resource allocations for CCA-Exempt Transmissions (CETs) of synchronous operators in an unlicensed radio frequency spectrum band, in accordance with various aspects of the present disclosure.

FIG. 7 shows an example 700 of resource allocations for CCA-Exempt Transmissions (CETs) of synchronous operators in an unlicensed radio frequency spectrum band, in accordance with various aspects of the present disclosure. A CET may be made without a need to perform a CCA (e.g., a DCCA or an uplink CCA (UCCA)) to first gain access to the unlicensed radio frequency spectrum band. Instead, an operator is exempted from performing a CCA for the purpose of transmitting a CET.

As shown, an allocation of resources 705 for CETs may be made, for example, once every eighty milliseconds (80 ms) or once every CET period, where the CET period may have a configurable periodicity. Each of a number of operators in the unlicensed spectrum (e.g., different PLMNs) may be provided a separate subframe (shown) or subframes (not shown) for transmitting CETs. By way of example, FIG. 7 shows adjacent CET subframes for seven different operators (e.g., operators PLMN1, PLMN2, . . . , PLMN7). Such a CET transmission framework may be applicable to a downlink or uplink between a base station and a UE.

Under most conditions, the use of an LBT-FBE protocol by a transmitting apparatus, as described above, provides sufficient access to an unlicensed radio frequency spectrum band. The use of an LBT-FBE protocol can be advantageous in that enables frequency reuse 1 among base stations or eNBs associated with the same operator. However, under some scenarios, one or more Wi-Fi nodes may prevent an LTE/LTE-A node from accessing a channel of the unlicensed radio frequency spectrum band. In these scenarios, use of an LBT-LBE protocol may be advantageous over an LBT-FBE protocol (despite the fact that use of an LBT-LBE protocol may prevent frequency reuse 1 under some conditions), in that a transmitting apparatus may persistently attempt to access the unlicensed radio frequency spectrum band when employing an LBT-LBE protocol. For example, the transmitting apparatus may attempt to access the medium for a random duration of N CCAs, but for a maximum duration controlled by the parameter q. A smaller value of q implies a shorter maximum extended CCA duration and shorter radio frame length.

A transmitting apparatus capable of using an LBT-FBE protocol under most conditions, and an LBT-LBE protocol when necessary, may be useful in some wireless communication systems. Such a transmitting apparatus may use a same or similar LBT radio interval when using either the LBT-FBE protocol or the LBT-LBE protocol, but may use somewhat different CCAs for the different protocols.

In some examples of an LBT-LBE protocol, a transmitting apparatus may perform a CCA and, when the CCA is successful, immediately begin transmitting over a channel of an unlicensed radio frequency spectrum band. However, when the CCA is unsuccessful, the transmitting apparatus may perform an extended CCA (ECCA) by selecting a random integer, N, between 1 and q, where q has a value of 4≤q≤32 advertised by an operator or vendor. Upon selecting a value for the random integer, N, the transmitting apparatus may wait to access the unlicensed radio frequency spectrum band for N CCAs where a channel of the unlicensed radio frequency spectrum band is found to be clear. Upon the channel of the unlicensed radio frequency spectrum band being found clear for the N CCAs, the transmitting apparatus may transmit over the unlicensed radio frequency spectrum band for at most (13/32)×q milliseconds (ms) before needing to perform another extended CCA. The (13/32)×q ms transmission time is therefore a maximum channel occupancy time (i.e., MaxChannelOccupancyTime). The value of q may in some examples be selected to accommodate a largest number of consecutive downlink subframes when two or more TDD configurations (e.g., two or more of the TDD configurations 605 described with reference to FIG. 6) are transmitted back-to-back.

Figure 8:
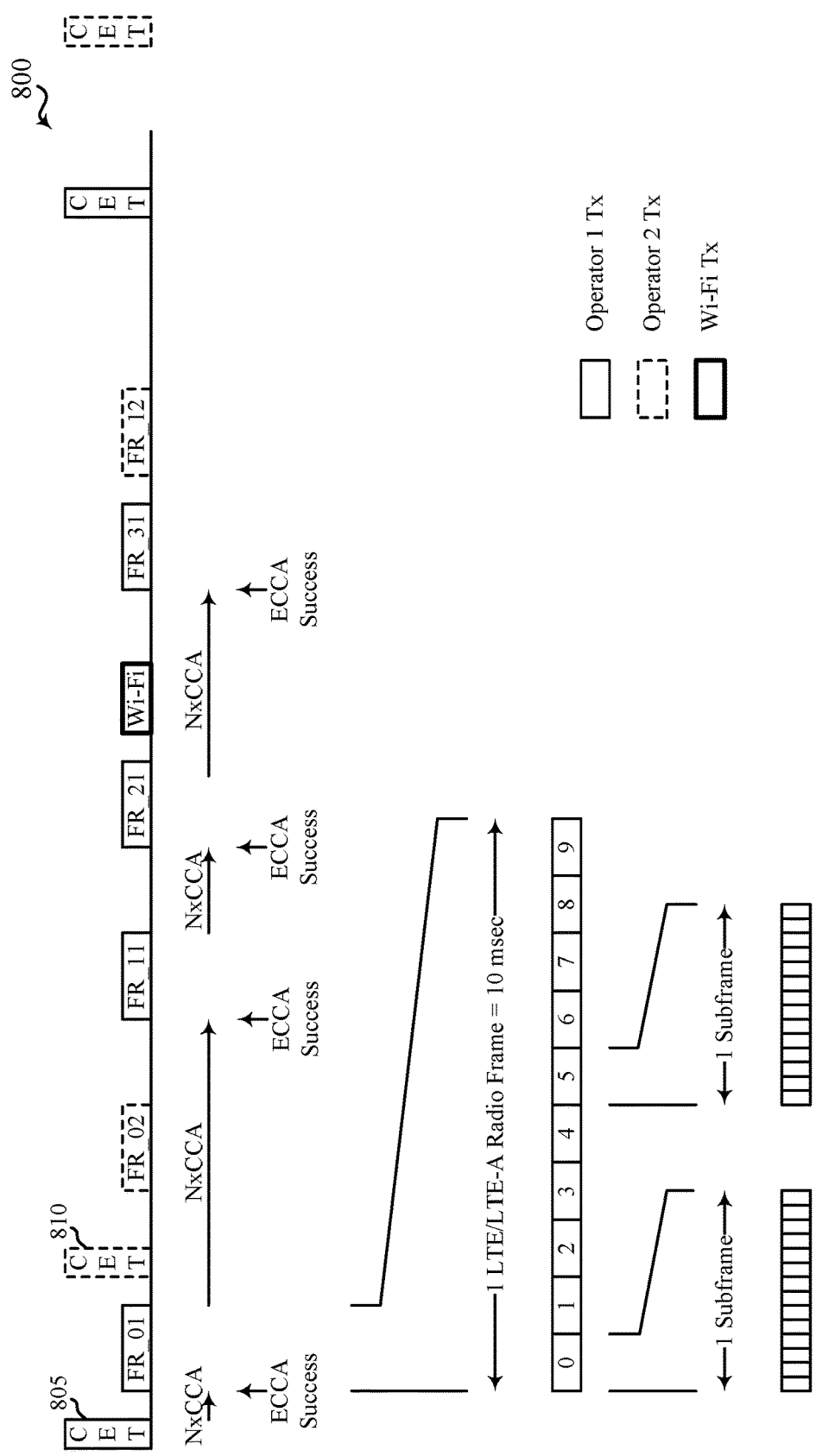
FIG. 8 shows a timing diagram of wireless communications over an unlicensed radio frequency spectrum band, in accordance with various aspects of the present disclosure.

FIG. 8 shows a timing diagram 800 of wireless communications over an unlicensed radio frequency spectrum band, in accordance with various aspects of the present disclosure. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band).

By way of example, the wireless communications shown in FIG. 8 include communications (or transmissions (Tx)) by an Operator 1, an Operator 2, and a Wi-Fi node. By way of further example, transmitters of Operator 1 and Operator 2, as well as the Wi-Fi node, may be within CCA range of each other. Operator 1 may transmit a CCA-Exempt Transmission (CET) 805 over the unlicensed radio frequency spectrum band, followed by a first number of radio frames (e.g., radio frames FR_01, FR_11, FR_21, or FR_31). Operator 2 may transmit a CET 810 over the unlicensed radio frequency spectrum band, followed by a second number of radio frames (e.g., radio frames FR_02 or FR_12). The Wi-Fi node may also transmit over the unlicensed radio frequency spectrum band (e.g., the transmission labeled Wi-Fi). When a transmitter associated with Operator 1 is transmitting over a channel of the unlicensed radio frequency spectrum band, Operator 2 and the Wi-Fi node may be prevented from accessing the channel of the unlicensed radio frequency spectrum band. When a transmitter associated with Operator 2 is transmitting over a channel of the unlicensed radio frequency spectrum band, transmitters of Operator 1 and the Wi-Fi node may be prevented from accessing the channel of the unlicensed radio frequency spectrum band. When the Wi-Fi node is transmitting over a channel of the unlicensed radio frequency spectrum band, transmitters associated with Operator 1 and Operator 2 may be prevented from accessing the channel of the unlicensed radio frequency spectrum band.

In some examples, the transmitters of Operator 1 and Operator 2 may gain access to the unlicensed radio frequency spectrum band (or a channel thereof) by performing an ECCA labeled NxCCA. Access is only gained when an ECCA is successful (labeled as ECCA Success).

In some examples, each radio frame transmitted by Operator 1 or Operator 2 may be an LTE/LTE-A radio frame having 10 subframes and a duration of 10 msec. Each subframe may include, for example, fourteen OFDM symbols. The subframes may variously include downlink subframes, uplink subframes, or special subframes (e.g., subframes used to transmit control information, synchronization signals, some data, etc.).

Figure 9:
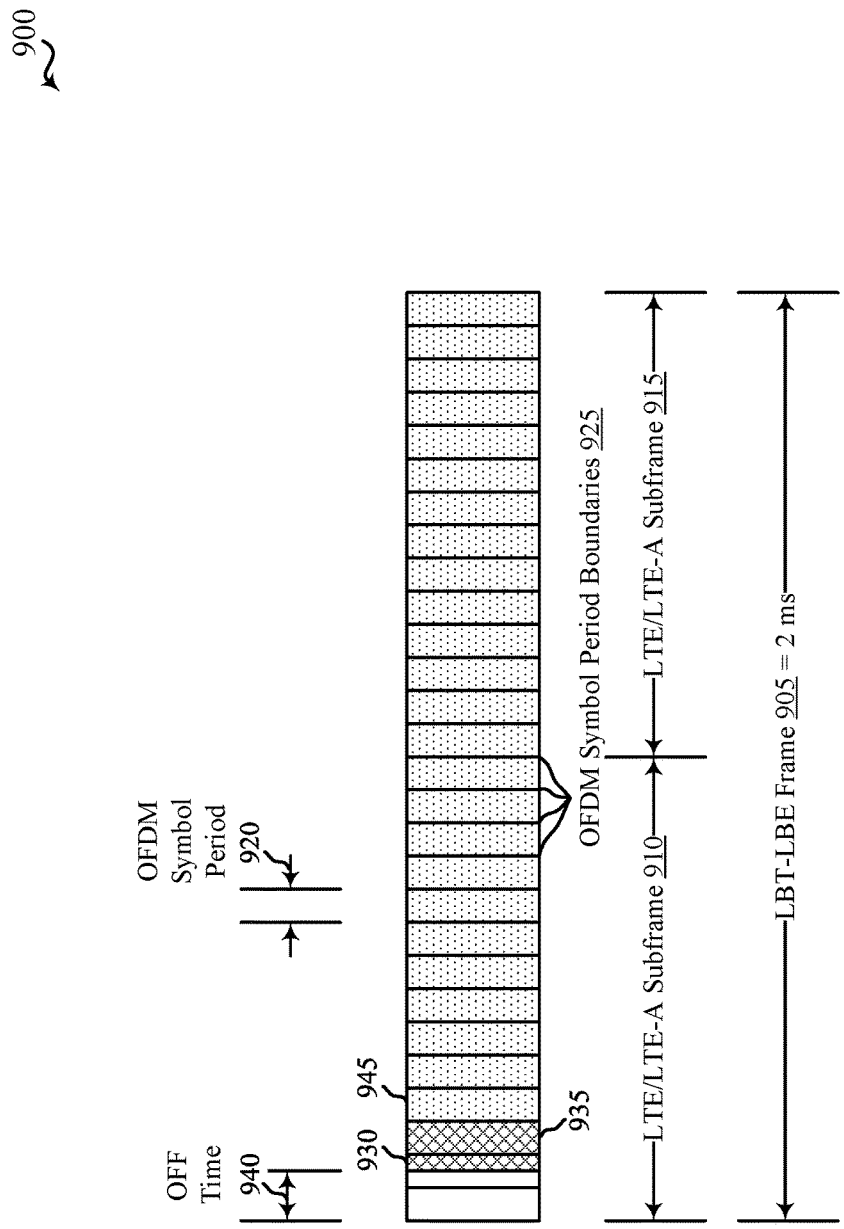
FIG. 9 shows an example of how a first signal may be transmitted while operating in an LBT-LBE mode of operation in an unlicensed radio frequency spectrum band, to align a starting point of a second signal with a reference boundary associated with the unlicensed radio frequency spectrum band, in accordance with various aspects of the present disclosure.

When operating in accordance with an LBT-LBE protocol, frame level alignment among the cells of an operator can be ensured by design. However, different cells may succeed at performing extended CCAs at different times, creating a potential for transmission frames having different starting points or ending points. FIG. 9 illustrates one technique for aligning frames of different cells.

FIG. 9 shows an example 900 of how a first signal may be transmitted while operating in an LBT-LBE mode of operation in an unlicensed radio frequency spectrum band, to align a starting point of a second signal with a reference boundary associated with the unlicensed radio frequency spectrum band, in accordance with various aspects of the present disclosure. More particularly, FIG. 9 shows an LBT-LBE radio frame 905 having a duration of 2 ms. The LBT-LBE radio frame 905 may include a first LTE/LTE-A subframe 910 and a second LTE/LTE-A subframe 915, each having a duration of 1 ms. Each of the first LTE/LTE-A subframe 910 and the second LTE/LTE-A subframe 915 may include a plurality of OFDM symbol periods 920 (e.g., 14 OFDM symbol periods) bounded by a plurality of OFDM symbol period boundaries 925.

In some examples, a base station may transmit a synchronization or alignment signal during a first part of the LBT-LBE radio frame 905 (e.g., at or near the beginning of the LBT-LBE radio frame 905). The synchronization or alignment signal may be transmitted, for example, because the timing of the start of the LBT-LBE radio frame 905 can vary based at least in part on the timing of the conclusion of a successful extended CCA (e.g., the timing of the conclusion of the successful extended CCA can vary with reference to an OFDM symbol boundary, slot boundary, or subframe boundary of an LBT-FBE interval over the unlicensed radio frequency spectrum band, with reference to the timing of a discovery signal (e.g., a CET) transmitted over the unlicensed radio frequency spectrum band, or with reference to an OFDM symbol boundary, slot boundary, or subframe boundary of a transmission over a licensed radio frequency spectrum band (e.g., an OFDM symbol boundary, slot boundary, or subframe boundary of a transmission from a primary serving cell over the licensed radio frequency spectrum band)), or because OFDM symbol level synchronization may be desirable among the downlink transmissions of a base station or eNB.

In some examples, the synchronization or alignment signal may include a variable length training sequence 930 (e.g., a fractional CUBS having a duration less than a duration of an OFDM symbol period 920) but no fixed length training sequence 935. In other examples, the synchronization or alignment signal may include a variable length training sequence 930 and at least one fixed length training sequence 935 (e.g., at least one CUBS, each spanning an OFDM symbol period). In other examples, the synchronization or alignment signal may include a fixed length training sequence 935 but no variable length training sequence 930. The variable length training sequence 930 or fixed length training sequence 935 (which may individually or collectively constitute a first signal) may in some examples be used to align a downlink transmission with a boundary 925 of an OFDM symbol period 920.

By way of example, FIG. 9 shows the first LTE/LTE-A subframe 910 starting with an OFF time 940, followed by a variable length training sequence 930, a fixed length training sequence 935, and a downlink transmission 945. In some examples, the OFF time 940 may have a duration of 100 microseconds (μsec), determined, for example, by a minimum OFF time of 100 μsec for LBT-FBE transmissions and a maximum OFF time of 100 μsec (5×20 μsec) for LBT-LBE transmissions.

Figure 10:
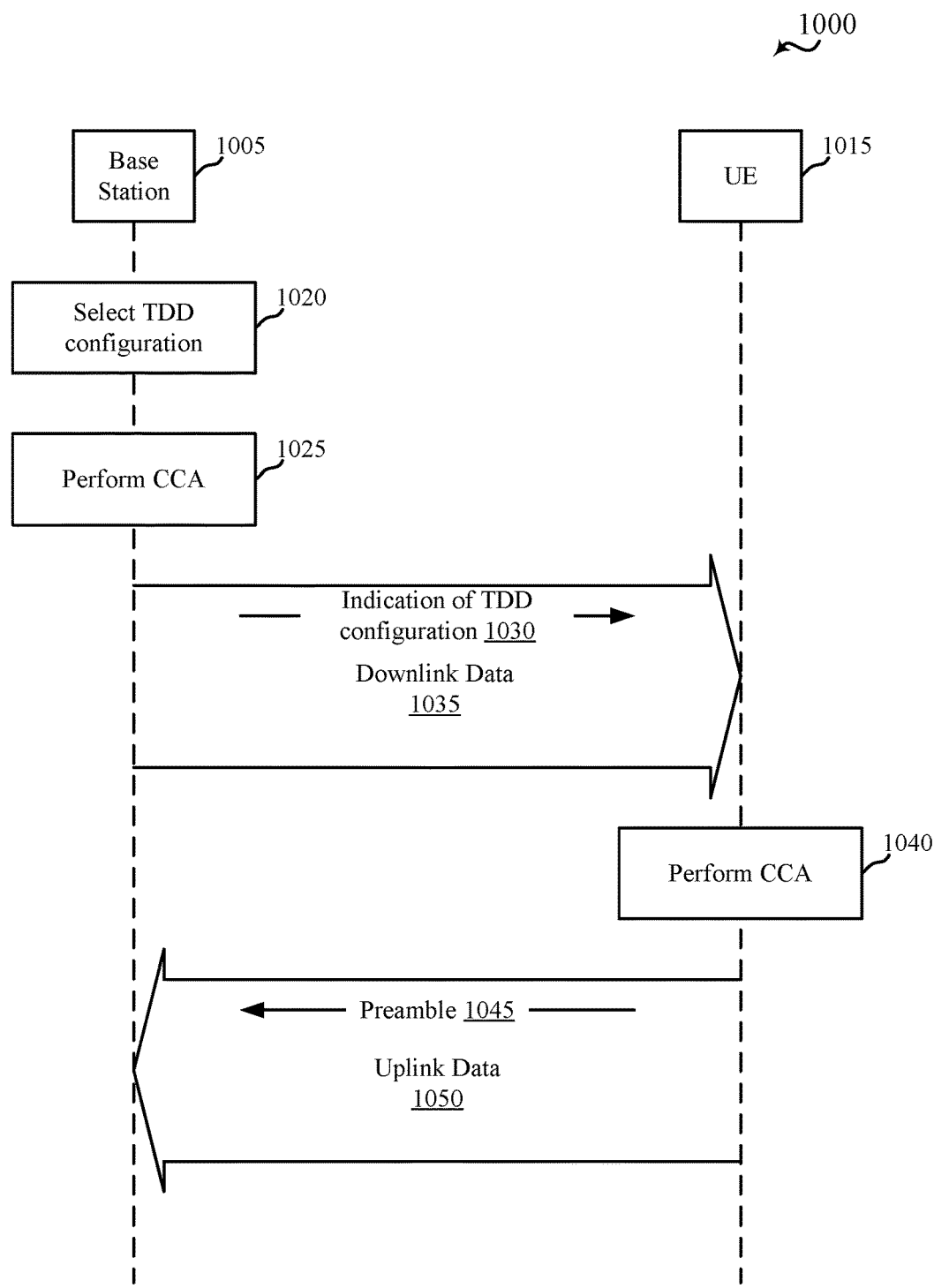
FIG. 10 shows a message flow between a base station (e.g., a base station forming part of an eNB) and a UE, in accordance with various aspects of the present disclosure.

FIG. 10 shows a message flow 1000 between a base station 1005 (e.g., a base station forming part of an eNB) and a UE 1015, in accordance with various aspects of the present disclosure. In some examples, the UE 1015 may be configured to operate in a carrier aggregation mode, and the base station 1005 may be configured to operate as a secondary serving cell for the UE 1015. In some examples, the message flow 1000 may occur over an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)).

At block 1020, a TDD configuration may be selected, by the base station 1005, from a plurality of predetermined semi-static TDD configurations (e.g., from the plurality of predetermined semi-static TDD configurations 600 described with reference to FIG. 6).

At block 1025, the base station 1005 may perform a CCA on an unlicensed radio frequency spectrum band. In some examples, the CCA may include an ECCA. In some examples, the CCA may be performed for a frame aligned with a periodic gating interval established for the unlicensed radio frequency spectrum band (e.g., one of the periodic gating intervals described with reference to FIG. 3). In other examples, the CCA may be performed for a frame that is not aligned with the periodic gating interval (e.g., a frame including a consecutive number of downlink subframes followed by a consecutive number of uplink subframes).

When the CCA performed at block 1025 is successful, the base station 1005 may transmit an indication 1030 of the TDD configuration selected at block 1020 over the unlicensed radio frequency spectrum band to the UE 1015. The indication 1030 may serve, at least in part, to advertise a timing of uplink subframes included in the TDD configuration to both the UE 1015 and other serving cell UEs (e.g., UEs for which the base station 1005 functions as serving cell) and neighboring base stations or eNBs (e.g., base stations or eNBs of different operator deployments). The advertisement of the timing of uplink subframes included in the TDD configuration may cause neighboring base stations or eNBs that receive the advertisement to refrain from accessing the unlicensed radio frequency spectrum band during a transmission of the uplink subframes.

In some examples, the indication 1030 of the TDD configuration may include an indication of a consecutive number of downlink subframes and a consecutive number of uplink subframes that follow the CCA performed at block 1025.

Also when the CCA performed at block 1025 is successful, the base station 1005 may transmit downlink data 1035 over the unlicensed radio frequency spectrum band to the UE 1015, in accordance with the TDD configuration selected at block 1020. In some examples, the indication 1030 of the TDD configuration may be transmitted as part of the downlink data 1035.

At block 1040, the UE 1015 may perform a CCA on the unlicensed radio frequency spectrum band at a beginning of an uplink period, in accordance with the indication 1030 of the TDD configuration received from the base station 1005. In some examples, the CCA may include an ECCA.

When the CCA performed at block 1040 is successful, the UE 1015 may transmit a preamble 1045 over the unlicensed radio frequency spectrum band. The preamble 1045 may indicate a start of an uplink subframe according to the TDD configuration.

Also when the CCA performed at block 1040 is successful, the UE 1015 may transmit uplink data 1050 from the UE over the unlicensed radio frequency spectrum band in accordance with the TDD configuration.

Figure 11:
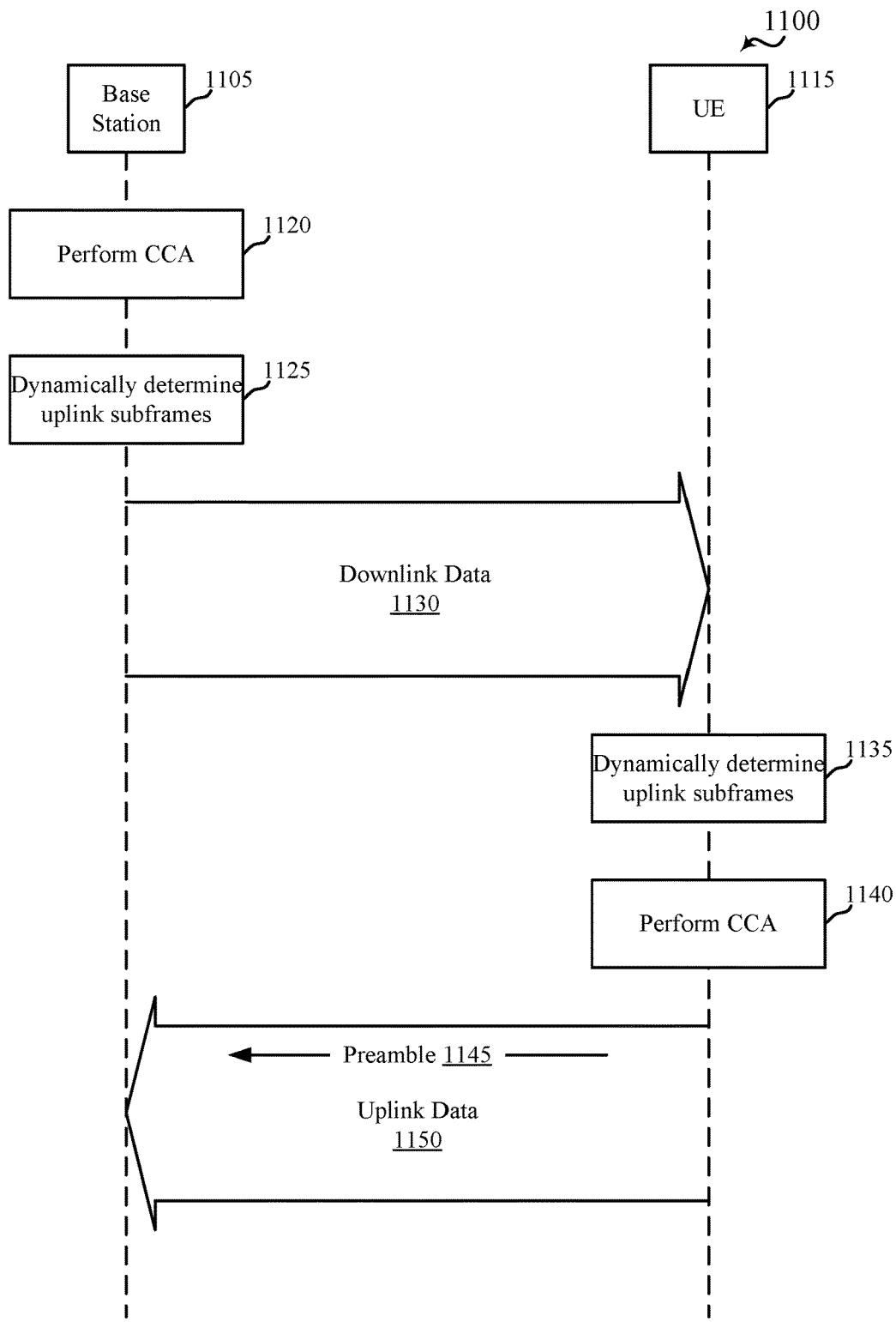
FIG. 11 shows a message flow between a base station (e.g., a base station forming part of an eNB) and a UE, in accordance with various aspects of the present disclosure.

FIG. 11 shows a message flow 1100 between a base station 1105 (e.g., a base station forming part of an eNB) and a UE 1115, in accordance with various aspects of the present disclosure. In some examples, the UE 1115 may be configured to operate in a carrier aggregation mode, and the base station 1105 may be configured to operate as a secondary serving cell for the UE 1115. In some examples, the message flow 1100 may occur over an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)).

At block 1120, the base station 1105 may perform a CCA on an unlicensed radio frequency spectrum band. In some examples, the CCA may include an ECCA.

At block 1125, the base station 1105 may dynamically determine, based at least in part on at least one grant to a UE, and for a period following the CCA, a timing of a number of uplink subframes for communication over the unlicensed radio frequency spectrum band. In some examples, the at least one grant may correspond to a frame having a plurality of subframes, in which a first portion of the plurality of subframes in the period following the CCA is semi-statically configured for downlink use and a remaining portion of the plurality of subframes in the period following the CCA is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both.

When the CCA performed at block 1120 is successful, the base station 1105 may transmit downlink data 1130 over the unlicensed radio frequency spectrum band to the UE 1115, in accordance with the timing of the number of uplink subframes determined at block 1125.

At block 1135, the UE 1115 may dynamically determine, based at least in part on the at least one grant, the timing of the number of uplink subframes for communication over the unlicensed radio frequency spectrum band.

At block 1140, the UE 1115 may perform a CCA on the unlicensed radio frequency spectrum band at a beginning of an uplink period including the number of uplink subframes. In some examples, the CCA may include an ECCA.

When the CCA performed at block 1140 is successful, the UE 1115 may transmit a preamble 1145 over the unlicensed radio frequency spectrum band. The preamble 1145 may indicate a start of an uplink subframe according to the timing of the number of uplink subframes.

Also when the CCA performed at block 1140 is successful, the UE 1115 may transmit uplink data 1150 from the UE over the unlicensed radio frequency spectrum band in accordance with at least one of the number of uplink subframes.

The message flow 1100 shown in FIG. 11 may be useful for shorter frame durations (e.g., frame durations of 2 ms or 4 ms).

Figure 12:
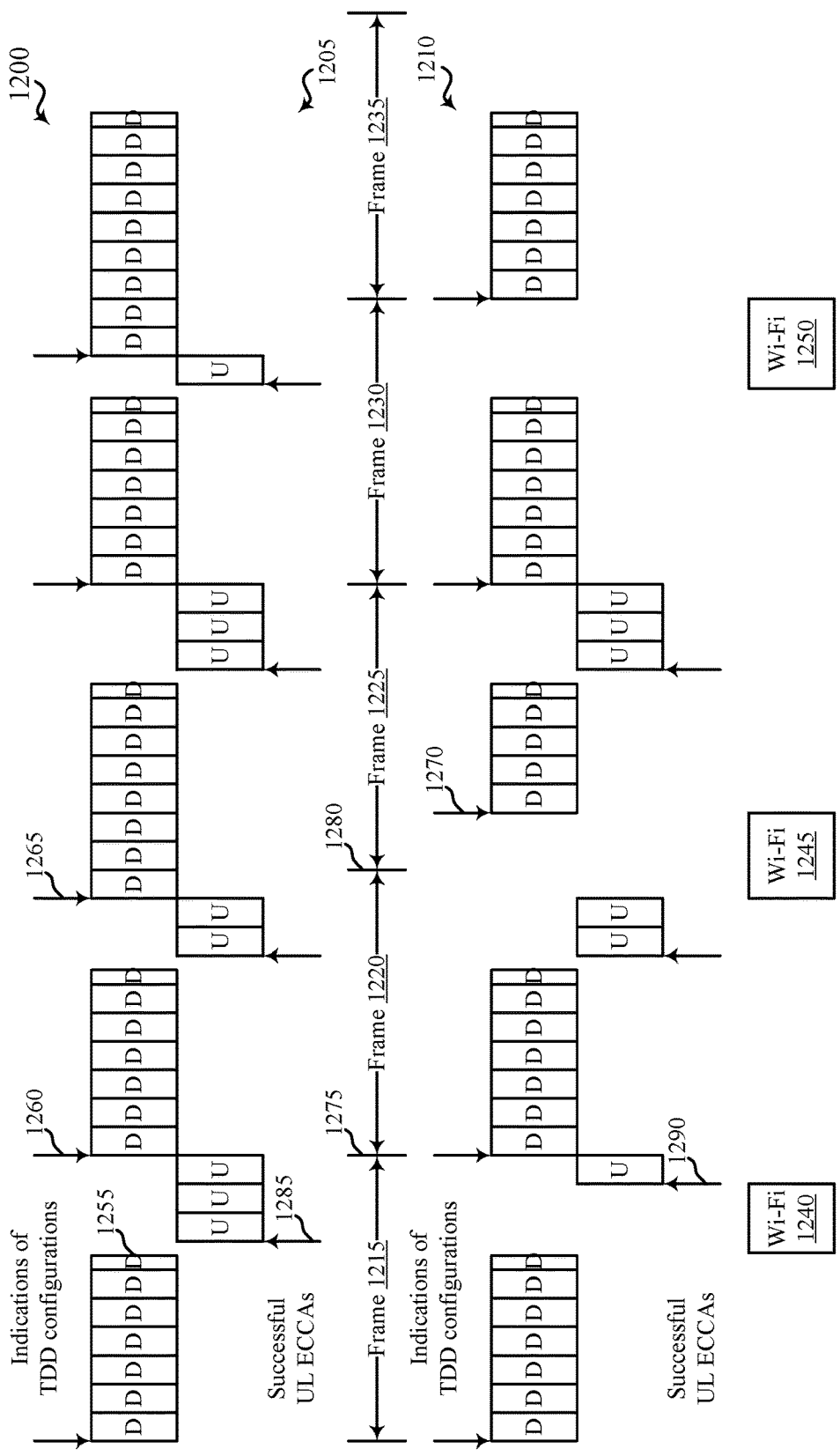
FIG. 12 shows an example of various transmissions over an unlicensed radio frequency spectrum band, in accordance with various aspects of the present disclosure.

FIG. 12 shows an example 1200 of various transmissions over an unlicensed radio frequency spectrum band, in accordance with various aspects of the present disclosure. By way of example, the transmissions include transmissions of downlink (D) subframes and uplink (U) subframes. The downlink subframes may be transmitted by a base station or eNB, such as by one of the base stations 105, 205, or 210 described with reference to FIG. 1 or 2. The uplink subframes may be transmitted by a UE, such as by one of the UEs 115, 255, 260, 265, or 270 described with reference to FIG. 1 or 2.

In some examples, a first set 1205 of the downlink subframes and the uplink subframes may be respectively transmitted by a base station or eNB operating as a secondary serving cell for a first UE operating in a carrier aggregation mode, and by the first UE. In some examples, a second set 1210 of the downlink subframes and the uplink subframes may be respectively transmitted by the base station or eNB operating as a secondary serving cell for a second UE operating in a carrier aggregation mode, and by the second UE. The downlink subframes and the uplink subframes may be transmitted across a plurality of frames 1215, 1220, 1225, 1230, or 1235. A plurality of Wi-Fi transmissions 1240, 1245, or 1250 may be transmitted by one or more Wi-Fi nodes. By way of example, the Wi-Fi transmissions 1240, 1245, or 1250 may be made within CCA range of the second UE but not the first UE. Because the Wi-Fi transmissions 1240, 1245, or 1250 are within CCA range of the second UE, the Wi-Fi transmissions 1240, 1245, or 1250 may interfere with transmissions to or from the second UE.

Prior to each consecutive number of downlink subframes, a CCA (e.g., an ECCA) may be performed for a frame including a consecutive number of downlink subframes followed by a consecutive number of uplink subframes. Some of the downlink subframes (e.g., downlink subframe 1255) may be part of special subframes that provide opportunities for UEs to perform a CCA (e.g., an ECCA). Following a successfully performed ECCA by a base station or eNB, the base station or eNB may transmit an indication of a TDD configuration (e.g., indications 1260, 1265, and 1270) over the unlicensed radio frequency spectrum band, followed by a transmission of downlink data. In some examples, an indication of a TDD configuration may include an indication of a consecutive number of downlink subframes and a consecutive number of uplink subframes that follow the successfully performed ECCA.

In some examples, an indication 1260 of a TDD configuration may be transmitted in sync with a frame boundary 1275 of a periodic gating interval (e.g., one of the periodic gating intervals described with reference to FIG. 3). In some examples, an indication 1265 of a TDD configuration may be transmitted before a frame boundary 1280 of a periodic gating interval. An indication 1265 may be transmitted before a frame boundary 1280 of a period gating interval when a number of consecutive downlink subframes includes a first number of downlink subframes occurring at the end of a first semi-static TDD configuration, and a second number of downlink subframes occurring at the beginning of a second semi-static TDD configuration. In these examples, an indication 1265 of a TDD configuration may indicate both the first TDD configuration and the second TDD configuration. In some examples, an indication 1270 of a TDD configuration may be transmitted after a frame boundary 1280 of a periodic gating interval. An indication 1270 may be transmitted after a frame boundary 1280 of a periodic gating interval, for example, because of interference created by other nodes (e.g., because of the Wi-Fi transmission 1245), which prevents a base station or eNB from successfully contending for access to the unlicensed radio frequency spectrum band.

Prior to each consecutive number of uplink subframes, a CCA (e.g., a UL ECCA) may be performed by the first UE or the second UE. For some frames, a UL ECCA performed by each of the first UE and the second UE may succeed at or about the same time, and each of the first UE and the second UE may transmit the same number of uplink subframes for the frame. For other frames, a UL ECCA 1285 performed by the first UE may succeed at a different time than a UL ECCA 1290 performed by the second UE, and the first UE and the second UE may transmit different numbers of uplink subframes for the frame. In some examples, interference caused by another node may prevent a UE from transmitting any uplink subframes during a frame (e.g., the Wi-Fi transmission 1250 prevents the second UE from transmitting any uplink subframes for the frame 1230).

Figure 13:
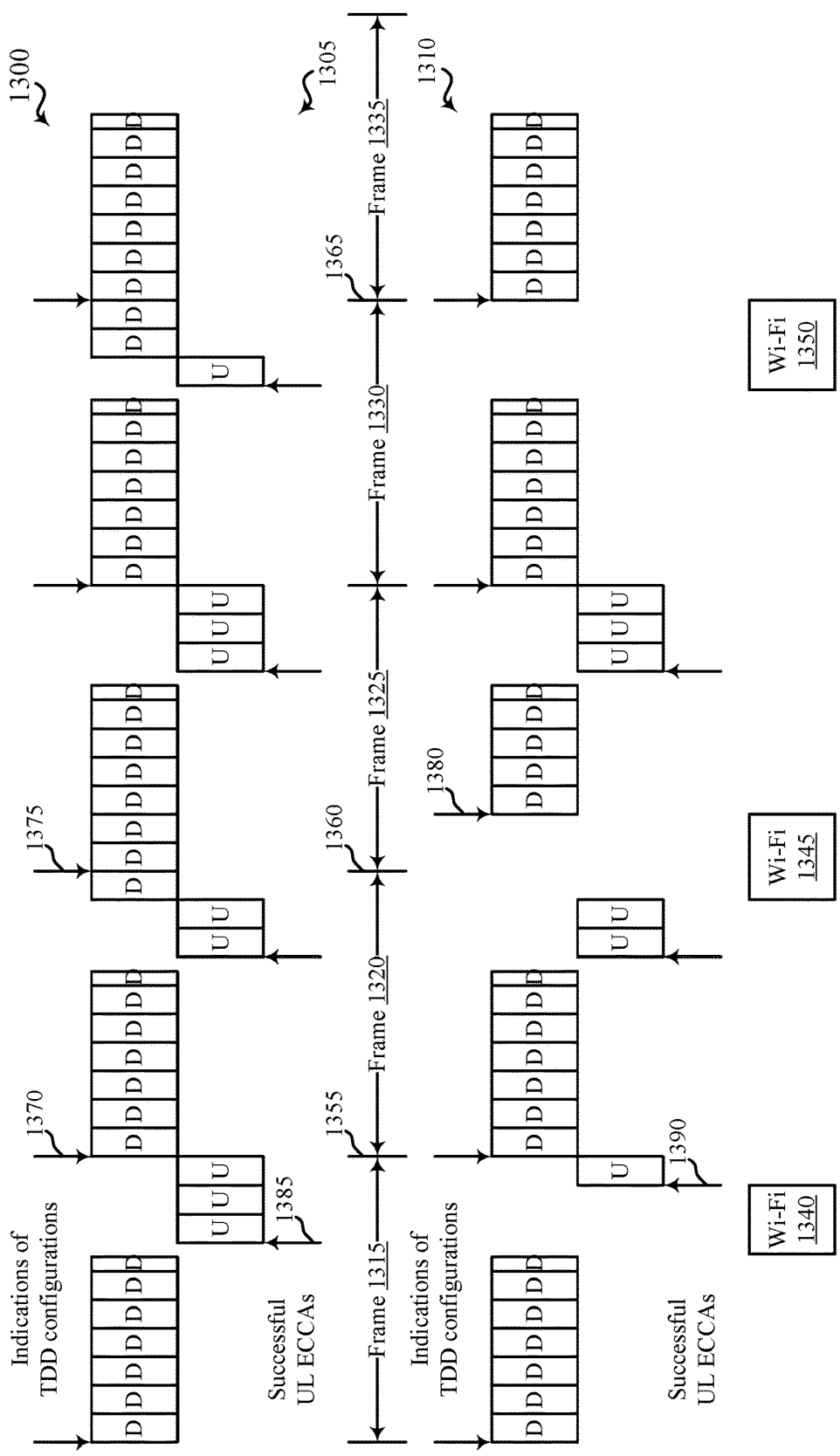
FIG. 13 shows an example of various transmissions over an unlicensed radio frequency spectrum band, in accordance with various aspects of the present disclosure.

FIG. 13 shows an example 1300 of various transmissions over an unlicensed radio frequency spectrum band, in accordance with various aspects of the present disclosure. By way of example, the transmissions include transmissions of downlink (D) subframes and uplink (U) subframes. The downlink subframes may be transmitted by a base station or eNB, such as by one of the base stations 105, 205, or 210 described with reference to FIG. 1 or 2. The uplink subframes may be transmitted by a UE, such as by one of the UEs 115, 255, 260, 265, or 270 described with reference to FIG. 1 or 2.

In some examples, a first set 1305 of the downlink subframes and the uplink subframes may be respectively transmitted by a base station or eNB operating as a secondary serving cell for a first UE operating in a carrier aggregation mode, and by the first UE. In some examples, a second set 1310 of the downlink subframes and the uplink subframes may be respectively transmitted by the base station or eNB operating as a secondary serving cell for a second UE operating in a carrier aggregation mode, and by the second UE. The downlink subframes and the uplink subframes may be transmitted across a plurality of frames 1315, 1320, 1325, 1330, or 1335. A plurality of Wi-Fi transmissions 1340, 1345, or 1350 may be transmitted by one or more Wi-Fi nodes. By way of example, the Wi-Fi transmissions 1340, 1345, or 1350 may be made within CCA range of the second UE but not the first UE. Because the Wi-Fi transmissions 1340, 1345, or 1350 are within CCA range of the second UE, the Wi-Fi transmissions 1340, 1345, or 1350 may interfere with transmissions to or from the second UE.

At each frame boundary (e.g., frame boundary 1355, 1360, or 1365) of a periodic gating interval (e.g., one of the periodic gating intervals described with reference to FIG. 3), a CCA (e.g., an ECCA) may be performed for a frame having a semi-static TDD configuration (e.g., one of the TDD configurations 605 described with reference to FIG. 6). Following a successfully performed ECCA by a base station or eNB, the base station or eNB may transmit an indication of a TDD configuration (e.g., indications 1370, 1375, and 1380) over the unlicensed radio frequency spectrum band, followed by a transmission of downlink data.

In some examples, an indication 1370 of a TDD configuration may be transmitted in sync with a frame boundary 1355 of a periodic gating interval. In some examples, an indication 1380 of a TDD configuration may be transmitted after a frame boundary 1360 of a periodic gating interval. An indication 1380 may be transmitted after a frame boundary 1360 of a periodic gating interval, for example, because of interference created by other nodes (e.g., because of the Wi-Fi transmission 1345), which prevents a base station or eNB from successfully contending for access to the unlicensed radio frequency spectrum band.

Prior to each consecutive number of uplink subframes, a CCA (e.g., a UL ECCA) may be performed by the first UE or the second UE. For some frames, a UL ECCA performed by each of the first UE and the second UE may succeed at or about the same time, and each of the first UE and the second UE may transmit the same number of uplink subframes for the frame. For other frames, a UL ECCA 1385 performed by the first UE may succeed at a different time than a UL ECCA 1390 performed by the second UE, and the first UE and the second UE may transmit different numbers of uplink subframes for the frame. In some examples, interference caused by another node may prevent a UE from transmitting any uplink subframes during a frame (e.g., the Wi-Fi transmission 1350 prevents the second UE from transmitting any uplink subframes for the frame 1330).

Figure 14:
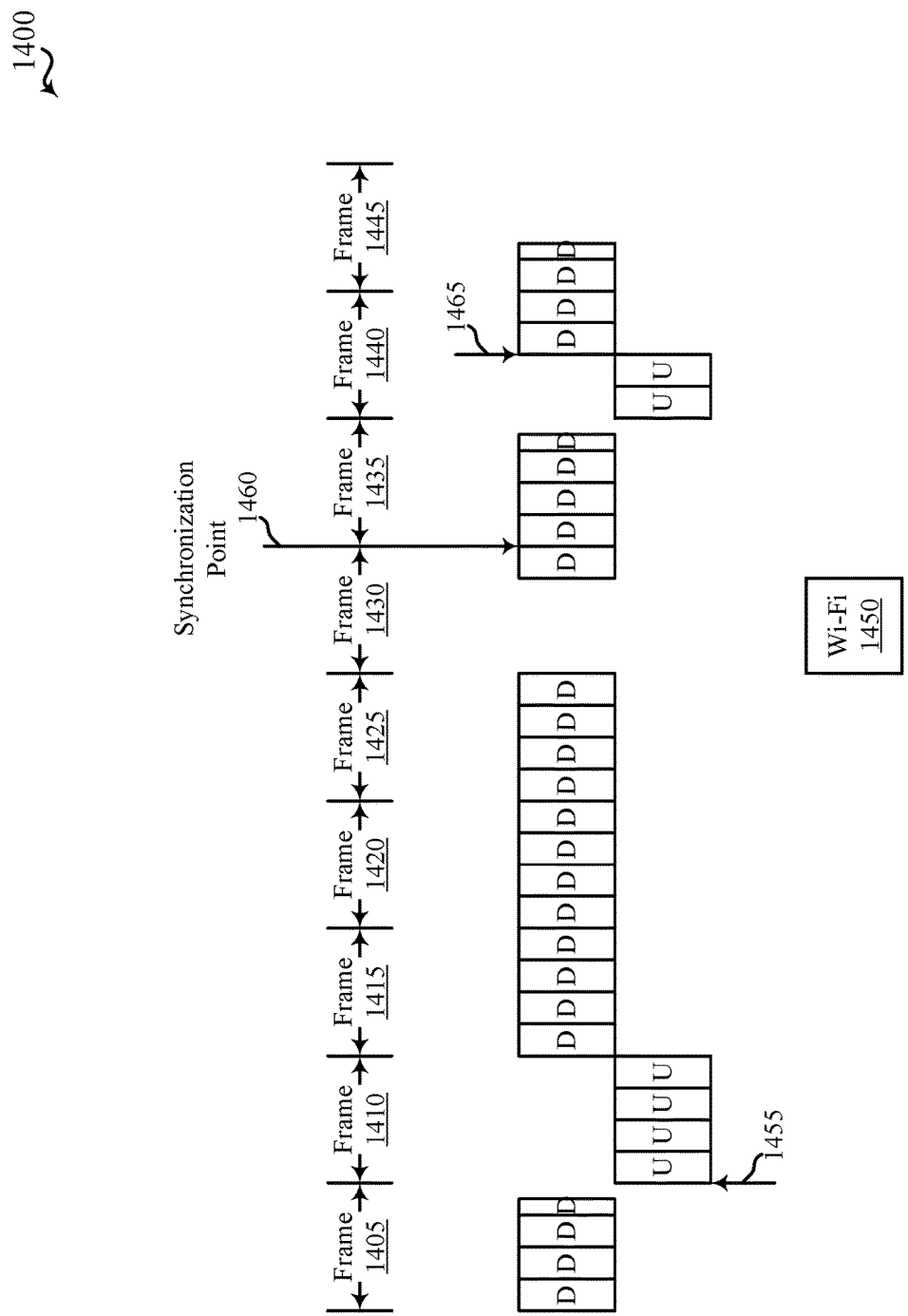
FIG. 14 shows an example of various transmissions over an unlicensed radio frequency spectrum band, in accordance with various aspects of the present disclosure.

FIG. 14 shows an example 1400 of various transmissions over an unlicensed radio frequency spectrum band, in accordance with various aspects of the present disclosure. By way of example, the transmissions include transmissions of downlink (D) subframes and uplink (U) subframes. The downlink subframes may be transmitted by a base station or eNB, such as by one of the base stations 105, 205, or 210 described with reference to FIG. 1 or 2. The uplink subframes may be transmitted by a UE, such as by one of the UEs 115, 255, 260, 265, or 270 described with reference to FIG. 1 or 2.

In some examples, the downlink subframes and the uplink subframes may be respectively transmitted by a base station or eNB operating as a secondary serving cell for a UE operating in a carrier aggregation mode, and by the UE. The downlink subframes and the uplink subframes may be transmitted across a plurality of frames 1405, 1410, 1415, 1420, 1425, 1430, 1435, 1440, or 1445. A number of Wi-Fi transmissions (e.g., Wi-Fi transmission 1450) may be transmitted by one or more Wi-Fi nodes. By way of example, the Wi-Fi transmission 1450 may be made within CCA range of the UE. Because the Wi-Fi transmission 1450 is within CCA range of the UE, the Wi-Fi transmission 1450 may interfere with transmissions to or from the UE.

At each frame boundary preceding a frame in which downlink subframes are transmitted, a CCA (e.g., an ECCA) may be performed. Following a successfully performed CCA by a base station or eNB, the base station or eNB may transmit downlink data over the unlicensed radio frequency spectrum band.

In some examples, a base station or eNB that transmits the downlink subframes shown in FIG. 14, as well as a UE that transmits the uplink subframes shown in FIG. 14, may dynamically determine a timing of a number of uplink subframes for communication over the unlicensed radio frequency spectrum band, based at least in part on at least one grant to the UE (e.g., at least one grant including a downlink grant, an uplink grant, or both), and for a period (e.g., one or more frames) following a successful CCA by the base station or eNB.

Prior to each consecutive number of uplink subframes, a CCA (e.g., an ECCA) may be performed by the UE. Following a successfully performed CCA, a UE may transmit a preamble 1455 over the unlicensed radio frequency spectrum band. The preamble 1455 may indicate a start of an uplink subframe according to a timing of a number of uplink subframes. Following the transmission of the preamble 1455, the UE may transmit uplink data in a number of uplink subframes.

In some examples, a timing of the base station or eNB that transmits the downlink subframes and a timing of the UE that transmits the uplink subframes may be synchronized. In some examples, the synchronization may be performed at one of a number of periodic synchronization points 1460, which synchronization points 1460 may coincide, for example, with a symbol boundary, a slot boundary, or a subframe boundary. In between synchronization points, the base station or eNB, as well as the UE, may transmit frames that do not align with one or more frame boundaries of a periodic gating interval, as indicated by the frame beginning at time 1465, following the UE's receipt of only two uplink grants during a four millisecond frame.

Figure 15:
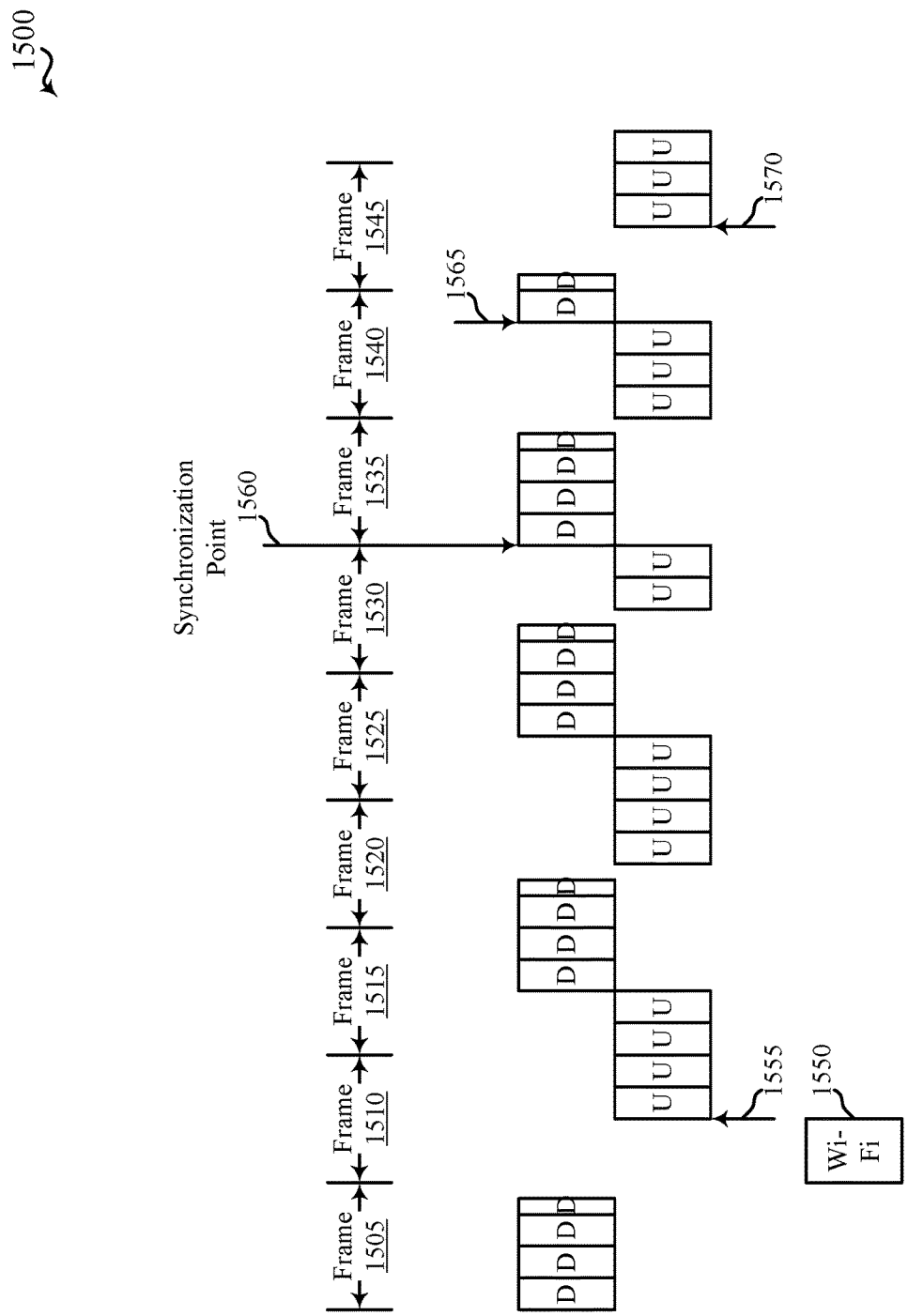
FIG. 15 shows an example of various transmissions over an unlicensed radio frequency spectrum band, in accordance with various aspects of the present disclosure.

FIG. 15 shows an example 1500 of various transmissions over an unlicensed radio frequency spectrum band, in accordance with various aspects of the present disclosure. By way of example, the transmissions include transmissions of downlink (D) subframes and uplink (U) subframes. The downlink subframes may be transmitted by a base station or eNB, such as by one of the base stations 105, 205, or 210 described with reference to FIG. 1 or 2. The uplink subframes may be transmitted by a UE, such as by one of the UEs 115, 255, 260, 265, or 270 described with reference to FIG. 1 or 2.

In some examples, the downlink subframes and the uplink subframes may be respectively transmitted by a base station or eNB operating as a secondary serving cell for a UE operating in a carrier aggregation mode, and by the UE. The downlink subframes and the uplink subframes may be transmitted across a plurality of frames 1505, 1510, 1515, 1520, 1525, 1530, 1535, 1540, or 1545. A number of Wi-Fi transmissions (e.g., Wi-Fi transmission 1550) may be transmitted by one or more Wi-Fi nodes. By way of example, the Wi-Fi transmission 1550 may be made within CCA range of the UE. Because the Wi-Fi transmission 1550 is within CCA range of the UE, the Wi-Fi transmission 1550 may interfere with transmissions to or from the UE.

At each frame boundary preceding a frame in which downlink subframes are transmitted, a CCA (e.g., an ECCA) may be performed. Following a successfully performed CCA by a base station or eNB, the base station or eNB may transmit downlink data over the unlicensed radio frequency spectrum band.

In some examples, a base station or eNB that transmits the downlink subframes shown in FIG. 15, as well as a UE that transmits the uplink subframes shown in FIG. 15, may dynamically determine a timing of a number of uplink subframes for communication over the unlicensed radio frequency spectrum band, based at least in part on at least one grant to the UE (e.g., at least one grant including a downlink grant, an uplink grant, or both), and for a period (e.g., one or more frames) following a successful CCA by the base station or eNB.

Prior to each consecutive number of uplink subframes, a CCA (e.g., an ECCA) may be performed by the UE. Following a successfully performed CCA, a UE may transmit a preamble 1555 over the unlicensed radio frequency spectrum band. The preamble 1555 may indicate a start of an uplink subframe according to a timing of a number of uplink subframes. Following the transmission of the preamble 1555, the UE may transmit uplink data in a number of uplink subframes.

In some examples, a timing of the base station or eNB that transmits the downlink subframes and a timing of the UE that transmits the uplink subframes may be synchronized. In some examples, the synchronization may be performed at one of a number of periodic synchronization points 1560, which synchronization points 1560 may coincide, for example, with a symbol boundary, a slot boundary, or a subframe boundary. In between synchronization points, the base station or eNB, as well as the UE, may transmit frames that do not align with one or more frame boundaries of a periodic gating interval, as indicated by 1) the frame beginning at time 1565, following the UE's receipt of only three uplink grants during a four millisecond frame, and 2) the frame beginning at time 1570, following the base station's or eNB's transmission of two downlink subframes during a four millisecond frame.

Figure 16:
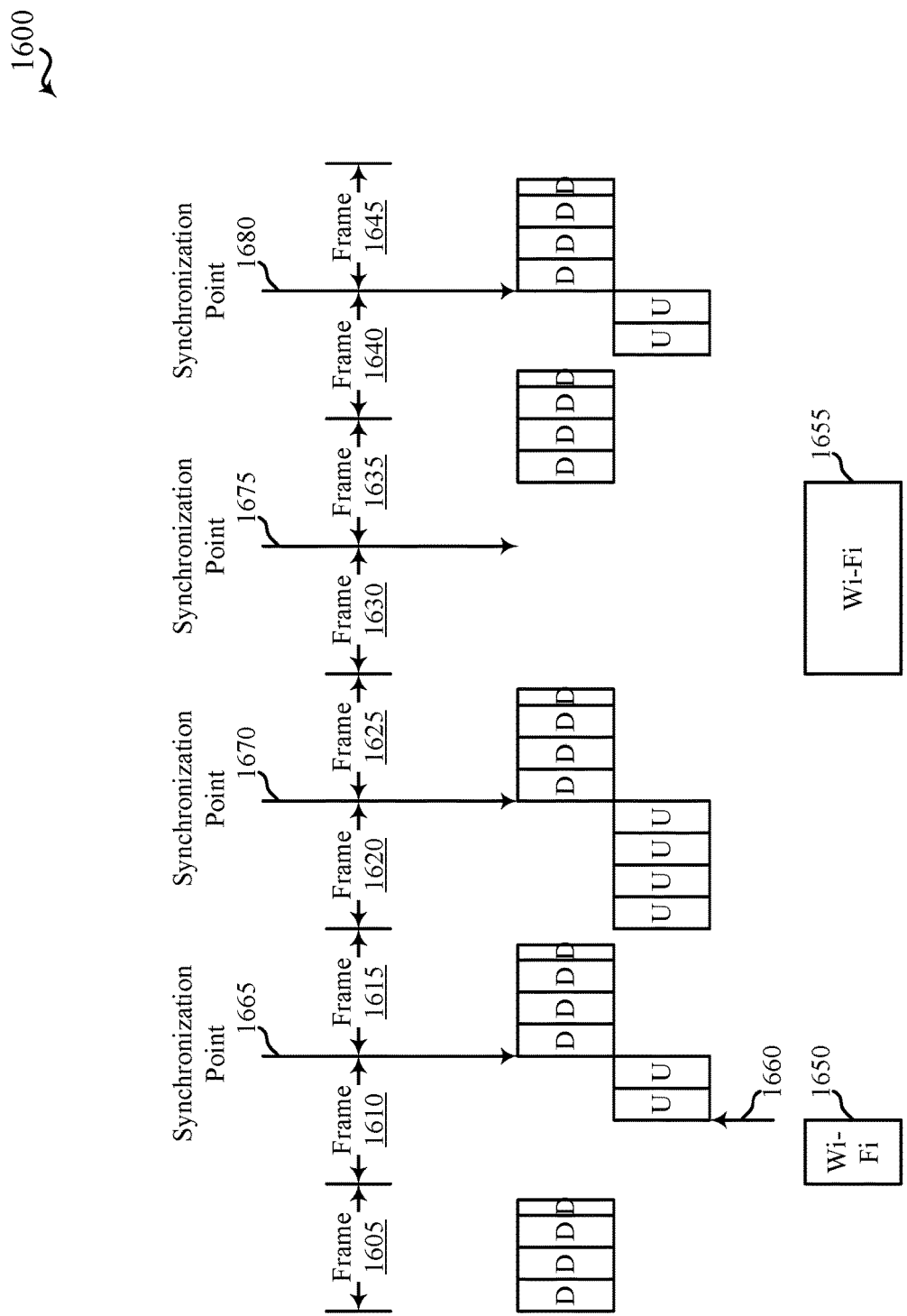
FIG. 16 shows an example of various transmissions over an unlicensed radio frequency spectrum band, in accordance with various aspects of the present disclosure.

FIG. 16 shows an example 1600 of various transmissions over an unlicensed radio frequency spectrum band, in accordance with various aspects of the present disclosure. By way of example, the transmissions include transmissions of downlink (D) subframes and uplink (U) subframes. The downlink subframes may be transmitted by a base station or eNB, such as by one of the base stations 105, 205, or 210 described with reference to FIG. 1 or 2. The uplink subframes may be transmitted by a UE, such as by one of the UEs 115, 255, 260, 265, or 270 described with reference to FIG. 1 or 2.

In some examples, the downlink subframes and the uplink subframes may be respectively transmitted by a base station or eNB operating as a secondary serving cell for a UE operating in a carrier aggregation mode, and by the UE. The downlink subframes and the uplink subframes may be transmitted across a plurality of frames 1605, 1610, 1615, 1620, 1625, 1630, 1635, 1640, or 1645. A number of Wi-Fi transmissions (e.g., Wi-Fi transmission 1650 or 1655) may be transmitted by one or more Wi-Fi nodes. By way of example, the Wi-Fi transmissions 1650 and 1655 may be made within CCA range of the UE. Because the Wi-Fi transmissions 1650 and 1655 are within CCA range of the UE, the Wi-Fi transmissions 1650 and 1655 may interfere with transmissions to or from the UE.

At each frame boundary preceding a frame in which downlink subframes are transmitted, a CCA (e.g., an ECCA) may be performed. Following a successfully performed CCA by a base station or eNB, the base station or eNB may transmit downlink data over the unlicensed radio frequency spectrum band.

In some examples, a base station or eNB that transmits the downlink subframes shown in FIG. 16, as well as a UE that transmits the uplink subframes shown in FIG. 16, may dynamically determine a timing of a number of uplink subframes for communication over the unlicensed radio frequency spectrum band, based at least in part on at least one grant to the UE (e.g., at least one grant including a downlink grant, an uplink grant, or both), and for a period (e.g., one or more frames) following a successful CCA by the base station or eNB.

Prior to each consecutive number of uplink subframes, a CCA (e.g., an ECCA) may be performed by the UE. Following a successfully performed CCA, a UE may transmit a preamble 1660 over the unlicensed radio frequency spectrum band. The preamble 1660 may indicate a start of an uplink subframe according to a timing of a number of uplink subframes. Following the transmission of the preamble 1660, the UE may transmit uplink data in a number of uplink subframes.

In some examples, a timing of the base station or eNB that transmits the downlink subframes and a timing of the UE that transmits the uplink subframes may be synchronized. In some examples, the synchronization may be performed at one of a number of periodic synchronization points 1665, 1670, 1675, or 1680, which synchronization points 1665, 1670, 1675, or 1680 may coincide, for example, with a symbol boundary, a slot boundary, or a subframe boundary. In between synchronization points, the base station or eNB, as well as the UE, may transmit frames that do not align with one or more frame boundaries of a periodic gating interval.

In some examples, interference caused by, for example, the Wi-Fi transmission 1650 may delay the success of a CCA performed by the UE until after a start of a first uplink subframe in an uplink transmission. In these examples, an uplink grant for the first uplink subframe may be associated with a second uplink subframe in the uplink transmission.

In some examples, interference caused by, for example, the Wi-Fi transmission 1655 may delay the success of a CCA performed by the UE until after a start of a first uplink subframe in an uplink transmission (and as shown, may cause the CCA to not be successful). In these examples, an uplink grant for the first uplink subframe may be allowed to expire.

Figure 17:
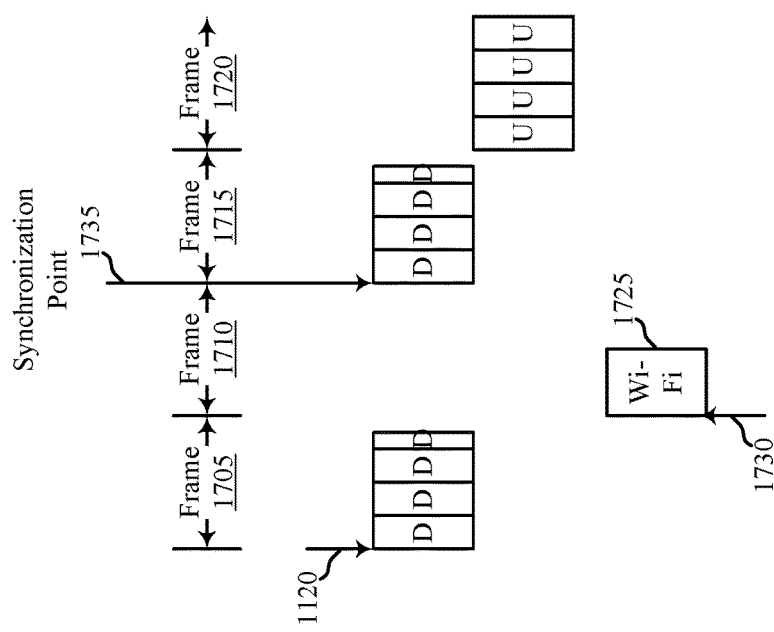
FIG. 17 shows an example of various transmissions over an unlicensed radio frequency spectrum band, in accordance with various aspects of the present disclosure.

FIG. 17 shows an example 1700 of various transmissions over an unlicensed radio frequency spectrum band, in accordance with various aspects of the present disclosure. By way of example, the transmissions include transmissions of downlink (D) subframes and uplink (U) subframes. The downlink subframes may be transmitted by a base station or eNB, such as by one of the base stations 105, 205, or 210 described with reference to FIG. 1 or 2. The uplink subframes may be transmitted by a UE, such as by one of the UEs 115, 255, 260, 265, or 270 described with reference to FIG. 1 or 2.

In some examples, the downlink subframes and the uplink subframes may be respectively transmitted by a base station or eNB operating as a secondary serving cell for a UE operating in a carrier aggregation mode, and by the UE. The downlink subframes and the uplink subframes may be transmitted across a plurality of frames 1705, 1710, 1715, or 1720. A number of Wi-Fi transmissions (e.g., Wi-Fi transmission 1725) may be transmitted by one or more Wi-Fi nodes. By way of example, the Wi-Fi transmission 1725 may be made within CCA range of the UE. Because the Wi-Fi transmission 1725 is within CCA range of the UE, the Wi-Fi transmission 1725 may interfere with transmissions to or from the UE.

At each frame boundary preceding a frame in which downlink subframes are transmitted, a CCA (e.g., an ECCA) may be performed. Following a successfully performed CCA by a base station or eNB, the base station or eNB may transmit downlink data over the unlicensed radio frequency spectrum band.

In some examples, a base station or eNB that transmits the downlink subframes shown in FIG. 17, as well as a UE that transmits the uplink subframes shown in FIG. 17, may dynamically determine a timing of a number of uplink subframes for communication over the unlicensed radio frequency spectrum band based at least in part on at least one grant to the UE (e.g., at least one grant including a downlink grant, an uplink grant, or both), and for a period (e.g., one or more frames) following a successful CCA by the base station or eNB.

Prior to each consecutive number of uplink subframes, a CCA (e.g., an ECCA) may be performed by the UE. Following a successfully performed CCA, a UE may transmit a preamble 1730 over the unlicensed radio frequency spectrum band. The preamble 1730 may indicate a start of an uplink subframe according to a timing of a number of uplink subframes. Following the transmission of the preamble 1730, the UE may transmit uplink data in a number of uplink subframes.

In some examples, a timing of the base station or eNB that transmits the downlink subframes and a timing of the UE that transmits the uplink subframes may be synchronized. In some examples, the synchronization may be performed at one of a number of periodic synchronization points 1735, which synchronization points 1735 may coincide, for example, with a symbol boundary, a slot boundary, or a subframe boundary. In between synchronization points, the base station or eNB, as well as the UE, may transmit frames that do not align with one or more frame boundaries of a periodic gating interval.

In some examples, interference may be caused, for example, by a Wi-Fi transmission 1725 that ends prior to a frame boundary or synchronization point 1735. In some examples, however, an uplink grant may not be applied to a later uplink subframe, and if the UE cannot transmit during an uplink subframe to which the uplink grant corresponds, the UE may not transmit.

Figure 18:
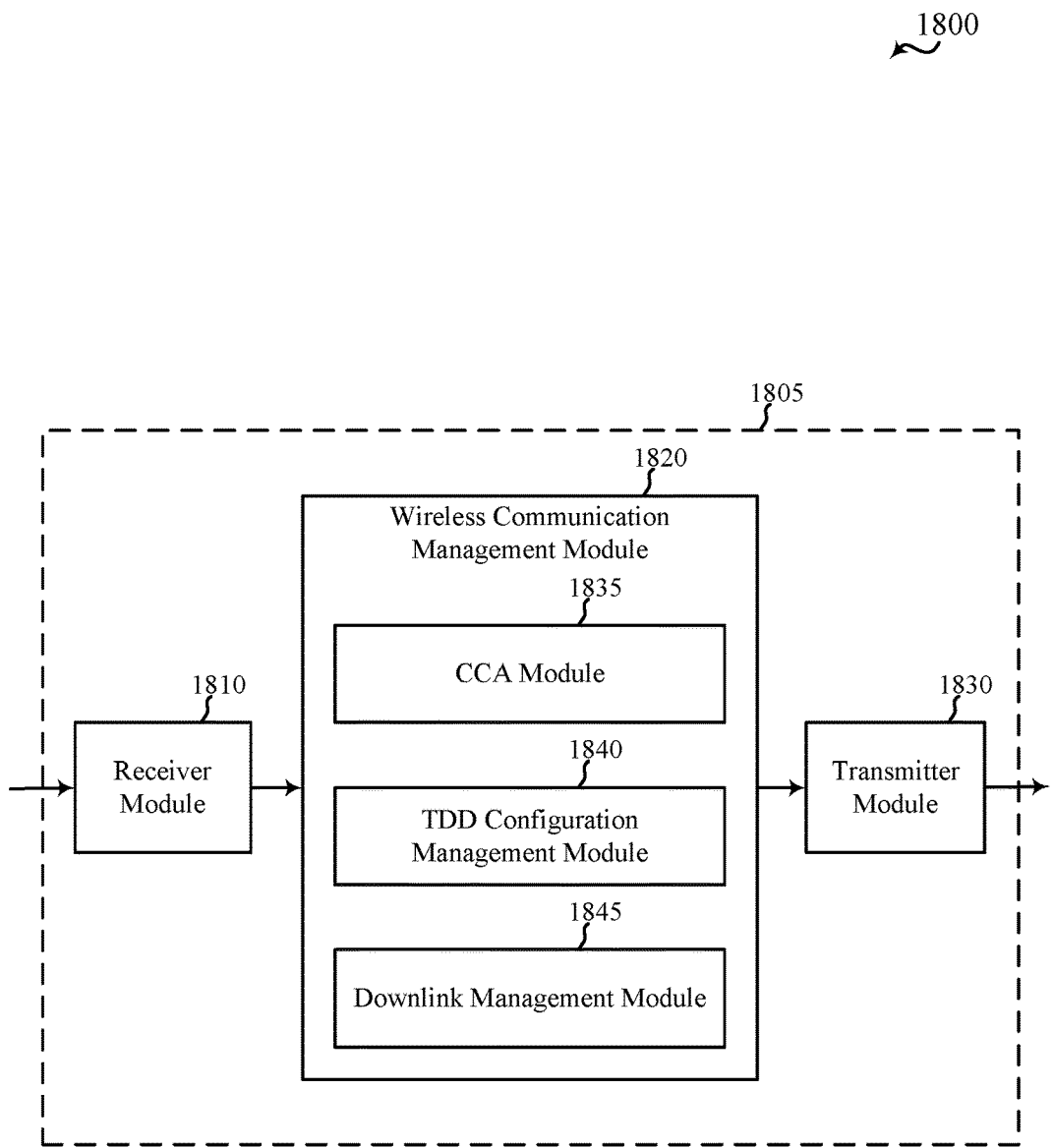
FIG. 18 shows a block diagram of an apparatus for use in wireless communication, in accordance with various aspects of the present disclosure.

FIG. 18 shows a block diagram 1800 of an apparatus 1805 for use in wireless communication, in accordance with various aspects of the present disclosure. In some examples, the apparatus 1805 may be an example of aspects of one or more of the base stations 105, 205, 210, 1005, or 1105 described with reference to FIG. 1, 2, 10, or 11. In some examples, the apparatus 1805 may be part or include an LTE/LTE-A base station or an LTE/LTE-A eNB. The apparatus 1805 may also be a processor. The apparatus 1805 may include a receiver module 1810, a wireless communication management module 1820, or a transmitter module 1830. Each of these components may be in communication with each other.

The components of the apparatus 1805 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1810 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 1810 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1830 may include at least one RF transmitter, such as at least one RF transmitter operable to transmit over the licensed radio frequency spectrum band or the unlicensed radio frequency spectrum band. The transmitter module 1830 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1820 may be used to manage various aspects of wireless communication with other apparatuses and may include a CCA module 1835, a TDD configuration management module 1840, or a downlink management module 1845.

In some examples, the CCA module 1835 may be used to perform a CCA on the unlicensed radio frequency spectrum band. In some examples, the CCA may include an ECCA. In some examples, the CCA may be performed for a frame aligned with a periodic gating interval established for the unlicensed radio frequency spectrum band (e.g., one of the periodic gating intervals described with reference to FIG. 3). In other examples, the CCA may be performed for a frame that is not aligned with the periodic gating interval (e.g., a frame including a consecutive number of downlink subframes followed by a consecutive number of uplink subframes).

In some examples, the TDD configuration management module 1840 may be used to transmit an indication of a TDD configuration over the unlicensed radio frequency spectrum band when a CCA performed by the CCA module 1835 is successful. The indication may serve, at least in part, to advertise a timing of uplink subframes included in the TDD configuration to both serving cell UEs (e.g., UEs for which the apparatus 1805 functions as serving cell) and neighboring base stations or eNBs (e.g., base stations or eNBs of different operator deployments compared to an operator deployment with which the apparatus 1905 is associated). The advertisement of the timing of uplink subframes included in the TDD configuration may cause neighboring base stations or eNBs that receive the advertisement to refrain from accessing the unlicensed radio frequency spectrum band during a transmission of the uplink subframes to the apparatus 1805.

In some examples, the indication of the TDD configuration may include an indication of a consecutive number of downlink subframes and a consecutive number of uplink subframes that follow a CCA performed by the CCA module 1835.

In some examples, the downlink management module 1845 may be used to transmit downlink data over the unlicensed radio frequency spectrum band, in accordance with a TDD configuration, when a CCA performed by the CCA module 1835 is successful.

Figure 19:
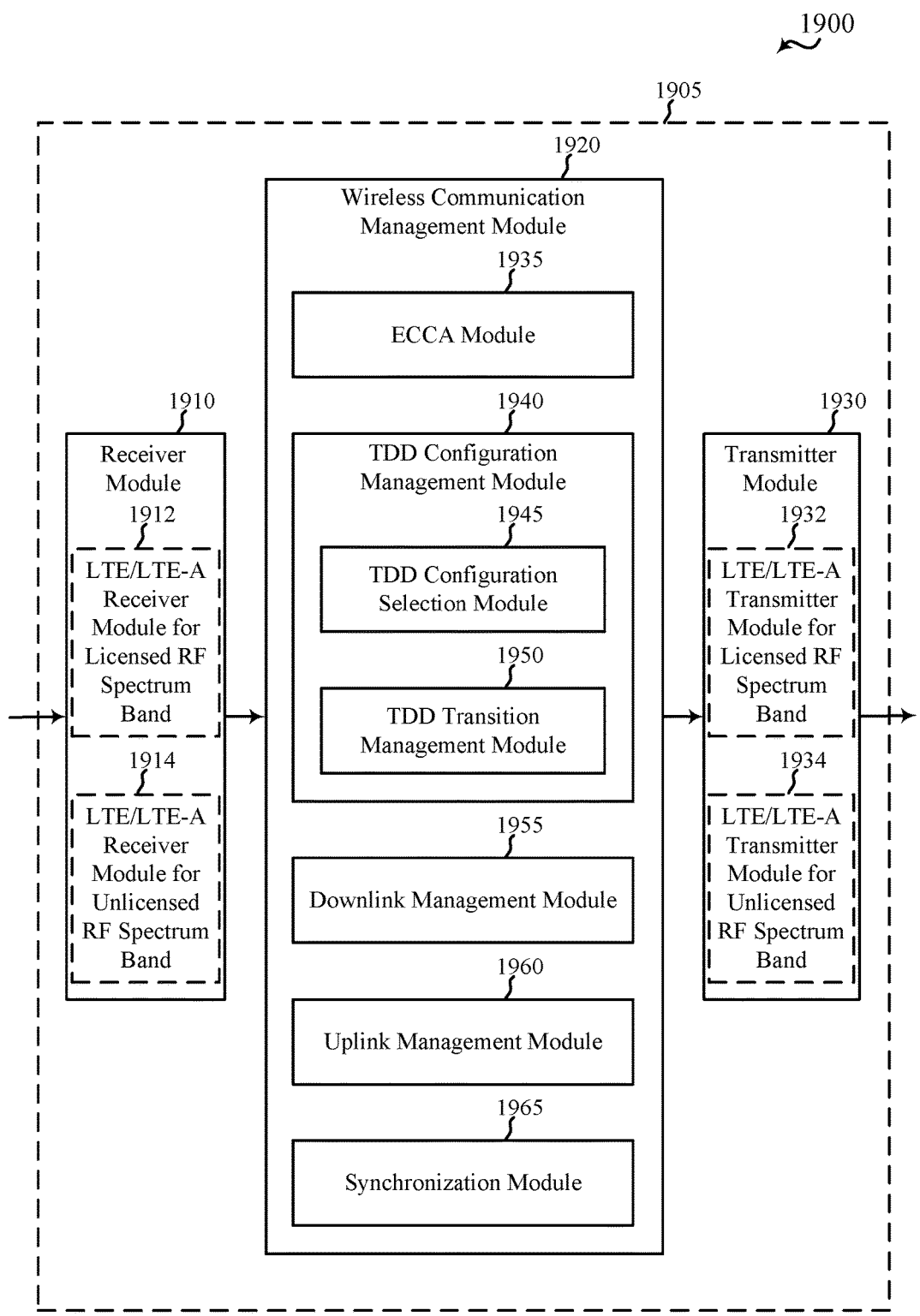
FIG. 19 shows a block diagram of an apparatus for use in wireless communication, in accordance with various aspects of the present disclosure.

FIG. 19 shows a block diagram 1900 of an apparatus 1905 for use in wireless communication, in accordance with various aspects of the present disclosure. In some examples, the apparatus 1905 may be an example of aspects of one or more of the base stations 105, 205, 210, 1005, or 1105 described with reference to FIG. 1, 2, 10, or 11, or aspects of the apparatus 1805 described with reference to FIG. 18. In some examples, the apparatus 1905 may be part or include an LTE/LTE-A base station or an LTE/LTE-A eNB. The apparatus 1905 may also be a processor. The apparatus 1905 may include a receiver module 1910, a wireless communication management module 1920, or a transmitter module 1930. Each of these components may be in communication with each other.

The components of the apparatus 1905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1910 may be an example of one or more aspects of the receiver module 1810 described with reference to FIG. 18. In some examples, the receiver module 1910 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 1910 may in some cases include separate receivers for the licensed radio frequency spectrum band and the unlicensed radio frequency spectrum band. The separate receivers may, in some examples, take the form of an LTE/LTE-A receiver module 1912 for the licensed radio frequency spectrum band, and an LTE/LTE-A receiver module 1914 for the unlicensed radio frequency spectrum band. The receiver module 1910 may also include other receiver modules, such as a backhaul receiver module for communicating over a wired or wireless backhaul that connects the apparatus 1905 to other apparatuses (e.g., to other LTE/LTE-A base stations or LTE/LTE-A eNBs). The receiver module 1910, including the LTE/LTE-A receiver module 1912 for the licensed radio frequency spectrum band and the LTE/LTE-A receiver module 1914 for the unlicensed radio frequency spectrum band, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 1930 may be an example of one or more aspects of the transmitter module 1830 described with reference to FIG. 18. In some examples, the transmitter module 1930 may include at least one RF transmitter, such as at least one RF transmitter operable to transmit over the licensed radio frequency spectrum band or the unlicensed radio frequency spectrum band. The transmitter module 1930 may in some cases include separate transmitters for the licensed radio frequency spectrum band and the unlicensed radio frequency spectrum band. The separate transmitters may, in some examples, take the form of an LTE/LTE-A transmitter module 1932 for the licensed radio frequency spectrum band, and an LTE/LTE-A transmitter module 1934 for the unlicensed radio frequency spectrum band. The transmitter module 1930 may also include other transmitter modules, such as a backhaul transmitter module for communicating over a wired or wireless backhaul that connects the apparatus 1905 to other apparatuses (e.g., to other LTE/LTE-A base stations or LTE/LTE-A eNBs). The transmitter module 1930, including the LTE/LTE-A transmitter module 1932 for the licensed radio frequency spectrum band and the LTE/LTE-A transmitter module 1934 for the unlicensed radio frequency spectrum band, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 1920 may be an example of one or more aspects of the wireless communication management module 1820 described with reference to FIG. 18. The wireless communication management module 1920 may include an ECCA module 1935, a TDD configuration management module 1940, a downlink management module 1955, an uplink management module 1960, or a synchronization module 1965.

In some examples, the ECCA module 1935 may be an example of one or more aspects of the CCA module 1835 described with reference to FIG. 18. In some examples, the ECCA module 1935 may be used to perform an ECCA on the unlicensed radio frequency spectrum band. In some examples, the ECCA may be performed for a frame aligned with a periodic gating interval established for the unlicensed radio frequency spectrum band (e.g., one of the periodic gating intervals described with reference to FIG. 3). In other examples, the ECCA may be performed for a frame that is not aligned with the periodic gating interval (e.g., a frame including a consecutive number of downlink subframes followed by a consecutive number of uplink subframes).

In some examples, the TDD configuration management module 1940 may be an example of one or more aspects of the TDD configuration management module 1840 described with reference to FIG. 18. In some examples, the TDD configuration management module 1940 may include a TDD configuration selection module 1945 or a TDD transition management module 1950. The TDD configuration selection module 1945 may be used to select a TDD configuration, for use by the apparatus 1905, from a plurality of predetermined semi-static TDD configurations.

In some examples, the TDD configuration management module 1940 may be used to transmit an indication of a selected TDD configuration over the unlicensed radio frequency spectrum band when an ECCA performed by the ECCA module 1935 is successful. The indication may serve, at least in part, to advertise a timing of uplink subframes included in the TDD configuration to both serving cell UEs (e.g., UEs for which the apparatus 1905 functions as serving cell) and neighboring base stations or eNBs (e.g., base stations or eNBs of different operator deployments compared to an operator deployment with which the apparatus 1905 is associated). The advertisement of the timing of uplink subframes included in the TDD configuration may cause neighboring base stations or eNBs that receive the advertisement to refrain from accessing the unlicensed radio frequency spectrum band during a transmission of the uplink subframes to the apparatus 1905.

In some examples, transmitting the indication of the TDD configuration may include transmitting an index associated with a TDD configuration selected by the TDD configuration selection module 1945. In some examples, transmitting the indication of the TDD configuration may include transmitting an indication of a consecutive number of downlink subframes and a consecutive number of uplink subframes that follow an ECCA performed by the ECCA module 1935. In some examples, the indication of the TDD configuration may indicate the consecutive number of downlink subframes and the consecutive number of uplink subframes that follow an ECCA by indicating a first TDD configuration and a second TDD configuration, from which a first TDD configuration and a second TDD configuration may be selected from the plurality of predetermined semi-static TDD configurations.

In some examples, the indication of the TDD configuration may be transmitted over the unlicensed radio frequency spectrum band in a first downlink subframe of the frame associated with the ECCA. In other examples, the indication of the TDD configuration may be transmitted over the unlicensed radio frequency spectrum band in any or each downlink subframe of the frame associated with the ECCA.

In examples in which the ECCA module 1935 performs an ECCA for a frame that is not aligned with a periodic gating interval established for the unlicensed radio frequency spectrum band, the TDD transition management module 1950 may be used to transition operation of the downlink management module 1955 from operation in accordance with a first TDD configuration to operation in accordance with a second TDD configuration during the frame. In these examples, the indication of a TDD configuration transmitted by the TDD configuration management module 1940 may indicate both the first TDD configuration and the second TDD configuration.

In some examples, the downlink management module 1955 may be an example of one or more aspects of the downlink management module 1845 described with reference to FIG. 18. In some examples, the downlink management module 1955 may be used to transmit downlink data over the unlicensed radio frequency spectrum band, in accordance with a TDD configuration, when an ECCA performed by the ECCA module 1935 is successful. In some examples, the downlink management module 1955 may be used to transmit at least one full or fractional signal (e.g., a full or fractional RS or CUBS), after the ECCA module 1935 successfully performs an ECCA, and before the TDD configuration management module 1940 transmits an indication of a TDD configuration or the downlink management module 1955 transmits downlink data, to synchronize a transmission timing of the apparatus 1905 with a timing of at least one UE configured to operate on the unlicensed radio frequency spectrum band. In some examples, the at least one full or fractional signal may be transmitted to synchronize transmissions of the apparatus 1905 to a symbol boundary (e.g., an OFDM symbol boundary), a slot boundary, or a subframe boundary.

The uplink management module 1960 may be used to receive a preamble from a UE. The preamble may indicate a start of an uplink subframe according to a TDD configuration. The uplink management module 1960 may also be used to receive uplink data from the UE.

The synchronization module 1965 may be used to periodically synchronize a timing of at least one base station or eNB configured to operate on the unlicensed radio frequency spectrum band with a timing of at least one UE configured to operate on the unlicensed radio frequency spectrum band. In some examples, the synchronization may occur at one or more of a symbol boundary (e.g., an OFDM symbol boundary), a slot boundary, or a subframe boundary.

Figure 20:
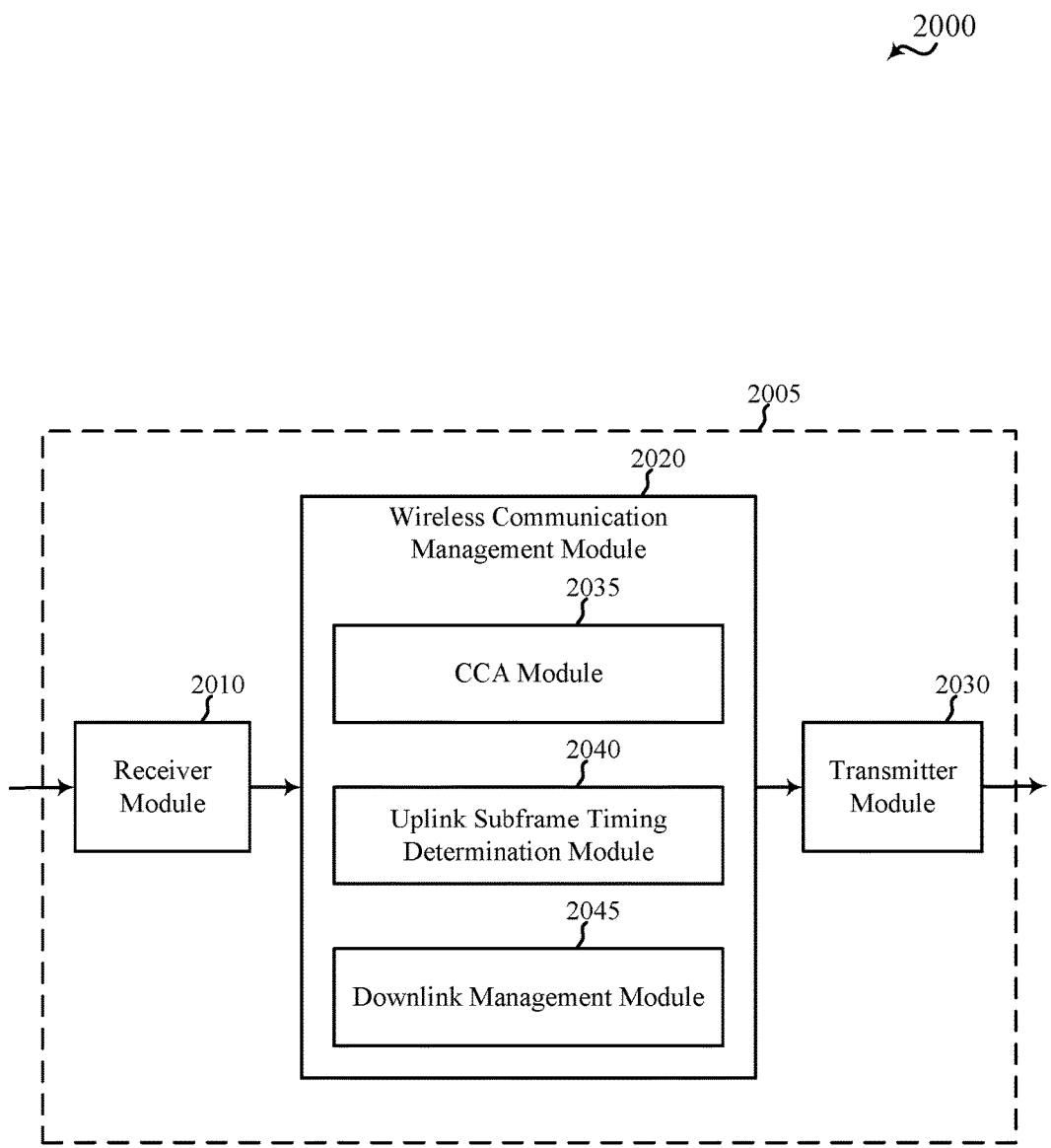
FIG. 20 shows a block diagram of an apparatus for use in wireless communication, in accordance with various aspects of the present disclosure.

FIG. 20 shows a block diagram 2000 of an apparatus 2005 for use in wireless communication, in accordance with various aspects of the present disclosure. In some examples, the apparatus 2005 may be an example of aspects of one or more of the base stations 105, 205, 210, 1005, or 1105 described with reference to FIG. 1, 2, 10, or 11. In some examples, the apparatus 2005 may be part or include an LTE/LTE-A base station or an LTE/LTE-A eNB. The apparatus 2005 may also be a processor. The apparatus 2005 may include a receiver module 2010, a wireless communication management module 2020, or a transmitter module 2030. Each of these components may be in communication with each other.

The components of the apparatus 2005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2010 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 2010 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 2030 may include at least one RF transmitter, such as at least one RF transmitter operable to transmit over the licensed radio frequency spectrum band or the unlicensed radio frequency spectrum band. The transmitter module 2030 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 2020 may be used to manage various aspects of wireless communication with other apparatuses and may include a CCA module 2035, an uplink subframe timing determination module 2040, or a downlink management module 2045.

In some examples, the CCA module 2035 may be used to perform a CCA on the unlicensed radio frequency spectrum band. In some examples, the CCA may include an ECCA. In some examples, the CCA may be performed for a period (e.g., one or more frames) aligned with one or more periodic gating interval established for the unlicensed radio frequency spectrum band (e.g., one or more of the periodic gating intervals described with reference to FIG. 3). In other examples, the CCA may be performed for a period (e.g., one or more frames) that is not aligned with a periodic gating interval (e.g., one or more frames including a consecutive number of downlink subframes followed by a consecutive number of uplink subframes).

In some examples, the uplink subframe timing determination module 2040 may be used to dynamically determine, based at least in part on at least one grant to a UE, and for the period following the CCA, a timing of a number of uplink subframes for communication over the unlicensed radio frequency spectrum band. In some examples, the at least one grant may correspond to a period (e.g., one or more frames) having a plurality of subframes, in which a first portion of the plurality of subframes in the period is semi-statically configured for downlink use and a remaining portion of the plurality of subframes in the period is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both.

In some examples, the downlink management module 2045 may be used to transmit downlink data over the unlicensed radio frequency spectrum band, in accordance with the timing of the number of uplink subframes, when a CCA performed by the CCA module 2035 is successful.

Figure 21:
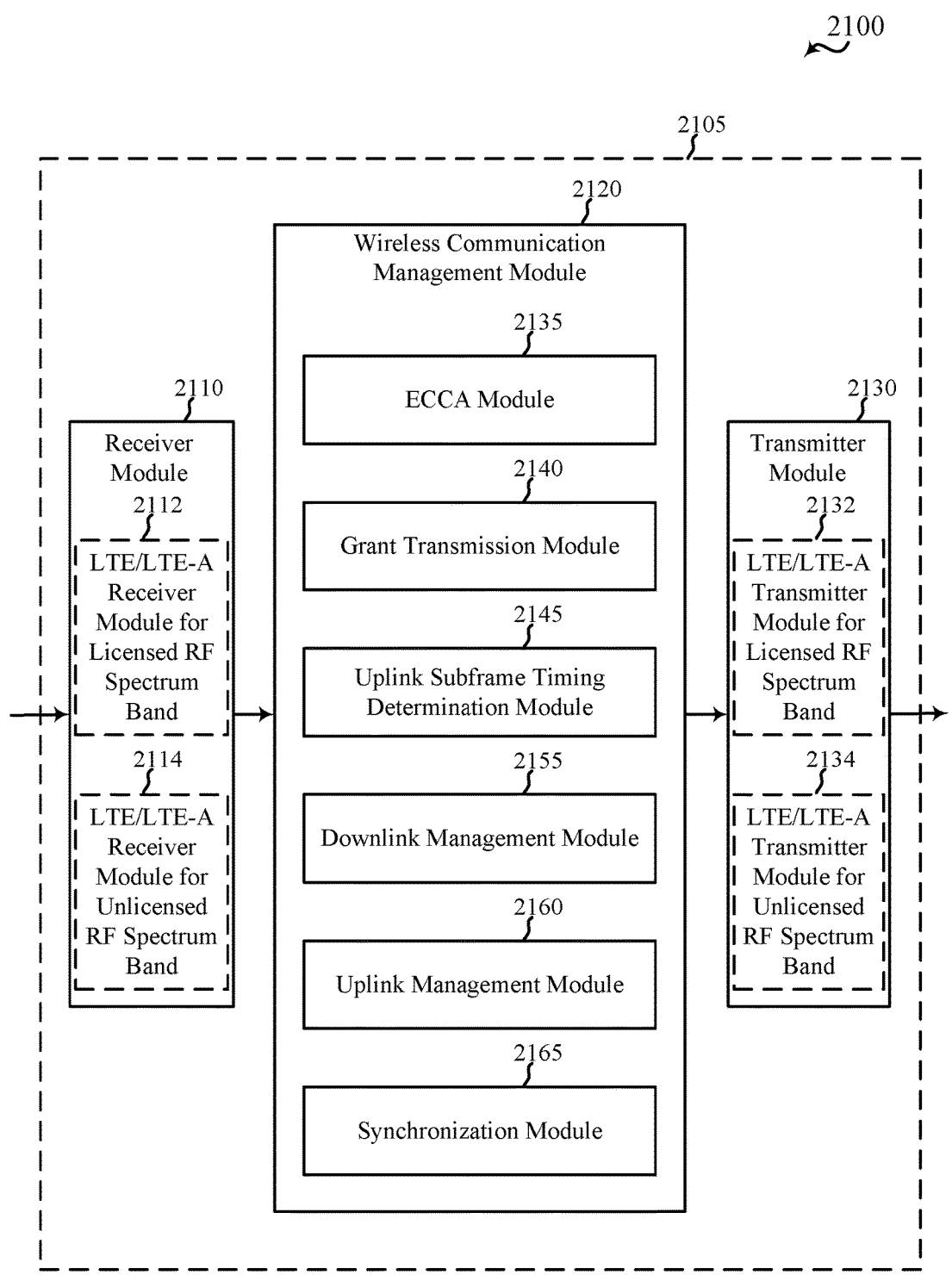
FIG. 21 shows a block diagram of an apparatus for use in wireless communication, in accordance with various aspects of the present disclosure.

FIG. 21 shows a block diagram 2100 of an apparatus 2105 for use in wireless communication, in accordance with various aspects of the present disclosure. In some examples, the apparatus 2105 may be an example of aspects of one or more of the base stations 105, 205, 210, 1005, or 1105 described with reference to FIG. 1, 2, 10, or 11, or aspects of the apparatus 2005 described with reference to FIG. 20. In some examples, the apparatus 2105 may be part or include an LTE/LTE-A base station or an LTE/LTE-A eNB. The apparatus 2105 may also be a processor. The apparatus 2105 may include a receiver module 2110, a wireless communication management module 2120, or a transmitter module 2130. Each of these components may be in communication with each other.

The components of the apparatus 2105 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2110 may be an example of one or more aspects of the receiver module 2010 described with reference to FIG. 20. In some examples, the receiver module 2110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 2110 may in some cases include separate receivers for the licensed radio frequency spectrum band and the unlicensed radio frequency spectrum band. The separate receivers may, in some examples, take the form of an LTE/LTE-A receiver module 2112 for the licensed radio frequency spectrum band, and an LTE/LTE-A receiver module 2114 for the unlicensed radio frequency spectrum band. The receiver module 2110 may also include other receiver modules, such as a backhaul receiver module for communicating over a wired or wireless backhaul that connects the apparatus 2105 to other apparatuses (e.g., to other LTE/LTE-A base stations or LTE/LTE-A eNBs). The receiver module 2110, including the LTE/LTE-A receiver module 2112 for the licensed radio frequency spectrum band and the LTE/LTE-A receiver module 2114 for the unlicensed radio frequency spectrum band, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 2130 may be an example of one or more aspects of the transmitter module 2030 described with reference to FIG. 20. In some examples, the transmitter module 2130 may include at least one RF transmitter, such as at least one RF transmitter operable to transmit over the licensed radio frequency spectrum band or the unlicensed radio frequency spectrum band. The transmitter module 2130 may in some cases include separate transmitters for the licensed radio frequency spectrum band and the unlicensed radio frequency spectrum band. The separate transmitters may, in some examples, take the form of an LTE/LTE-A transmitter module 2132 for the licensed radio frequency spectrum band, and an LTE/LTE-A transmitter module 2134 for the unlicensed radio frequency spectrum band. The transmitter module 2130 may also include other transmitter modules, such as a backhaul transmitter module for communicating over a wired or wireless backhaul that connects the apparatus 2105 to other apparatuses (e.g., to other LTE/LTE-A base stations or LTE/LTE-A eNBs). The transmitter module 2130, including the LTE/LTE-A transmitter module 2132 for the licensed radio frequency spectrum band and the LTE/LTE-A transmitter module 2134 for the unlicensed radio frequency spectrum band, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 2120 may be an example of one or more aspects of the wireless communication management module 2020 described with reference to FIG. 20. The wireless communication management module 2120 may include an ECCA module 2135, a grant transmission module 2140, an uplink subframe timing determination module 2145, a downlink management module 2155, an uplink management module 2160, or a synchronization module 2165.

In some examples, the ECCA module 2135 may be an example of one or more aspects of the CCA module 2035 described with reference to FIG. 20. In some examples, the ECCA module 2135 may be used to perform an ECCA on the unlicensed radio frequency spectrum band.

In some examples, the grant transmission module 2140 may be used to transmit at least one grant to a UE. The at least one grant may be associated with the unlicensed radio frequency spectrum band. In some examples, the at least one grant may correspond to a period (e.g., one or more frames) having a plurality of subframes, in which a first portion of the plurality of subframes in the period is semi-statically configured for downlink use and a remaining portion of the plurality of subframes in the period is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both.

In some examples, the uplink subframe timing determination module 2145 may be an example of one or more aspects of the uplink subframe timing determination module 2040 described with reference to FIG. 20. In some examples, the uplink subframe timing determination module 2145 may be used to dynamically determine, based at least in part on at least one grant to a UE, and for a period following a successful CCA, a timing of a number of uplink subframes for communication over the unlicensed radio frequency spectrum band.

In some examples, the downlink management module 2155 may be an example of one or more aspects of the downlink management module 2045 described with reference to FIG. 20. In some examples, the downlink management module 2155 may be used to transmit downlink data over the unlicensed radio frequency spectrum band, in accordance with a timing of a number of uplink subframes, when an ECCA performed by the ECCA module 2135 is successful. In some examples, the downlink management module 2155 may be used to transmit at least one full or fractional signal (e.g., a full or fractional RS or CUBS), after the ECCA module 2135 successfully performs an ECCA, and before the downlink management module 2155 transmits downlink data, to synchronize a transmission timing of the apparatus 2105 with a timing of at least one UE configured to operate on the unlicensed radio frequency spectrum band. In some examples, the at least one full or fractional signal may be transmitted to synchronize transmissions of the apparatus 2105 to a symbol boundary (e.g., an OFDM symbol boundary), a slot boundary, or a subframe boundary.

The uplink management module 2160 may be used to receive a preamble from a UE. The preamble may indicate a start of an uplink subframe during a period following a successful CCA. The uplink management module 2160 may also be used to receive uplink data from the UE.

The synchronization module 2165 may be used to periodically synchronize a timing of at least one base station or eNB configured to operate on the unlicensed radio frequency spectrum band with a timing of at least one UE configured to operate on the unlicensed radio frequency spectrum band. In some examples, the synchronization may occur at one or more of a symbol boundary (e.g., an OFDM symbol boundary), a slot boundary, or a subframe boundary.

Figure 22:
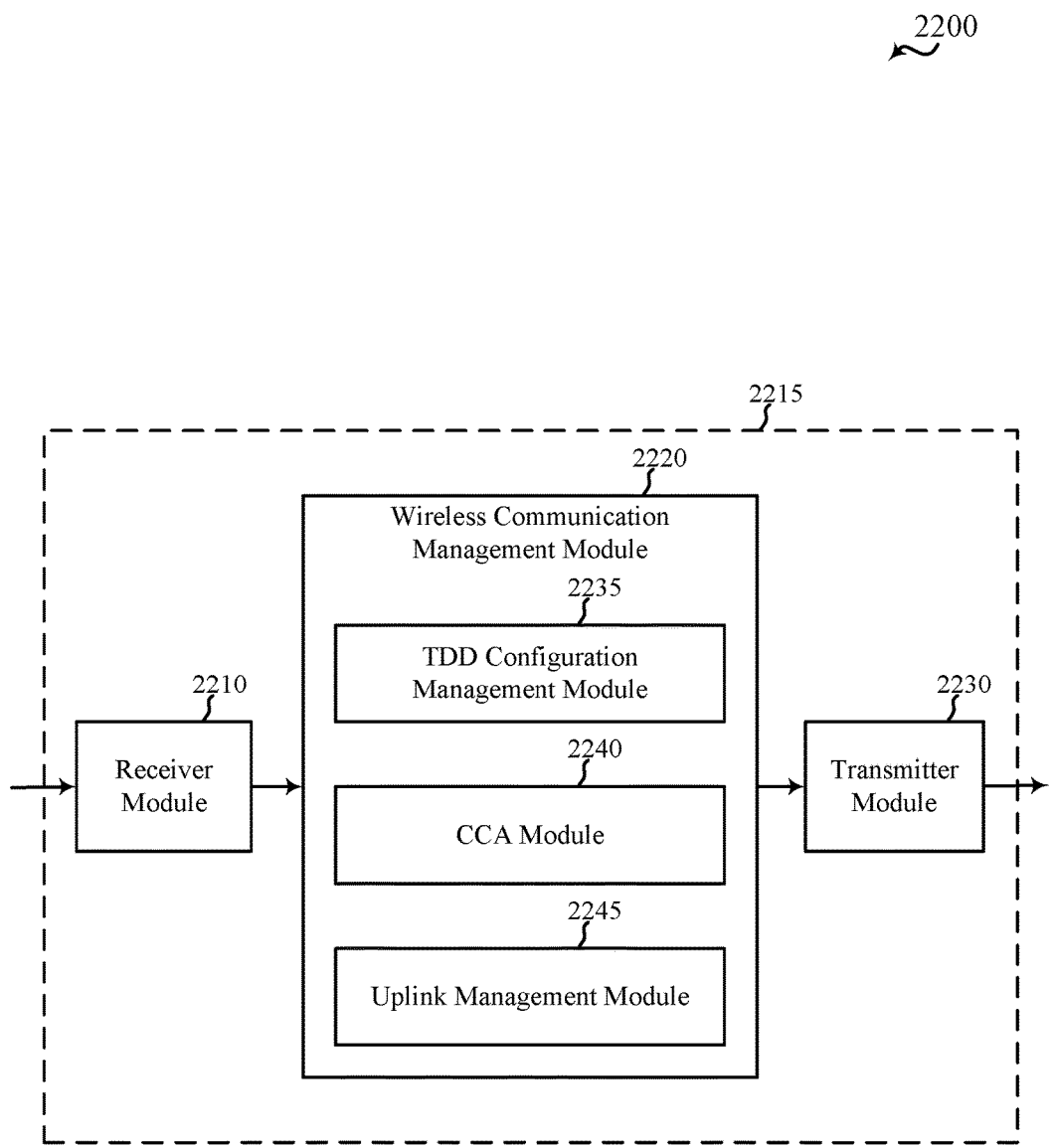
FIG. 22 shows a block diagram of an apparatus for use in wireless communication, in accordance with various aspects of the present disclosure.

FIG. 22 shows a block diagram 2200 of an apparatus 2215 for use in wireless communication, in accordance with various aspects of the present disclosure. In some examples, the apparatus 2215 may be an example of aspects of one or more of the UEs 115, 255, 260, 265, 270, 1015, or 1115 described with reference to FIG. 1, 2, 10, or 11. In some examples, the apparatus 2215 may be part or include an LTE/LTE-A base station or an LTE/LTE-A eNB. The apparatus 2215 may also be a processor. The apparatus 2215 may include a receiver module 2210, a wireless communication management module 2220, or a transmitter module 2230. Each of these components may be in communication with each other.

The components of the apparatus 2215 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2210 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 2210 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 2230 may include at least one RF transmitter, such as at least one RF transmitter operable to transmit over the licensed radio frequency spectrum band or the unlicensed radio frequency spectrum band. The transmitter module 2230 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 2220 may be used to manage various aspects of wireless communication with other apparatuses and may include a TDD configuration management module 2235, a CCA module 2240, or an uplink management module 2245.

In some examples, the TDD configuration management module 2235 may be used to receive an indication of a TDD configuration over the unlicensed radio frequency spectrum band. In some examples, the indication of the TDD configuration may include an indication of a consecutive number of downlink subframes and a consecutive number of uplink subframes during a frame (e.g., a frame of wireless communications over the unlicensed radio frequency spectrum band).

In some examples, the CCA module 2240 may be used to perform a CCA on the unlicensed radio frequency spectrum band at a beginning of an uplink period in accordance with the TDD configuration. In some examples, the CCA may include an ECCA.

In some examples, the uplink management module 2245 may be used to transmit uplink data from the apparatus 2215 over the unlicensed radio frequency spectrum band, in accordance with a received TDD configuration, when a CCA performed by the CCA module 2240 is successful.

In some examples, the operations performed by the CCA module 2240 or the uplink management module 2245 may only be performed by apparatus 2215 when a base station or eNB operating as a secondary serving cell for the apparatus 2215 has scheduled the apparatus 2215 to make a transmission to the base station or eNB over the unlicensed radio frequency spectrum band. In some examples, the apparatus 2215 may cause a base station or eNB to schedule the apparatus 2215 to make a transmission over the unlicensed radio frequency spectrum band by transmitting a BSR to a primary serving cell, thereby indicating to the primary serving cell how much data the apparatus 2215 has to transmit. The primary serving cell may be provided by the same base station or eNB that operates as a secondary serving cell for the apparatus 2215, or by a different base station or eNB.

Figure 23:
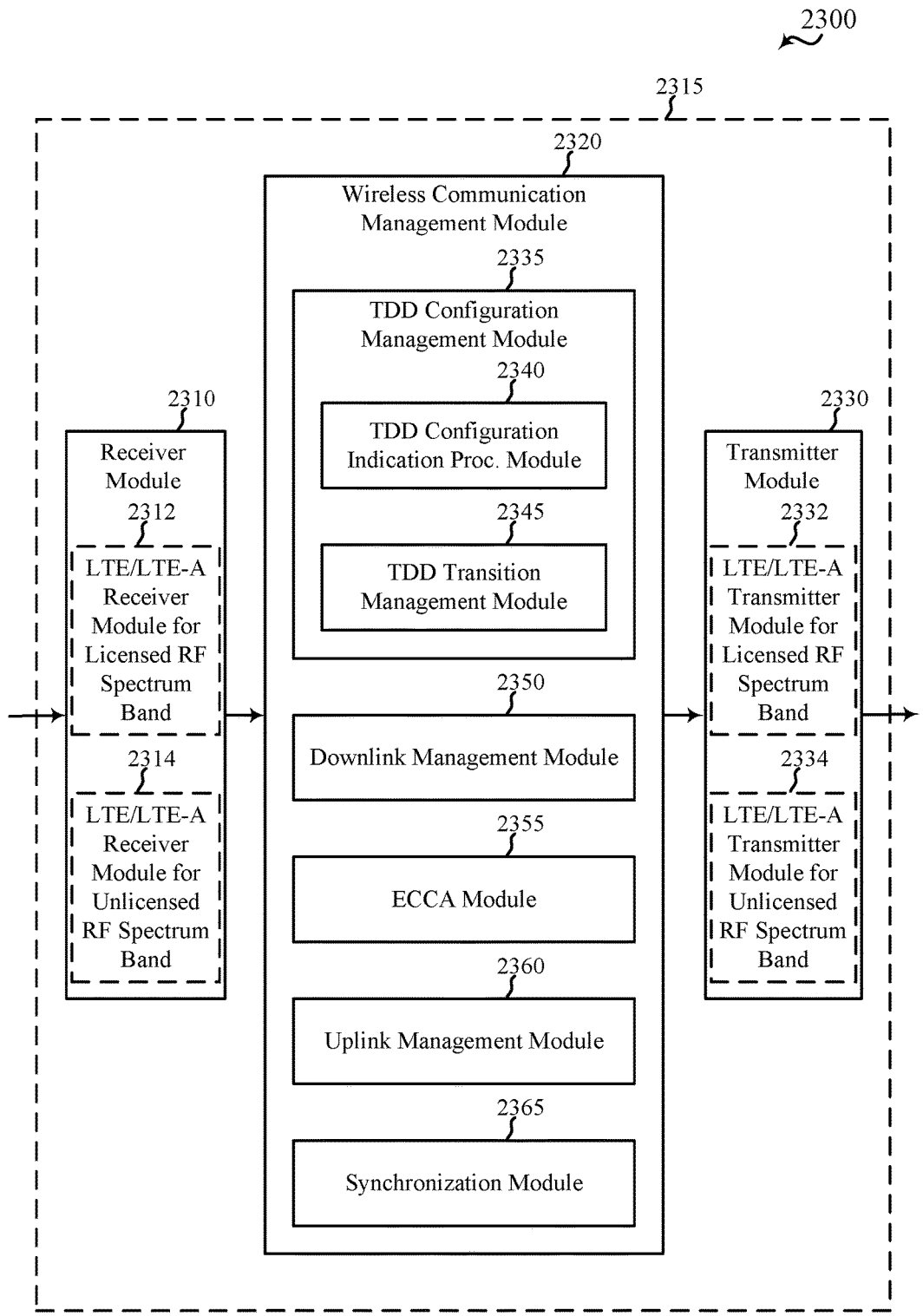
FIG. 23 shows a block diagram of an apparatus for use in wireless communication, in accordance with various aspects of the present disclosure.

FIG. 23 shows a block diagram 2300 of an apparatus 2315 for use in wireless communication, in accordance with various aspects of the present disclosure. In some examples, the apparatus 2315 may be an example of aspects of one or more of the UEs 115, 255, 260, 265, 270, 1015, or 1115 described with reference to FIG. 1, 2, 10, or 11. In some examples, the apparatus 2315 may be part or include an LTE/LTE-A base station or an LTE/LTE-A eNB. The apparatus 2315 may also be a processor. The apparatus 2315 may include a receiver module 2310, a wireless communication management module 2320, or a transmitter module 2330. Each of these components may be in communication with each other.

The components of the apparatus 2315 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2310 may be an example of one or more aspects of the receiver module 2210 described with reference to FIG. 22. In some examples, the receiver module 2310 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 2310 may in some cases include separate receivers for the licensed radio frequency spectrum band and the unlicensed radio frequency spectrum band. The separate receivers may, in some examples, take the form of an LTE/LTE-A receiver module 2312 for the licensed radio frequency spectrum band, and an LTE/LTE-A receiver module 2314 for the unlicensed radio frequency spectrum band. The receiver module 2310 may also include other receiver modules, such as a backhaul receiver module for communicating over a wired or wireless backhaul that connects the apparatus 2315 to other apparatuses (e.g., to other LTE/

LTE-A base stations or LTE/LTE-A eNBs). The receiver module 2310, including the LTE/LTE-A receiver module 2312 for the licensed radio frequency spectrum band and the LTE/LTE-A receiver module 2314 for the unlicensed radio frequency spectrum band, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 2330 may be an example of one or more aspects of the transmitter module 2230 described with reference to FIG. 22. In some examples, the transmitter module 2330 may include at least one RF transmitter, such as at least one RF transmitter operable to transmit over the licensed radio frequency spectrum band or the unlicensed radio frequency spectrum band. The transmitter module 2330 may in some cases include separate transmitters for the licensed radio frequency spectrum band and the unlicensed radio frequency spectrum band. The separate transmitters may, in some examples, take the form of an LTE/LTE-A transmitter module 2332 for the licensed radio frequency spectrum band, and an LTE/LTE-A transmitter module 2334 for the unlicensed radio frequency spectrum band. The transmitter module 2330 may also include other transmitter modules, such as a backhaul transmitter module for communicating over a wired or wireless backhaul that connects the apparatus 2315 to other apparatuses (e.g., to other LTE/LTE-A base stations or LTE/LTE-A eNBs). The transmitter module 2330, including the LTE/LTE-A transmitter module for the licensed radio frequency spectrum band 2332 and the LTE/LTE-A transmitter module for the unlicensed radio frequency spectrum band 2334, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 2320 may be an example of one or more aspects of the wireless communication management module 2220 described with reference to FIG. 22. The wireless communication management module 2320 may include a TDD configuration management module 2335, a downlink management module 2350, an ECCA module 2355, an uplink management module 2360, or a synchronization module 2365.

In some examples, the TDD configuration management module 2335 may be an example of one or more aspects of the TDD configuration management module 2235 described with reference to FIG. 22. In some examples, the TDD configuration management module 2335 may include a TDD configuration indication processing module 2340 or a TDD transition management module 2345. The TDD configuration indication processing module 2340 may be used to receive an indication of a TDD configuration over the unlicensed radio frequency spectrum band. In some examples, the indication of the TDD configuration may include an indication of a consecutive number of downlink subframes and a consecutive number of uplink subframes during a frame (e.g., a frame of wireless communications over the unlicensed radio frequency spectrum band).

In some examples, the TDD configuration indication processing module 2340 may receive the indication of the TDD configuration in a first downlink subframe of a frame to which the indication of the TDD configuration applies. In some examples, the TDD configuration indication processing module 2340 may receive the indication of the TDD configuration in any or each downlink subframe of a frame to which the indication of the TDD configuration applies.

In some examples, an indication of a TDD configuration received by the TDD configuration indication processing module 2340 may indicate a first TDD configuration and a second TDD configuration for a frame to which the indication of the TDD configuration applies. In these examples, the TDD transition management module 2345 may manage a transition of the apparatus 2315 from the first TDD configuration to the second TDD configuration during a fame to which the indication of the TDD configuration applies.

In some examples, the downlink management module 2350 may be used to receive downlink data over the unlicensed radio frequency spectrum band in accordance with a TDD configuration.

In some examples, the ECCA module 2355 may be an example of one or more aspects of the CCA module 2240 described with reference to FIG. 22. In some examples, the ECCA module 2355 may be used to perform an ECCA on the unlicensed radio frequency spectrum band at a beginning of an uplink period in accordance with a TDD configuration.

In some examples, the uplink management module 2360 may be used to transmit a preamble over the unlicensed radio frequency spectrum band when an ECCA performed by the ECCA module 2355 is successful. The preamble may indicate a start of an uplink subframe according to the TDD configuration. The uplink management module 2360 may also be used to transmit uplink data from the apparatus 2315 over the unlicensed radio frequency spectrum band, in accordance with a received TDD configuration, when a CCA performed by the ECCA module 2355 is successful. In some examples, the preamble may be transmitted in an uplink subframe along with part or all of the uplink data.

In some examples, the uplink management module 2360 may be used to transmit at least one full or fractional signal (e.g., a full or fractional RS or CUBS), after the ECCA module 2355 successfully performs an ECCA, and before the uplink management module 2360 transmits a preamble or uplink data, to synchronize a transmission timing of the apparatus 2315 with a timing of a base station or eNB configured to operate on the unlicensed radio frequency spectrum band. In some examples, the at least one full or fractional signal may be transmitted to synchronize transmissions of the apparatus 2315 to a symbol boundary (e.g., an SC-FDM symbol boundary or an OFDM symbol boundary), a slot boundary, or a subframe boundary.

In some examples, the operations performed by the ECCA module 2355 or the uplink management module 2360 may only be performed 2315 when a base station or eNB operating as a secondary serving cell for the apparatus 2315 has scheduled the apparatus 2315 to make a transmission to the base station or eNB over the unlicensed radio frequency spectrum band. In some examples, the apparatus 2315 may cause a base station or eNB to schedule the apparatus 2315 to make a transmission over the unlicensed radio frequency spectrum band by transmitting a BSR to a primary serving cell, thereby indicating to the primary serving cell how much data the apparatus 2315 has to transmit. The primary serving cell may be provided by the same base station or eNB that operates as a secondary serving cell for the apparatus 2315, or by a different base station or eNB.

In some examples, the synchronization module 2365 may be used to align a first pseudo-random number generator for the apparatus 2315 with a second pseudo-random generator for another apparatus (e.g., another UE) such that an ECCA performed by the apparatus 2315 is synchronized with an ECCA performed by the other apparatus at the beginning of an uplink period. In some examples, each of a plurality of UEs within a same operator deployment, where the UEs are scheduled for transmissions to a base station or eNB over an unlicensed radio frequency spectrum band during a frame, may align or synchronize a pseudo-random number generator used by the UE when performing an ECCA with pseudo-random number generators used by each other UE in the plurality of UEs. The synchronization of pseudo-random number generators may cause each of the plurality of UEs to contend for access to the unlicensed radio frequency spectrum band at the same time. In some examples, the aligning may be performed based at least in part on a system time.

In some examples, the synchronization module 2365 may also or alternatively be used to periodically synchronize a timing of the apparatus 2315 with a timing of a base station or eNB configured to operate on the unlicensed radio frequency spectrum band. In some examples, the synchronization may occur at one or more of a symbol boundary (e.g., an SC-FDM symbol boundary or an OFDM symbol boundary), a slot boundary, or a subframe boundary.

Figure 24:
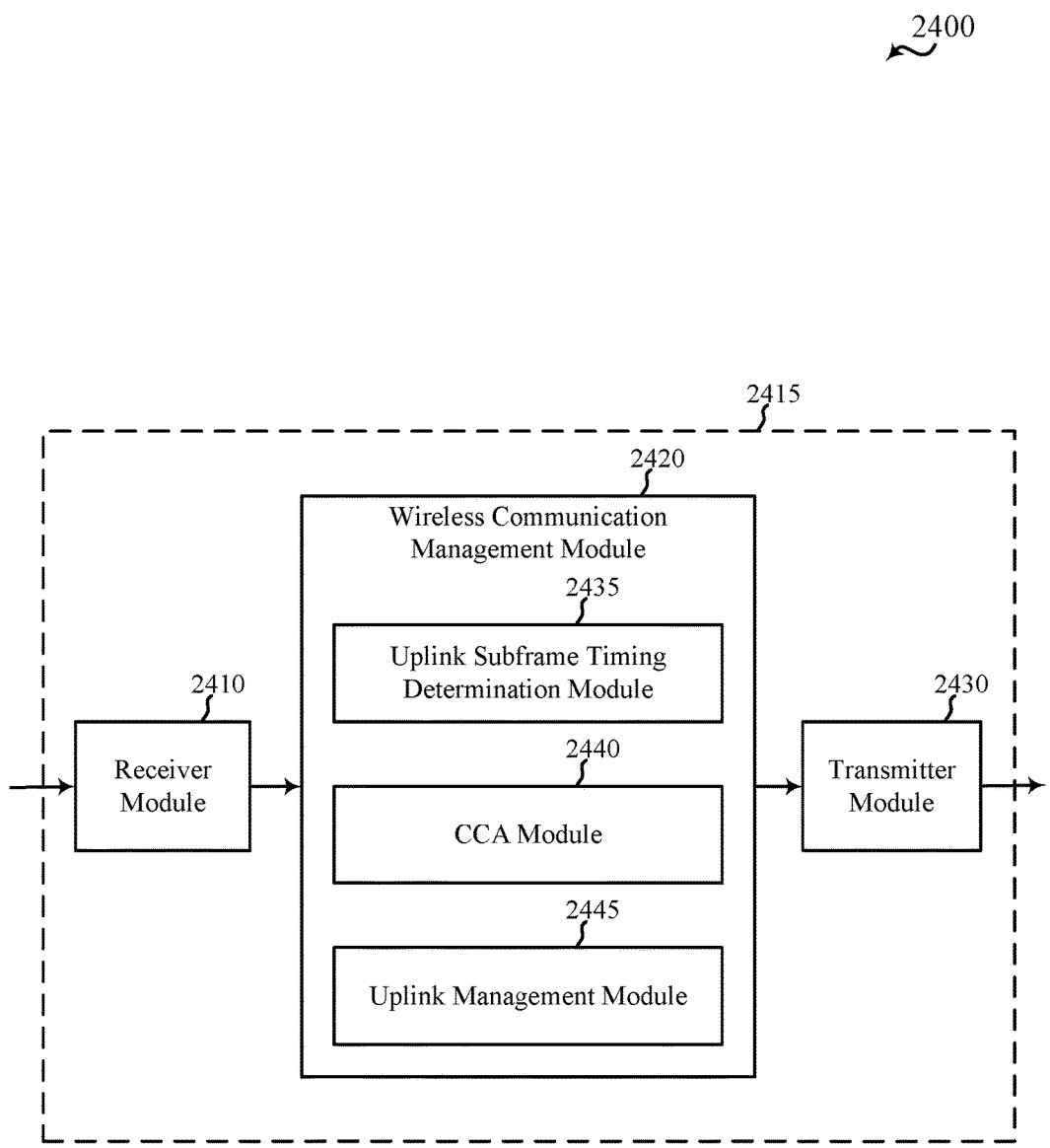
FIG. 24 shows a block diagram of an apparatus for use in wireless communication, in accordance with various aspects of the present disclosure.

FIG. 24 shows a block diagram 2400 of an apparatus 2415 for use in wireless communication, in accordance with various aspects of the present disclosure. In some examples, the apparatus 2415 may be an example of aspects of one or more of the UEs 115, 255, 260, 265, 270, 1015, or 1115 described with reference to FIG. 1, 2, 10, or 11. In some examples, the apparatus 2415 may be part or include an LTE/LTE-A base station or an LTE/LTE-A eNB. The apparatus 2415 may also be a processor. The apparatus 2415 may include a receiver module 2410, a wireless communication management module 2420, or a transmitter module 2430. Each of these components may be in communication with each other.

The components of the apparatus 2415 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2410 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 2410 may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 2430 may include at least one RF transmitter, such as at least one RF transmitter operable to transmit over the licensed radio frequency spectrum band or the unlicensed radio frequency spectrum band. The transmitter module 2430 may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 2420 may be used to manage various aspects of wireless communication with other apparatuses and may include an uplink subframe timing determination module 2435, a CCA module 2440, or an uplink management module 2445.

In some examples, the uplink subframe timing determination module 2435 may be used to receive, at a UE, at least one grant associated with an unlicensed radio frequency spectrum band. In some examples, the at least one grant may correspond to a frame having a plurality of subframes, in which a first portion of the plurality of subframes in the frame is semi-statically configured for downlink use and a remaining portion of the plurality of subframes in the frame is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both.

In some examples, the uplink subframe timing determination module 2435 may also determine, based at least in part on the at least one grant, a timing of a number of uplink subframes in a frame for communication over the unlicensed radio frequency spectrum band.

In some examples, the CCA module 2440 may be used to perform a CCA on the unlicensed radio frequency spectrum band at a beginning of an uplink period including the number of uplink subframes. In some examples, the CCA may include an ECCA.

In some examples, the uplink management module 2445 may be used to transmit uplink data from the apparatus 2415 over the unlicensed radio frequency spectrum band, in accordance with at least one of the number of uplink subframes, when a CCA performed by the CCA module 2440 is successful.

In some examples, the operations performed by the CCA module 2440 or the uplink management module 2445 may only be performed 2415 when a base station or eNB operating as a secondary serving cell for the apparatus 2415 has scheduled the apparatus 2415 to make a transmission to the base station or eNB over the unlicensed radio frequency spectrum band. In some examples, the apparatus 2415 may cause a base station or eNB to schedule the apparatus 2415 to make a transmission over the unlicensed radio frequency spectrum band by transmitting a BSR to a primary serving cell, thereby indicating to the primary serving cell how much data the apparatus 2415 has to transmit. The primary serving cell may be provided by the same base station or eNB that operates as a secondary serving cell for the apparatus 2415, or by a different base station or eNB.

Figure 25:
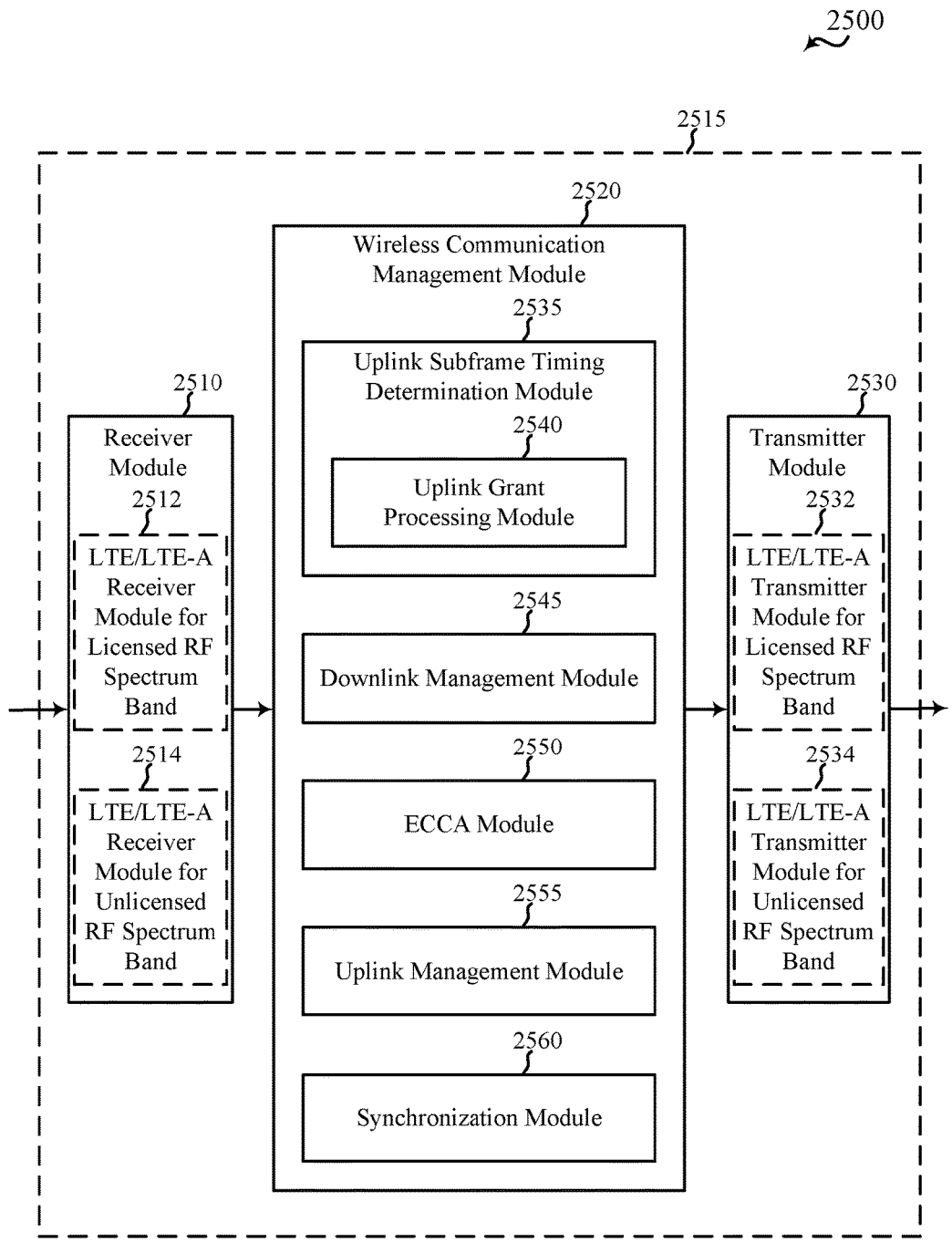
FIG. 25 shows a block diagram of an apparatus for use in wireless communication, in accordance with various aspects of the present disclosure.

FIG. 25 shows a block diagram 2500 of an apparatus 2515 for use in wireless communication, in accordance with various aspects of the present disclosure. In some examples, the apparatus 2515 may be an example of aspects of one or more of the UEs 115, 255, 260, 265, 270, 1015, or 1115 described with reference to FIG. 1, 2, 10, or 11. In some examples, the apparatus 2515 may be part or include an LTE/LTE-A base station or an LTE/LTE-A eNB. The apparatus 2515 may also be a processor. The apparatus 2515 may include a receiver module 2510, a wireless communication management module 2520, or a transmitter module 2530. Each of these components may be in communication with each other.

The components of the apparatus 2515 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 2510 may be an example of one or more aspects of the receiver module 2410 described with reference to FIG. 24. In some examples, the receiver module 2510 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) or an unlicensed radio frequency spectrum band (e.g., a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band)). In some examples, the licensed radio frequency spectrum band or the unlicensed radio frequency spectrum band may be used for LTE/LTE-A communications, as described, for example, with reference to FIG. 1-17. The receiver module 2510 may in some cases include separate receivers for the licensed radio frequency spectrum band and the unlicensed radio frequency spectrum band. The separate receivers may, in some examples, take the form of an LTE/LTE-A receiver module 2512 for the licensed radio frequency spectrum band, and an LTE/LTE-A receiver module 2514 for the unlicensed radio frequency spectrum band. The receiver module 2510 may also include other receiver modules, such as a backhaul receiver module for communicating over a wired or wireless backhaul that connects the apparatus 2515 to other apparatuses (e.g., to other LTE/LTE-A base stations or LTE/LTE-A eNBs). The receiver module 2510, including the LTE/LTE-A receiver module 2512 for the licensed radio frequency spectrum band and the LTE/LTE-A receiver module 2514 for the unlicensed radio frequency spectrum band, may be used to receive various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the transmitter module 2530 may be an example of one or more aspects of the transmitter module 2430 described with reference to FIG. 24. In some examples, the transmitter module 2530 may include at least one RF transmitter, such as at least one RF transmitter operable to transmit over the licensed radio frequency spectrum band or the unlicensed radio frequency spectrum band. The transmitter module 2530 may in some cases include separate transmitters for the licensed radio frequency spectrum band and the unlicensed radio frequency spectrum band. The separate transmitters may, in some examples, take the form of an LTE/LTE-A transmitter module 2532 for the licensed radio frequency spectrum band, and an LTE/LTE-A transmitter module 2534 for the unlicensed radio frequency spectrum band. The transmitter module 2530 may also include other transmitter modules, such as a backhaul transmitter module for communicating over a wired or wireless backhaul that connects the apparatus 2515 to other apparatuses (e.g., to other LTE/LTE-A base stations or LTE/LTE-A eNBs). The transmitter module 2530, including the LTE/LTE-A transmitter module 2532 for the licensed radio frequency spectrum band and the LTE/LTE-A transmitter module 2534 for the unlicensed radio frequency spectrum band, may be used to transmit various types of data or control signals (i.e., transmissions) over one or more communication links of a wireless communication system, such as one or more communication links of the wireless communication system 100 or 200 described with reference to FIG. 1 or 2. The communication links may be established over the licensed radio frequency spectrum band or the unlicensed radio frequency spectrum band.

In some examples, the wireless communication management module 2520 may be an example of one or more aspects of the wireless communication management module 2420 described with reference to FIG. 24. The wireless communication management module 2520 may include an uplink subframe timing determination module 2535, a downlink management module 2545, an ECCA module 2550, an uplink management module 2555, or a synchronization module 2560.

In some examples, the uplink subframe timing determination module 2535 may be an example of one or more aspects of the uplink subframe timing determination module 2435 described with reference to FIG. 24. In some examples, the uplink subframe timing determination module 2535 may be used to receive, at the first UE, at least one grant associated with the unlicensed radio frequency spectrum band. In some examples, the at least one grant may correspond to a frame having a plurality of subframes, in which a first portion of the plurality of subframes in the frame is semi-statically configured for downlink use and a remaining portion of the plurality of subframes in the frame is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both.

In some examples, the uplink subframe timing determination module 2535 may include an uplink grant processing module 2540. The uplink grant processing module 2540 may be used to dynamically determine, based at least in part on the at least one grant, a timing of a number of uplink subframes in a frame for communication over the unlicensed radio frequency spectrum band.

In some examples, the downlink management module 2545 may be used to receive downlink data over the unlicensed radio frequency spectrum.

In some examples, the ECCA module 2550 may be an example of one or more aspects of the CCA module 2440 described with reference to FIG. 24. In some examples, the ECCA module 2550 may be used to perform an ECCA on the unlicensed radio frequency spectrum band at a beginning of an uplink period including the number of uplink subframes.

In some examples, the uplink management module 2555 may be used to transmit a preamble over the unlicensed radio frequency spectrum band when an ECCA performed by the ECCA module 2550 is successful. The preamble may indicate a start of an uplink subframe according to the timing of the number of uplink subframes. The uplink management module 2555 may also be used to transmit uplink data from the apparatus 2515 over the unlicensed radio frequency spectrum band, in accordance with at least one grant, when an ECCA performed by the ECCA module 2550 is successful. In some examples, the preamble may be transmitted in an uplink subframe along with part or all of the uplink data.

When at least one grant received by the uplink subframe timing determination module 2535 includes an uplink grant for a first uplink subframe, and when an ECCA performed by the ECCA module 2550 is not successful until after a start of the first uplink subframe, the uplink management module 2555 may 1) associate the uplink grant with a second uplink subframe or 2) allow the uplink grant to expire. The second uplink subframe may immediately follow the first uplink subframe or may be separated from the first uplink subframe by one or more other subframes.

In some examples, the uplink management module 2555 may be used to transmit at least one full or fractional signal (e.g., a full or fractional RS or CUBS), after the ECCA module 2550 successfully performs an ECCA, and before the uplink management module 2555 transmits a preamble or uplink data, to synchronize a transmission timing of the apparatus 2515 with a timing of a base station or eNB configured to operate on the unlicensed radio frequency spectrum band. In some examples, the at least one full or fractional signal may be transmitted to synchronize transmissions of the apparatus 2515 to a symbol boundary (e.g., an SC-FDM symbol boundary or an OFDM symbol boundary), a slot boundary, or a subframe boundary.

In some examples, the operations performed by the ECCA module 2550 or the uplink management module 2555 may only be performed when a base station or eNB operating as a secondary serving cell for the apparatus 2515 has scheduled the apparatus 2515 to make a transmission to the base station or eNB over the unlicensed radio frequency spectrum band. In some examples, the apparatus 2515 may cause a base station or eNB to schedule the apparatus 2515 to make a transmission over the unlicensed radio frequency spectrum band by transmitting a BSR to a primary serving cell, thereby indicating to the primary serving cell how much data the apparatus 2515 has to transmit. The primary serving cell may be provided by the same base station or eNB that operates as a secondary serving cell for the apparatus 2515, or by a different base station or eNB.

In some examples, the synchronization module 2560 may be used to align a first pseudo-random number generator for the apparatus 2515 with a second pseudo-random generator for another apparatus (e.g., another UE) such that an ECCA performed by the apparatus 2515 is synchronized with an ECCA performed by the other apparatus at the beginning of an uplink period. In some examples, each of a plurality of UEs within a same operator deployment, where the UEs are scheduled for transmissions to a base station or eNB over an unlicensed radio frequency spectrum band during a frame, may align or synchronize a pseudo-random number generator used by the UE when performing an ECCA with pseudo-random number generators used by each other UE in the plurality of UEs. The synchronization of pseudo-random number generators may cause each of the plurality of UEs to contend for access to the unlicensed radio frequency spectrum band at the same time. In some examples, the aligning may be performed based at least in part on a system time.

In some examples, the synchronization module 2565 may also or alternatively be used to periodically synchronize a timing of the apparatus 2515 with a timing of a base station or eNB configured to operate on the unlicensed radio frequency spectrum band. In some examples, the synchronization may occur at one or more of a symbol boundary (e.g., an SC-FDM symbol boundary or an OFDM symbol boundary), a slot boundary, or a subframe boundary.

Figure 26:
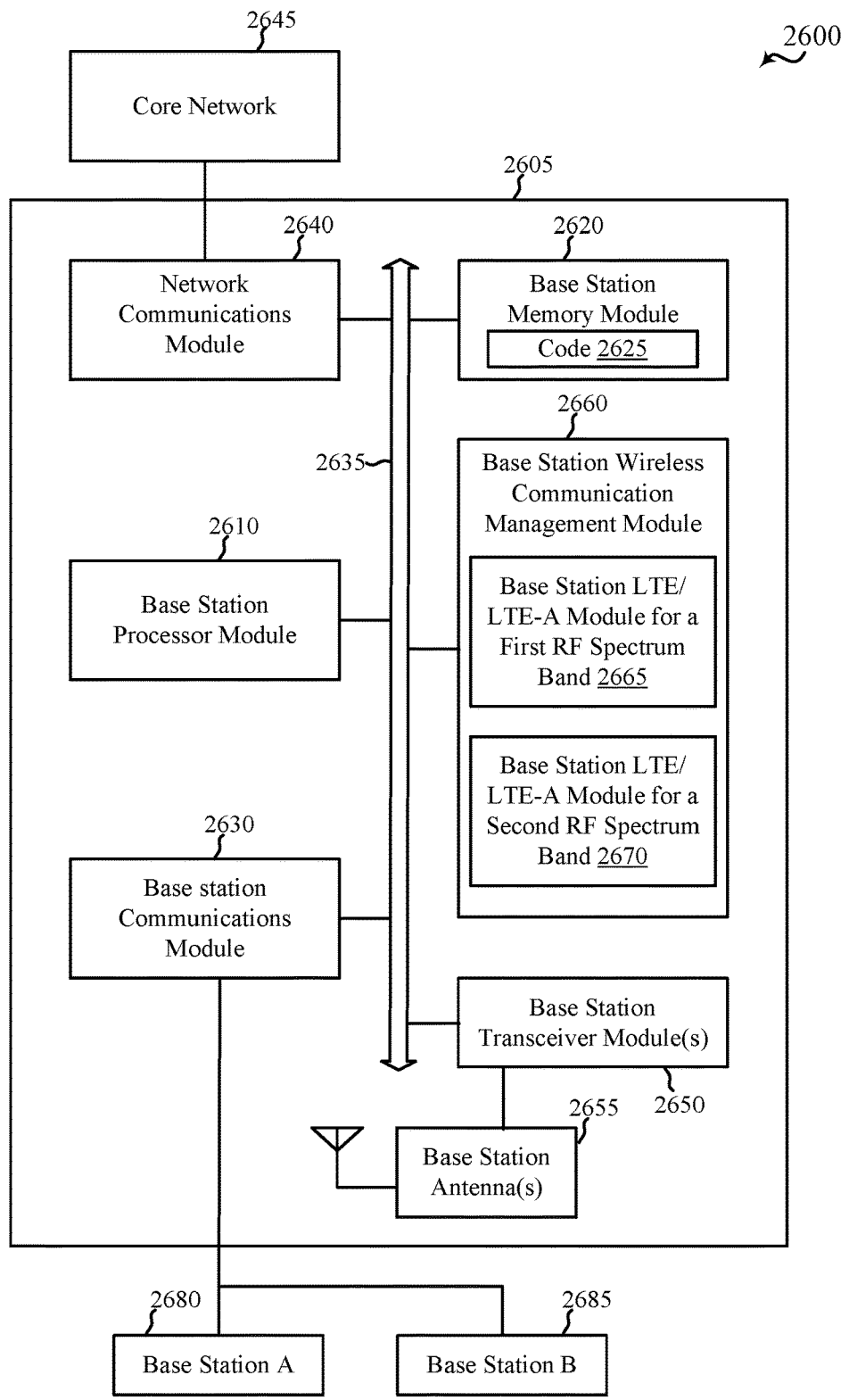
FIG. 26 shows a block diagram of a base station (e.g., a base station forming part or all of an eNB) for use in wireless communication, in accordance with various aspects of the present disclosure.

FIG. 26 shows a block diagram 2600 of a base station 2605 (e.g., a base station forming part or all of an eNB) for use in wireless communication, in accordance with various aspects of the present disclosure. In some examples, the base station 2605 may be an example of one or more aspects of the base station 105, 205, 210, 1005, or 1105 described with reference to FIG. 1, 2, 10, or 11, or one or more aspects of the apparatus 1805, 1905, 2005, or 2105 described with reference to FIG. 18, 19, 20, or 21. The base station 2605 may be configured to implement or facilitate at least some of the base station or apparatus features and functions described with reference to FIGS. 1-21.

The base station 2605 may include a base station processor module 2610, a base station memory module 2620, at least one base station transceiver module (represented by base station transceiver module(s) 2650), at least one base station antenna (represented by base station antenna(s) 2655), or a base station wireless communication management module 2660. The base station 2605 may also include one or more of a base station communications module 2630 or a network communications module 2640. Each of these components may be in communication with each other, directly or indirectly, over one or more buses 2635.

The base station memory module 2620 may include random access memory (RAM) or read-only memory (ROM). The base station memory module 2620 may store computer-readable, computer-executable code 2625 containing instructions that are configured to, when executed, cause the base station processor module 2610 to perform various functions described herein related to wireless communication (e.g., functions related to advertising a timing of uplink subframes included in a TDD configuration used by the base station 2605 when operating in an LBT-LBE mode). Alternatively, the code 2625 may not be directly executable by the base station processor module 2610 but be configured to cause the base station 2605 (e.g., when compiled and executed) to perform various of the functions described herein.

The base station processor module 2610 may include an intelligent hardware device, e.g., a central processing unit (CPU), a microcontroller, an ASIC, etc. The base station processor module 2610 may process information received through the base station transceiver module(s) 2650, the base station communications module 2630, or the network communications module 2640. The base station processor module 2610 may also process information to be sent to the transceiver module(s) 2650 for transmission through the antenna(s) 2655, to the base station communications module 2630, for transmission to one or more other base stations 2680 and 2685, or to the network communications module 2640 for transmission to a core network 2645, which may be an example of one or more aspects of the core network 130 described with reference to FIG. 1. The base station processor module 2610 may handle, alone or in connection with the base station wireless communication management module 2660, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., a radio frequency spectrum band for which apparatuses may need to contend for access because the radio frequency spectrum band is available, at least in part, for unlicensed use, such as Wi-Fi use or LTE/LTE-A use in an unlicensed radio frequency spectrum band).

The base station transceiver module(s) 2650 may include a modem configured to modulate packets and provide the modulated packets to the base station antenna(s) 2655 for transmission, and to demodulate packets received from the base station antenna(s) 2655. The base station transceiver module(s) 2650 may, in some examples, be implemented as one or more base station transmitter modules and one or more separate base station receiver modules. The base station transceiver module(s) 2650 may support communications in the first radio frequency spectrum band or the second radio frequency spectrum band. The base station transceiver module(s) 2650 may be configured to communicate bi-directionally, via the antenna(s) 2655, with one or more mobile stations or apparatuses, such as one or more of the UEs 115, 255, 260, 265, 270, 1015, or 1115 described with reference to FIG. 1, 2, 10, or 11, or one or more of the apparatus 2215, 2315, 2415, or 2515 described with reference to FIG. 22, 23, 24, or 25. The base station 2605 may, for example, include multiple base station antennas 2655 (e.g., an antenna array). The base station 2605 may communicate with the core network 2645 through the network communications module 2640. The base station 2605 may also communicate with other base stations, such as the base stations 2680 and 2685, using the base station communications module 2630.

The base station wireless communication management module 2660 may be configured to perform or control some or all of the features or functions described with reference to FIGS. 1-21 related to wireless communication over the first radio frequency spectrum band or the second radio frequency spectrum band. For example, the base station wireless communication management module 2660 may be configured to support a supplemental downlink mode, a carrier aggregation mode, or a standalone mode using the first radio frequency spectrum band or the second radio frequency spectrum band. The base station wireless communication management module 2660 may include a base station LTE/LTE-A module for the first radio frequency spectrum band 2665 configured to handle LTE/LTE-A communications in the first radio frequency spectrum band, and a base station LTE/LTE-A module for the second radio frequency spectrum band 2670 configured to handle LTE/LTE-A communications in the second radio frequency spectrum band. The base station wireless communication management module 2660, or portions of it, may include a processor, or some or all of the functions of the base station wireless communication management module 2660 may be performed by the base station processor module 2610 or in connection with the base station processor module 2610. In some examples, the base station wireless communication management module 2660 may be an example of the wireless communication management module 1820, 1920, 2020, or 2120 described with reference to FIG. 18, 19, 20, or 21.

Figure 27:
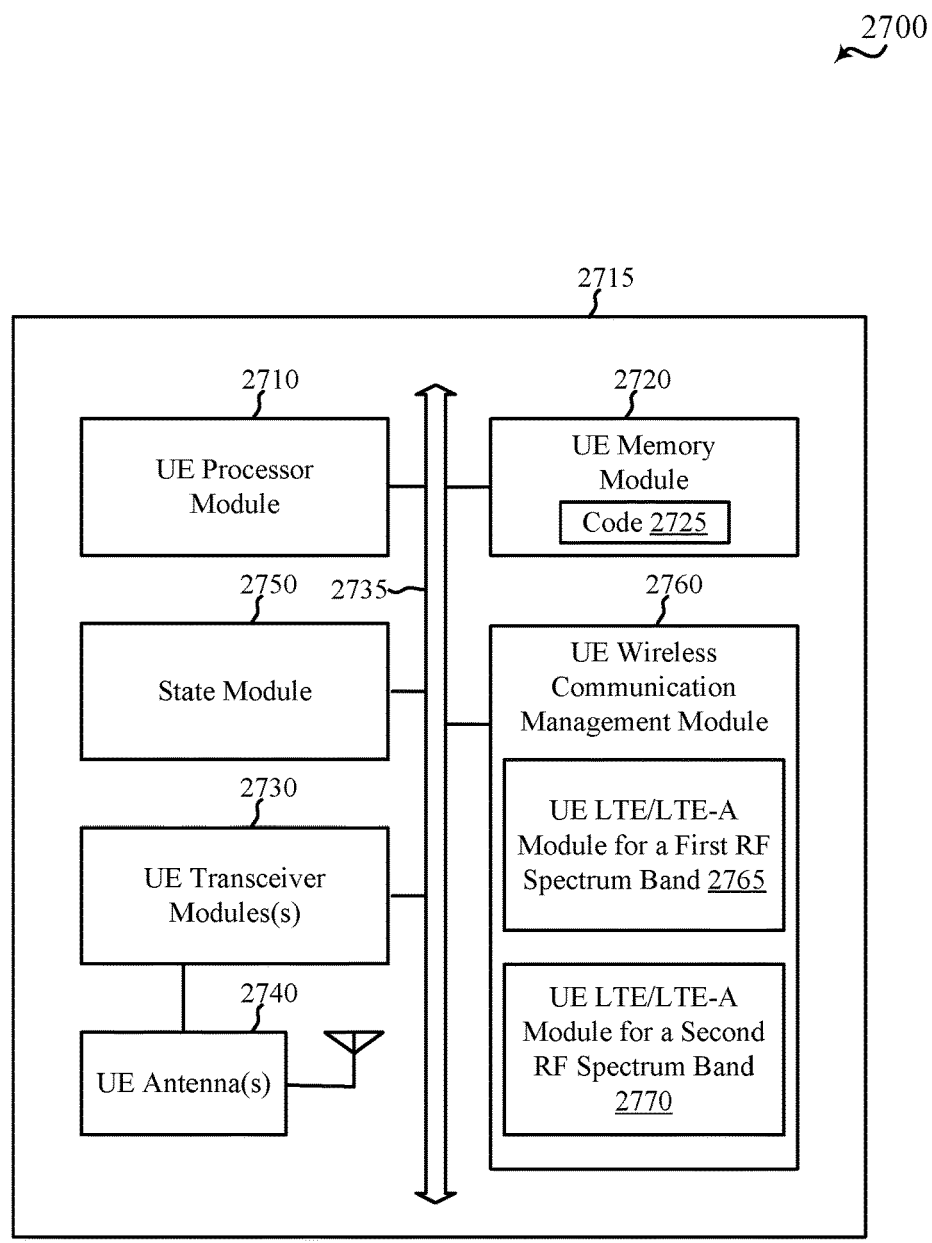
FIG. 27 shows a block diagram of a UE for use in wireless communication, in accordance with various aspects of the present disclosure.

FIG. 27 shows a block diagram 2700 of a UE 2715 for use in wireless communication, in accordance with various aspects of the present disclosure. The UE 2715 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 2715 may, in some examples, have an internal power supply (not shown), such as a small battery, to facilitate mobile operation. In some examples, the UE 2715 may be an example of one or more aspects of the UE 115, 255, 260, 265, 270, 1015, or 1115 described with reference to FIG. 1, 2, 10, or 11, or one or more aspects of the apparatus 2215, 2315, 2415, or 2515 described with reference to FIG. 22, 23, 24, or 25. The UE 2715 may be configured to implement at least some of the UE or apparatus features and functions described with reference to FIGS. 1-17 and 22-25.

The UE 2715 may include a UE processor module 2710, a UE memory module 2720, at least one UE transceiver module (represented by UE transceiver module(s) 2730), at least one UE antenna (represented by UE antenna(s) 2740), or a UE wireless communication management module 2760. Each of these components may be in communication with each other, directly or indirectly, over one or more buses 2735.

The UE memory module 2720 may include RAM or ROM. The UE memory module 2720 may store computer-readable, computer-executable code 2725 containing instructions that are configured to, when executed, cause the UE processor module 2710 to perform various functions described herein related to wireless communication (e.g., functions related to transmitting uplink data while operating in an LBT-LBE mode). Alternatively, the code 2725 may not be directly executable by the UE processor module 2710 but be configured to cause the UE 2715 (e.g., when compiled and executed) to perform various of the functions described herein.

The UE processor module 2710 may include an intelligent hardware device, e.g., a CPU, a microcontroller, an ASIC, etc. The UE processor module 2710 may process information received through the UE transceiver module(s) 2730 or information to be sent to the UE transceiver module(s) 2730 for transmission through the UE antenna(s) 2740. The UE processor module 2710 may handle, alone or in connection with the UE wireless communication management module 2760, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) or a second radio frequency spectrum band (e.g., a radio frequency spectrum band for which apparatuses may need to contend for access because the radio frequency spectrum band is available, at least in part, for unlicensed use, such as Wi-Fi use or LTE/LTE-A use in an unlicensed radio frequency spectrum band).

The UE transceiver module(s) 2730 may include a modem configured to modulate packets and provide the modulated packets to the UE antenna(s) 2740 for transmission, and to demodulate packets received from the UE antenna(s) 2740. The UE transceiver module(s) 2730 may, in some examples, be implemented as one or more UE transmitter modules and one or more separate UE receiver modules. The UE transceiver module(s) 2730 may support communications in the first radio frequency spectrum band or the second radio frequency spectrum band. The UE transceiver module(s) 2730 may be configured to communicate bi-directionally, via the UE antenna(s) 2740, with one or more of the base stations 105, 205, 210, 1005, 1105, or 2605 described with reference to FIG. 1, 2, 10, 11, or 26, or one or more of the apparatus 1805, 1905, 2005, or 2105 described with reference to FIG. 18, 19, 20, or 21. While the UE 2715 may include a single UE antenna, there may be examples in which the UE 2715 may include multiple UE antennas 2740.

The UE state module 2750 may be used, for example, to manage transitions of the UE 2715 between an RRC idle state and an RRC connected state, and may be in communication with other components of the UE 2715, directly or indirectly, over the one or more buses 2735. The UE state module 2750, or portions of it, may include a processor, or some or all of the functions of the UE state module 2750 may be performed by the UE processor module 2710 or in connection with the UE processor module 2710.

The UE wireless communication management module 2760 may be configured to perform or control some or all of the features or functions described with reference to FIGS. 1-17 and 22-25 related to wireless communication over the first radio frequency spectrum band or the second radio frequency spectrum band. For example, the UE wireless communication management module 2760 may be configured to support a supplemental downlink mode, carrier aggregation mode, or standalone mode using the first radio frequency spectrum band or the second radio frequency spectrum band. The UE wireless communication management module 2760 may include a UE LTE/LTE-A module for the first radio frequency spectrum band 2765 configured to handle LTE/LTE-A communications in the first radio frequency spectrum band, and a UE LTE/LTE-A module for the second radio frequency spectrum band 2770 configured to handle LTE/LTE-A communications in the second radio frequency spectrum band. The UE wireless communication management module 2760, or portions of it, may include a processor, or some or all of the functions of the UE wireless communication management module 2760 may be performed by the UE processor module 2710 or in connection with the UE processor module 2710. In some examples, the UE wireless communication management module 2760 may be an example of the wireless communication management module 2220, 2320, 2420, or 2520 described with reference to FIG. 22, 23, 24, or 25.

Figure 28:
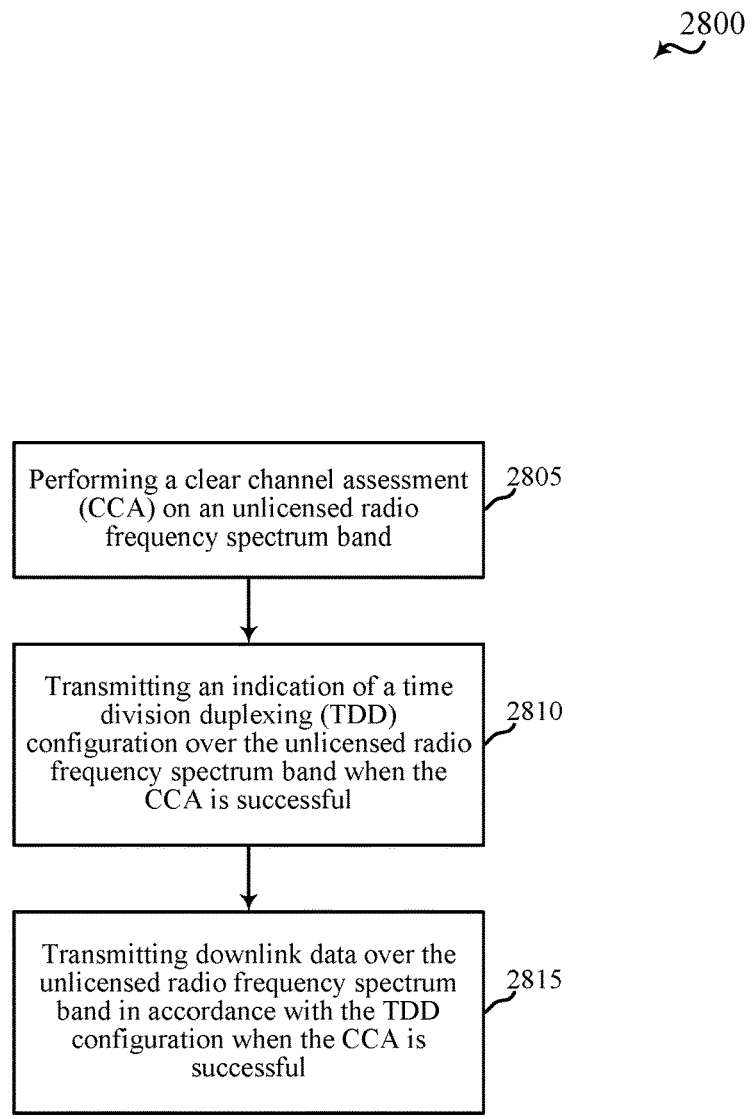
FIG. 28 is a flow chart illustrating an example of a method for wireless communication, in accordance with various aspects of the present disclosure.

FIG. 28 is a flow chart illustrating an example of a method 2800 for wireless communication, in accordance with various aspects of the present disclosure. For clarity, the method 2800 is described below with reference to aspects of one or more of the base stations 105, 205, 210, 1005, 1105, or 2605 or eNBs described with reference to FIG. 1, 2, 10, 11, or 26, or aspects of the apparatus 1805 or 1905 described with reference to FIG. 18 or 19. In some examples a base station, eNB, or apparatus may execute one or more sets of codes to control the functional elements of the base station, eNB, or apparatus to perform the functions described below. In some examples, the base station, eNB, or apparatus may perform the functions described below while operating in an LBT-LBE mode on an unlicensed radio frequency spectrum band. In some examples, the base station, eNB, or apparatus may perform the functions described below while operating as a secondary serving cell in a carrier aggregation mode for a UE.

At block 2805, the method 2800 may include performing a CCA on an unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the CCA may include an ECCA. In some examples, the CCA may be performed for a frame aligned with a periodic gating interval established for the unlicensed radio frequency spectrum band (e.g., one of the periodic gating intervals described with reference to FIG. 3). In other examples, the CCA may be performed for a frame that is not aligned with the periodic gating interval (e.g., a frame including a consecutive number of downlink subframes followed by a consecutive number of uplink subframes). The operation(s) at block 2805 may be performed using the wireless communication management module 1820, 1920, or 2660 described with reference to FIG. 18, 19, or 26, or the CCA module 1835 or ECCA module 1935 described with reference to FIG. 18 or 19.

At block 2810, the method 2800 may include transmitting, for a period following the CCA, an indication of a TDD configuration over the unlicensed radio frequency spectrum band when the CCA is successful. The indication may serve, at least in part, to advertise a timing of uplink subframes included in the TDD configuration to both serving cell UEs (e.g., UEs for which a base station or eNB performing the method 2800 functions as serving cell) and neighboring base stations or eNBs (e.g., base stations or eNBs of different operator deployments). The advertisement of the timing of uplink subframes included in the TDD configuration may cause neighboring base stations or eNBs that receive the advertisement to refrain from accessing the unlicensed radio frequency spectrum band during a transmission of the uplink subframes.

In some examples, the indication of the TDD configuration may include an indication of a consecutive number of downlink subframes, an indication of a consecutive number of uplink subframes that follow the CCA, or a grant to a UE performed at block 2805.

The operation(s) at block 2810 may be performed using the wireless communication management module 1820, 1920, or 2660 described with reference to FIG. 18, 19, or 26, or the TDD configuration management module 1840 or 1940 or the downlink management module 1845 or 1955 described with reference to FIG. 18 or 19.

At block 2815, the method 2800 may include transmitting downlink data over the unlicensed radio frequency spectrum band, in accordance with the TDD configuration, when the CCA performed at block 1605 is successful. The operation(s) at block 2815 may be performed using the wireless communication management module 1820, 1920, or 2660 described with reference to FIG. 18, 19, or 26, or the downlink management module 1845 or 1955 described with reference to FIG. 18 or 19.

Thus, the method 2800 may provide for wireless communication. It should be noted that the method 2800 is just one implementation and that the operations of the method 2800 may be rearranged or otherwise modified such that other implementations are possible.

Figure 29:
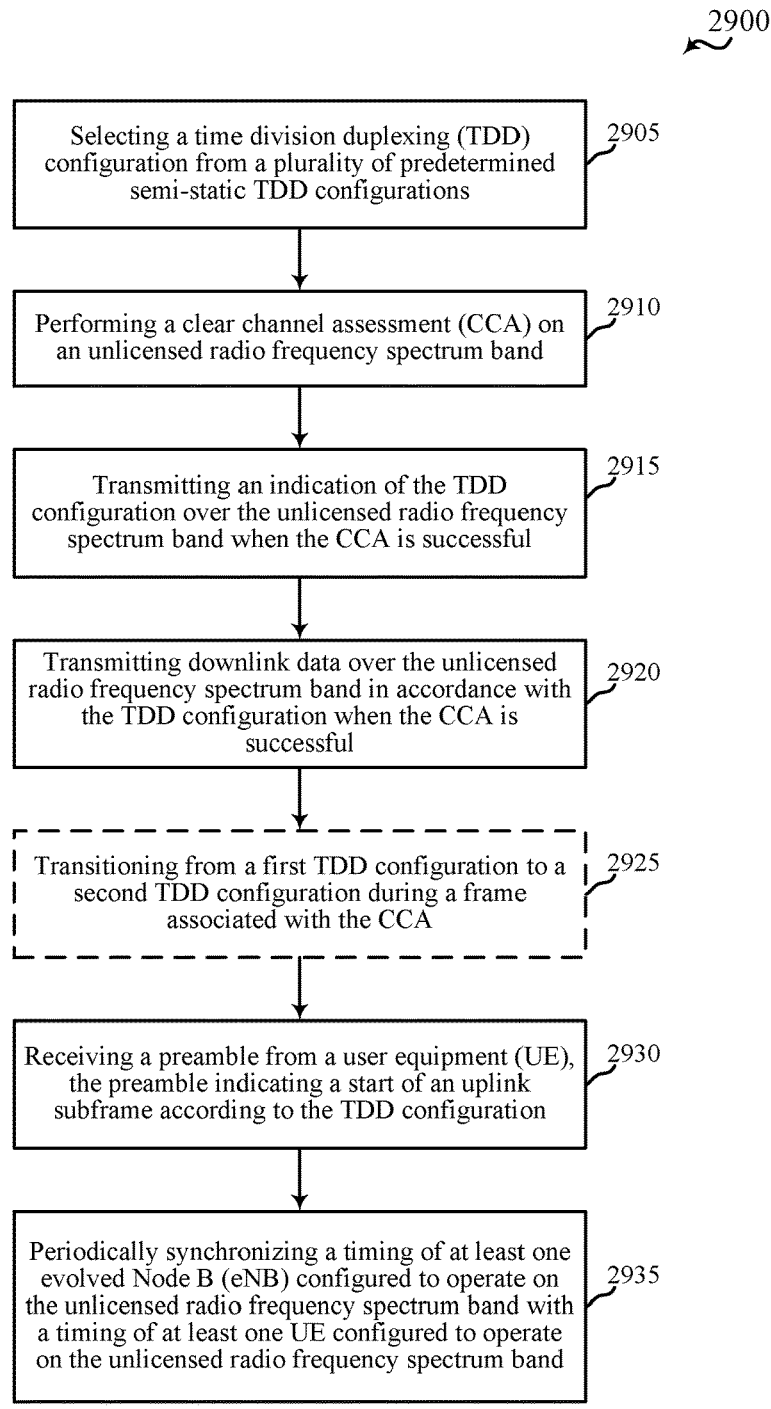
FIG. 29 is a flow chart illustrating an example of a method for wireless communication, in accordance with various aspects of the present disclosure.

FIG. 29 is a flow chart illustrating an example of a method 2900 for wireless communication, in accordance with various aspects of the present disclosure. For clarity, the method 2900 is described below with reference to aspects of one or more of the base stations 105, 205, 210, 1005, 1105, or 2605 or eNBs described with reference to FIG. 1, 2, 10, 11, or 26, or aspects of the apparatus 1805 or 1905 described with reference to FIG. 18 or 19. In some examples a base station, eNB, or apparatus may execute one or more sets of codes to control the functional elements of the base station, eNB, or apparatus to perform the functions described below. In some examples, the base station, eNB, or apparatus may perform the functions described below while operating in an LBT-LBE mode on an unlicensed radio frequency spectrum band. In some examples, the base station, eNB, or apparatus may perform the functions described below while operating as a secondary serving cell in a carrier aggregation mode for a UE.

At block 2905, the method 2900 may include selecting a TDD configuration from a plurality of predetermined semi-static TDD configurations. The operation(s) at block 2905 may be performed using the wireless communication management module 1820, 1920, or 2660 described with reference to FIG. 18, 19, or 26, the TDD configuration management module 1840 or 1940 described with reference to FIG. 18 or 19, or the TDD configuration selection module 1945 described with reference to FIG. 19.

At block 2910, the method 2900 may include performing an ECCA on an unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the ECCA may be performed for a frame aligned with a periodic gating interval established for the unlicensed radio frequency spectrum band (e.g., one of the periodic gating intervals described with reference to FIG. 3). In other examples, the ECCA may be performed for a frame that is not aligned with the periodic gating interval (e.g., a frame including a consecutive number of downlink subframes followed by a consecutive number of uplink subframes). The operation(s) at block 2905 may be performed using the wireless communication management module 1820, 1920, or 2660 described with reference to FIG. 18, 19, or 26, or the CCA module 1835 or ECCA module 1935 described with reference to FIG. 18 or 19.

At block 2915, the method 2900 may include transmitting an indication of a TDD configuration over the unlicensed radio frequency spectrum band when the ECCA is successful. The indication may serve, at least in part, to advertise a timing of uplink subframes included in the TDD configuration to both serving cell UEs (e.g., UEs for which a base station or eNB performing the method 2900 functions as serving cell) and neighboring base stations or eNBs (e.g., base stations or eNBs of different operator deployments). The advertisement of the timing of uplink subframes included in the TDD configuration may cause neighboring base stations or eNBs that receive the advertisement to refrain from accessing the unlicensed radio frequency spectrum band during a transmission of the uplink subframes.

In some examples, transmitting the indication of the TDD configuration may include transmitting an index associated with the TDD configuration selected at block 2905. In some examples, transmitting the indication of the TDD configuration may include transmitting an indication of a consecutive number of downlink subframes and a consecutive number of uplink subframes that follow the ECCA performed at block 2910. In some examples, the indication of the TDD configuration may indicate the consecutive number of downlink subframes and the consecutive number of uplink subframes that follow the ECCA performed at block 2910 by indicating a first TDD configuration and a second TDD configuration, from which a first TDD configuration and a second TDD configuration may be selected from the plurality of predetermined semi-static TDD configurations.

In some examples, the indication of the TDD configuration may be transmitted over the unlicensed radio frequency spectrum band in a first downlink subframe of the frame associated with the ECCA. In other examples, the indication of the TDD configuration may be transmitted over the unlicensed radio frequency spectrum band in any or each downlink subframe of the frame associated with the ECCA.

The operation(s) at block 2915 may be performed using the wireless communication management module 1820, 1920, or 2660 described with reference to FIG. 18, 19, or 26, or the TDD configuration management module 1840 or 1940 or the downlink management module 1845 or 1955 described with reference to FIG. 18 or 19.

At block 2920, the method 2900 may include transmitting downlink data over the unlicensed radio frequency spectrum band, in accordance with the TDD configuration, when the ECCA performed at block 2910 is successful. In some examples, a base station or eNB may transmit at least one full or fractional signal (e.g., a full or fractional RS or CUBS), after successfully performing the ECCA at block 2910, and before transmitting the indication of the TDD configuration or the downlink data at block 2915 or 2920, to synchronize a transmission timing of the base station or eNB with a timing of at least one UE configured to operate on the unlicensed radio frequency spectrum band. In some examples, the at least one full or fractional signal may be transmitted to synchronize transmissions of the base station or eNB to a symbol boundary, a slot boundary, or a subframe boundary. The operation(s) at block 2920 may be performed using the wireless communication management module 1820, 1920, or 2660 described with reference to FIG. 18, 19, or 26, or the downlink management module 1845 or 1955 described with reference to FIG. 18 or 19.

At block 2925, and in examples of the method 2900 in which the ECCA performed at block 2910 is performed for a frame that is not aligned with a periodic gating interval established for the unlicensed radio frequency spectrum band, the method 2900 may include transitioning from a first TDD configuration to a second TDD configuration during the frame. In examples of the method 2900 which include transitioning from a first TDD configuration to a second TDD configuration during a frame associated with the ECCA performed at block 2910, the indication transmitted at block 2915 may indicate both the first TDD configuration and the second TDD configuration. The operation(s) at block 2925 may be performed using the wireless communication management module 1820, 1920, or 2660 described with reference to FIG. 18, 19, or 26, the TDD configuration management module 1840 or 1940 described with reference to FIG. 18 or 19, or the TDD transition management module 1950 described with reference to FIG. 19. In examples of the method 2900 in which the ECCA performed at block 2910 is performed for a frame aligned with a periodic gating interval established for the unlicensed radio frequency spectrum band, the operation(s) at block 2925 may not be performed.

At block 2930, the method 2900 may include receiving a preamble from a UE. The preamble may indicate a start of an uplink subframe according to the TDD configuration. The operation(s) at block 2930 may be performed using the wireless communication management module 1820, 1920, or 2660 described with reference to FIG. 18, 19, or 26, or the uplink management module 1960 described with reference to FIG. 19.

At block 2935, the method 2900 may include periodically synchronizing a timing of at least one base station or eNB configured to operate on the unlicensed radio frequency spectrum band with a timing of at least one UE configured to operate on the unlicensed radio frequency spectrum band. In some examples, the synchronization may occur at one or more of a symbol boundary (e.g., an OFDM symbol boundary), a slot boundary, or a subframe boundary. In FIG. 29, the synchronization is shown to occur after the operation(s) at block 2930. In other examples, the synchronization may occur at other times before, during, or after the operations of the method 2900. The operation(s) at block 2935 may be performed using the wireless communication management module 1820, 1920, or 2660 described with reference to FIG. 18, 19, or 26, or the synchronization module 1965 described with reference to FIG. 19.

Thus, the method 2900 may provide for wireless communication. It should be noted that the method 2900 is just one implementation and that the operations of the method 2900 may be rearranged or otherwise modified such that other implementations are possible.

Figure 30:
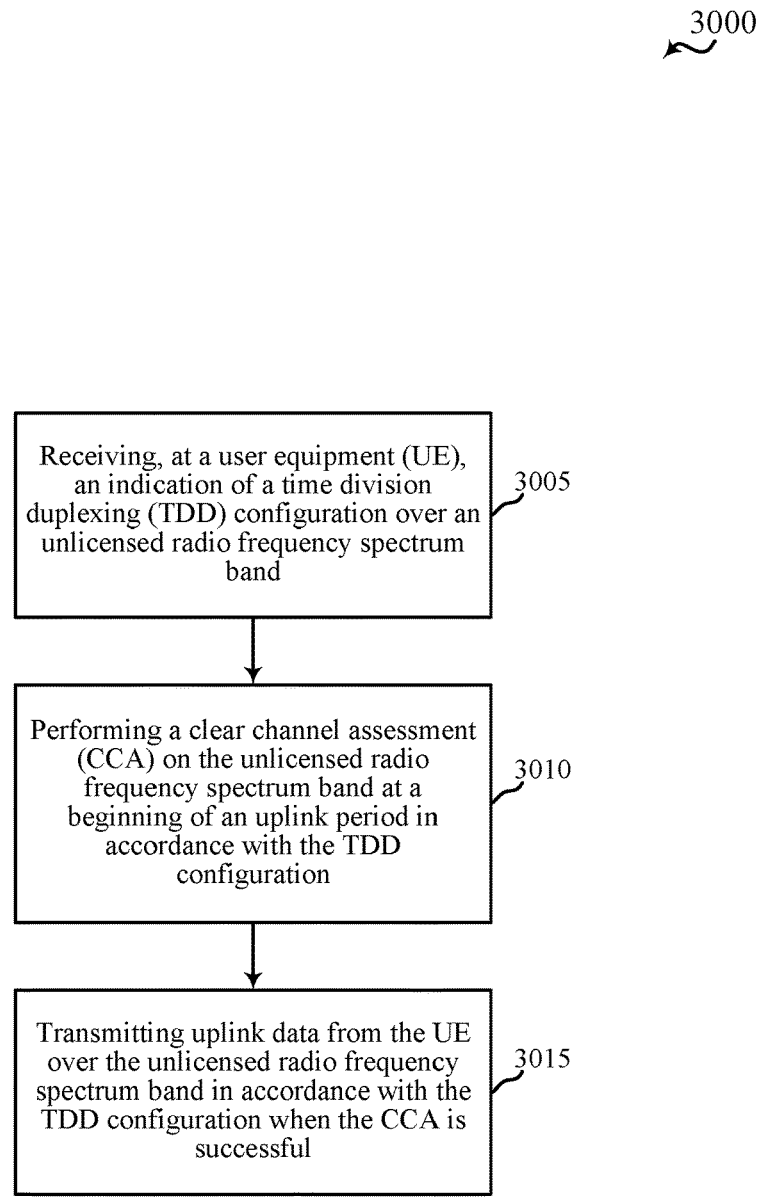
FIG. 30 is a flow chart illustrating an example of a method for wireless communication, in accordance with various aspects of the present disclosure.

FIG. 30 is a flow chart illustrating an example of a method 3000 for wireless communication, in accordance with various aspects of the present disclosure. For clarity, the method 3000 is described below with reference to aspects of one or more of the UEs 115, 255, 260, 265, 270, 1015, 1115, or 2715 described with reference to FIG. 1, 2, 10, 11, or 27, or aspects of the apparatus 2215 or 2315 described with reference to FIG. 22 or 23. In some examples a UE or apparatus may execute one or more sets of codes to control the functional elements of the UE or apparatus to perform the functions described below. In some examples, the UE or apparatus may perform the functions described below while operating in an LBT-LBE mode on an unlicensed radio frequency spectrum band. In some examples, the UE or apparatus may perform the functions described below while communicating with a base station or eNB operating as a secondary serving cell in a carrier aggregation mode for the UE.

At block 3005, the method 3000 may include receiving, at a UE, an indication of a TDD configuration over an unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the indication of the TDD configuration may include an indication of a consecutive number of downlink subframes, an indication of a consecutive number of uplink subframes during a frame, or a grant associated with an unlicensed radio frequency spectrum band. The operation(s) at block 3010 may be performed using the wireless communication management module 2220, 2320, or 2760 described with reference to FIG. 22, 23, or 27, or the TDD configuration management module 2235 or 2335 described with reference to FIG. 22 or 23.

At block 3010, the method 3000 may include performing a CCA on the unlicensed radio frequency spectrum band at a beginning of an uplink period in accordance with the TDD configuration. In some examples, the CCA may include an ECCA. The operation(s) at block 3010 may be performed using the wireless communication management module 2220, 2320, or 2760 described with reference to FIG. 22, 23, or 27, or the CCA module 2240 or ECCA module 2355 described with reference to FIG. 22 or 23.

At block 3015, the method 3000 may include transmitting uplink data from the UE over the unlicensed radio frequency spectrum band in accordance with the TDD configuration when the CCA is successful. The operation(s) at block 3015 may be performed using the wireless communication management module 2220, 2320, or 2760 described with reference to FIG. 22, 23, or 27, or the uplink management module 2245 or 2360 described with reference to FIG. 22 or 23.

In some examples, the operations performed at block 3010 or 3015 may only be performed by a UE when a base station or eNB operating as a secondary serving cell for the UE has scheduled the UE to make a transmission to the base station or eNB over the unlicensed radio frequency spectrum band. In some examples, the UE may cause a base station or eNB to schedule the UE to make a transmission over the unlicensed radio frequency spectrum band by transmitting a BSR to a primary serving cell, thereby indicating to the primary serving cell how much data the UE has to transmit. The primary serving cell may be provided by the same base station or eNB that operates as a secondary serving cell for the UE, or by a different base station or eNB.

Thus, the method 3000 may provide for wireless communication. It should be noted that the method 3000 is just one implementation and that the operations of the method 3000 may be rearranged or otherwise modified such that other implementations are possible.

Figure 31:
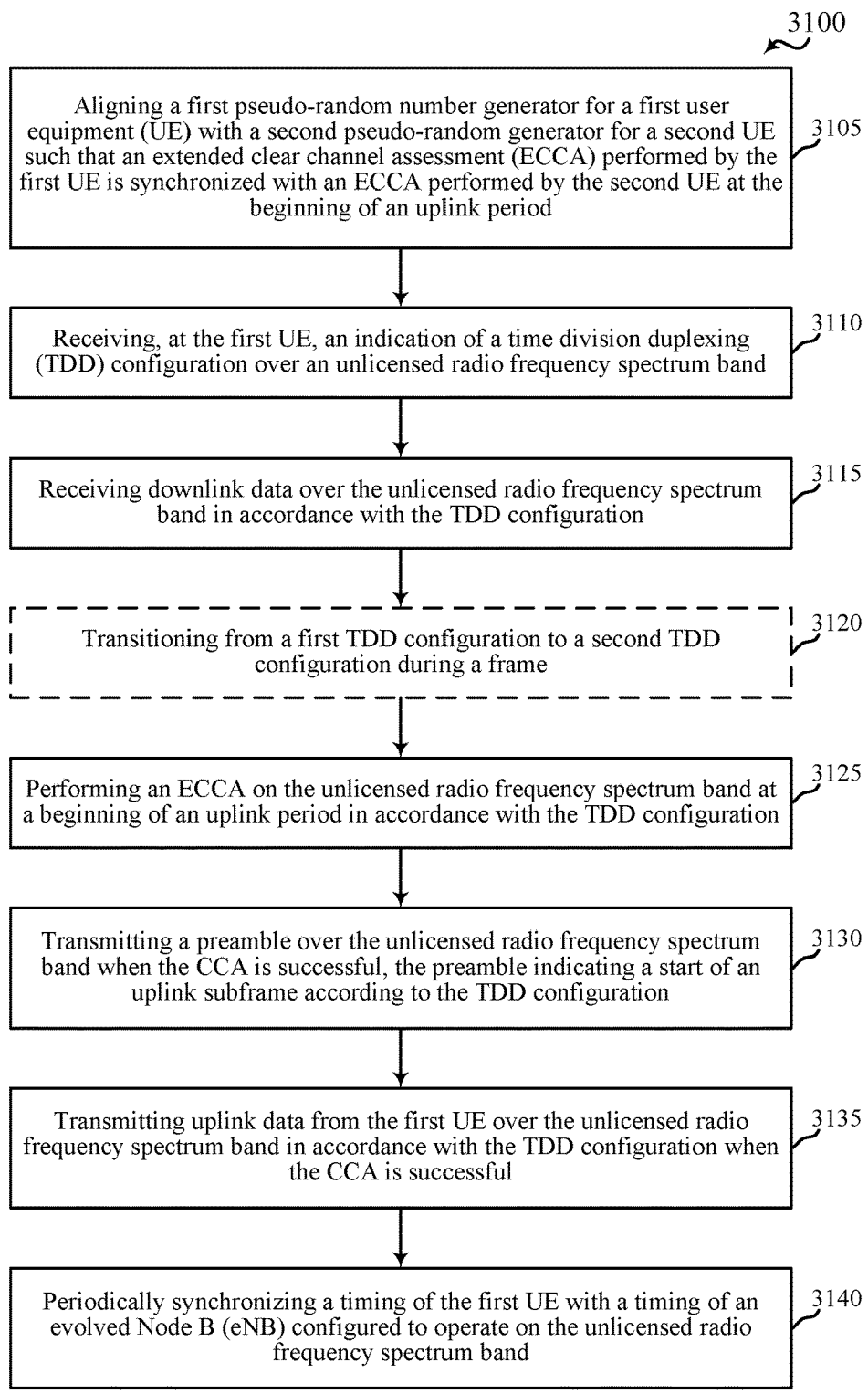
FIG. 31 is a flow chart illustrating an example of a method for wireless communication, in accordance with various aspects of the present disclosure.

FIG. 31 is a flow chart illustrating an example of a method 3100 for wireless communication, in accordance with various aspects of the present disclosure. For clarity, the method 2800 is described below with reference to aspects of one or more of the UEs 115, 255, 260, 265, 270, 1015, 1115, or 2715 described with reference to FIG. 1, 2, 10, 11, or 27, or aspects of the apparatus 2215 or 2315 described with reference to FIG. 22 or 23. In some examples a UE or apparatus may execute one or more sets of codes to control the functional elements of the UE or apparatus to perform the functions described below. In some examples, the UE or apparatus may perform the functions described below while operating in an LBT-LBE mode on an unlicensed radio frequency spectrum band.

At block 3105, the method 3100 may include aligning a first pseudo-random number generator for a first UE with a second pseudo-random number generator for a second UE such that an ECCA performed by the first UE is synchronized with an ECCA performed by the second UE at the beginning of an uplink period. In some examples, each of a plurality of UEs within a same operator deployment, where the UEs are scheduled for transmissions to a base station or eNB over an unlicensed radio frequency spectrum band during a frame, may align or synchronize a pseudo-random number generator used by the UE when performing an ECCA with pseudo-random number generators used by each other UE in the plurality of UEs. The synchronization of pseudo-random number generators may cause each of the plurality of UEs to contend for access to the unlicensed radio frequency spectrum band at the same time. In some examples, the aligning may be performed based at least in part on a system time. The operation(s) at block 3105 may be performed using the wireless communication management module 2220, 2320, or 2760 described with reference to FIG. 22, 23, or 27, or the synchronization module 2365 described with reference to FIG. 23.

At block 3110, the method 3100 may include receiving, at the first UE, an indication of a TDD configuration over an unlicensed radio frequency spectrum band. In some examples, the TDD configuration may include a semi-static TDD configuration selected (e.g., by a base station or eNB) from a plurality of predetermined semi-static TDD configurations. In some examples, the indication of the TDD configuration may include an index associated with the semi-static TDD configuration. In some examples, the indication of the TDD configuration may include an indication of a consecutive number of downlink subframes and a consecutive number of uplink subframes during a frame (e.g., a frame of wireless communications over the unlicensed radio frequency spectrum band). In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the indication of the TDD configuration may be received over the unlicensed radio frequency spectrum band in a first downlink subframe of a frame to which the indication of the TDD configuration applies. In some examples, the indication of the TDD configuration may be received over the unlicensed radio frequency spectrum band in any or each downlink subframe of a frame to which the indication of the TDD configuration applies. The operation(s) at block 3110 may be performed using the wireless communication management module 2220, 2320, or 2760 described with reference to FIG. 22, 23, or 27, the TDD configuration management module 2235 or 2335 described with reference to FIG. 22 or 23, or the TDD configuration indication processing module 2340 described with reference to FIG. 23.

At block 3115, the method 3100 may include receiving downlink data over the unlicensed radio frequency spectrum band in accordance with the TDD configuration. The operation(s) at block 3115 may be performed using the wireless communication management module 2220, 2320, or 2760 described with reference to FIG. 22, 23, or 27, or the downlink management module 2350 described with reference to FIG. 23.

In some example, the indication of the TDD configuration received at block 3110 may indicate a first TDD configuration and a second TDD configuration for a frame to which the indication of the TDD configuration applies. In these examples, and at block 3120, the method 3100 may include transitioning from the first TDD configuration to the second TDD configuration during the frame to which the indication of the TDD configuration applies. The operation(s) at block 3120 may be performed using the wireless communication management module 2220, 2320, or 2760 described with reference to FIG. 22, 23, or 27, the TDD configuration management module 2235 or 2335 described with reference to FIG. 22 or 23, or the TDD transition management module 2345 described with reference to FIG. 23.

At block 3125, the method 3100 may include performing an ECCA on the unlicensed radio frequency spectrum band at a beginning of an uplink period in accordance with the TDD configuration. The operation(s) at block 3125 may be performed using the wireless communication management module 2220, 2320, or 2760 described with reference to FIG. 22, 23, or 27, or the CCA module 2240 or ECCA module 2355 described with reference to FIG. 22 or 23.

At block 3130, the method 3100 may include transmitting a preamble over the unlicensed radio frequency spectrum band when the ECCA is successful. The preamble may indicate a start of an uplink subframe according to the TDD configuration.

At block 3135, the method 3100 may include transmitting uplink data from the UE over the unlicensed radio frequency spectrum band in accordance with the TDD configuration when the ECCA is successful. In some examples, the preamble transmitted at block 3130 may be transmitted in an uplink subframe along with part or all of the uplink data.

In some examples, a UE may transmit at least one full or fractional signal (e.g., a full or fractional RS or CUBS), after successfully performing the ECCA at block 3125, and before transmitting the preamble or uplink data at block 3130 or 3135, to synchronize a transmission timing of the UE to a timing of a base station or eNB configured to operate on the unlicensed radio frequency spectrum band. In some examples, the at least one full or fractional signal may be transmitted to synchronize transmissions of the UE to a symbol boundary (e.g., an SC-FDM symbol boundary or an OFDM symbol boundary), a slot boundary, or a subframe boundary. The operation(s) at block 3130 or 3135 may be performed using the wireless communication management module 2220, 2320, or 2760 described with reference to FIG. 22, 23, or 27, or the uplink management module 2245 or 2360 described with reference to FIG. 22 or 23.

In some examples, the operations performed at block 3125, 3130, or 3135 may only be performed by a UE when a base station or eNB operating as a secondary serving cell for the UE has scheduled the UE to make a transmission to the base station or eNB over the unlicensed radio frequency spectrum band. In some examples, the UE may cause a base station or eNB to schedule the UE to make a transmission over the unlicensed radio frequency spectrum band by transmitting a BSR to a primary serving cell, thereby indicating to the primary serving cell how much data the UE has to transmit. The primary serving cell may be provided by the same base station or eNB that operates as a secondary serving cell for the UE, or by a different base station or eNB.

At block 3140, the method 3100 may include periodically synchronizing a timing of the first UE with a timing of an eNB configured to operate on the unlicensed radio frequency spectrum band. In some examples, the synchronization may occur at one or more of a symbol boundary (e.g., an SC-FDM symbol boundary or an OFDM symbol boundary), a slot boundary, or a subframe boundary. In FIG. 31, the synchronization is shown to occur after the operation(s) at block 3135. In other examples, the synchronization may occur at other times before, during, or after the operations of the method 3100. The operation(s) at block 3140 may be performed using the wireless communication management module 2220, 2320, or 2760 described with reference to FIG. 22, 23, or 27, or the synchronization module 2365 described with reference to FIG. 23.

Thus, the method 3100 may provide for wireless communication. It should be noted that the method 3100 is just one implementation and that the operations of the method 3100 may be rearranged or otherwise modified such that other implementations are possible.

Figure 32:
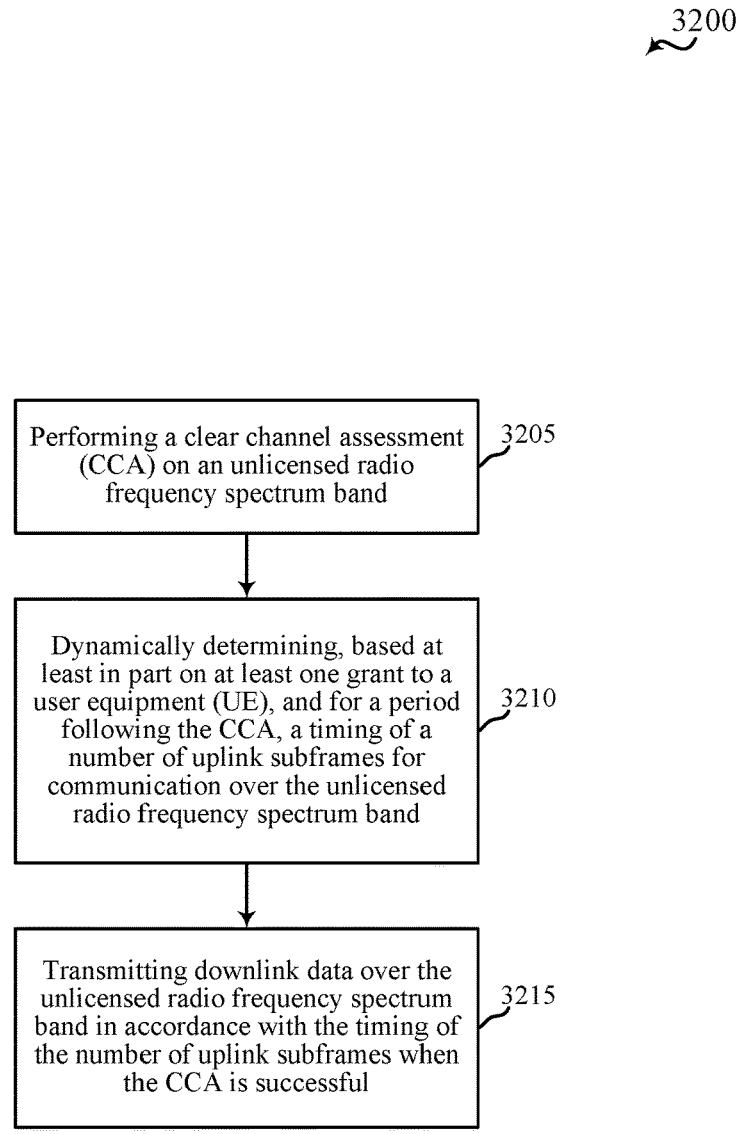
FIG. 32 is a flow chart illustrating an example of a method for wireless communication, in accordance with various aspects of the present disclosure.

FIG. 32 is a flow chart illustrating an example of a method 3200 for wireless communication, in accordance with various aspects of the present disclosure. For clarity, the method 3200 is described below with reference to aspects of one or more of the base stations 105, 205, 210, 1005, 1105, or 2605 or eNBs described with reference to FIG. 1, 2, 10, 11, or 26, or aspects of the apparatus 2005 or 2105 described with reference to FIG. 20 or 21. In some examples a base station, eNB, or apparatus may execute one or more sets of codes to control the functional elements of the base station, eNB, or apparatus to perform the functions described below. In some examples, the base station, eNB, or apparatus may perform the functions described below while operating in an LBT-LBE mode on an unlicensed radio frequency spectrum band. In some examples, the base station, eNB, or apparatus may perform the functions described below while operating as a secondary serving cell in a carrier aggregation mode for a UE.

At block 3205, the method 3200 may include performing a CCA on an unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the CCA may include an ECCA. The operation(s) at block 3205 may be performed using the wireless communication management module 2020, 2120, or 2660 described with reference to FIG. 20, 21, or 26, or the CCA module 2035 or ECCA module 2135 described with reference to FIG. 20 or 21.

At block 3210, the method 3200 may include dynamically determining, based at least in part on at least one grant to a UE, a timing of a number of uplink subframes for communication over the unlicensed radio frequency spectrum band. In some examples, the at least one grant may correspond to a period (e.g., one or more frames) having a plurality of subframes, in which a first portion of the plurality of subframes in the period is semi-statically configured for downlink use and a remaining portion of the plurality of subframes in the period is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both. The operation(s) at block 3210 may be performed using the wireless communication management module 2020, 2120, or 2660 described with reference to FIG. 20, 21, or 26, or the uplink subframe timing determination module 2040 or 2145 described with reference to FIG. 20 or 21.

At block 3215, the method 3200 may include transmitting downlink data over the unlicensed radio frequency spectrum band in accordance with the timing of the number of uplink subframes when the CCA performed at block 3205 is successful. The operation(s) at block 3215 may be performed using the wireless communication management module 2020, 2120, or 2660 described with reference to FIG. 20, 21, or 26, or the downlink management module 2045 or 2155 described with reference to FIG. 20 or 21.

Thus, the method 3200 may provide for wireless communication. It should be noted that the method 3200 is just one implementation and that the operations of the method 3200 may be rearranged or otherwise modified such that other implementations are possible.

Figure 33:
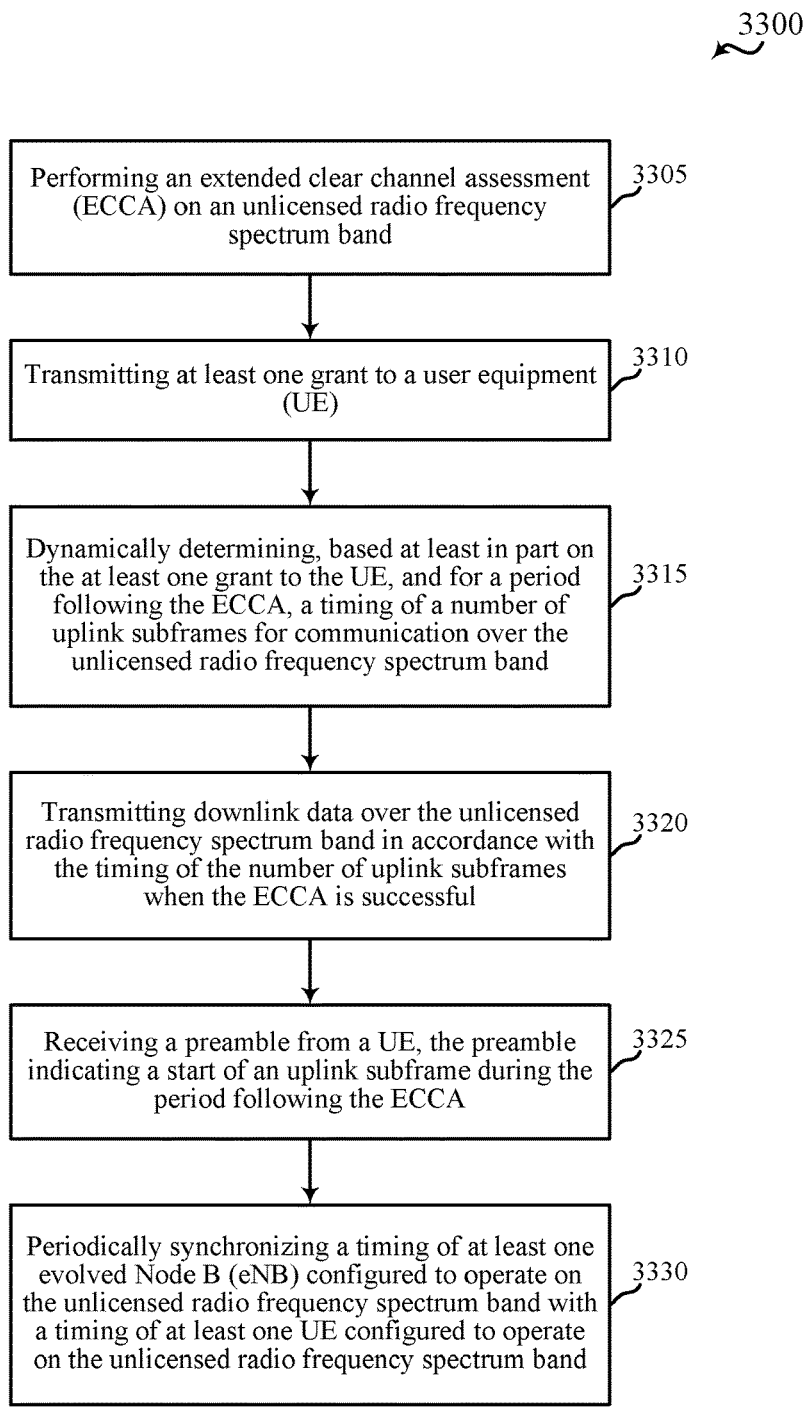
FIG. 33 is a flow chart illustrating an example of a method for wireless communication, in accordance with various aspects of the present disclosure.

FIG. 33 is a flow chart illustrating an example of a method 3300 for wireless communication, in accordance with various aspects of the present disclosure. For clarity, the method 3300 is described below with reference to aspects of one or more of the base stations 105, 205, 210, 1005, 1105, or 2605 or eNBs described with reference to FIG. 1, 2, 10, 11, or 26, or aspects of the apparatus 2005 or 2105 described with reference to FIG. 20 or 21. In some examples a base station, eNB, or apparatus may execute one or more sets of codes to control the functional elements of the base station, eNB, or apparatus to perform the functions described below. In some examples, the base station, eNB, or apparatus may perform the functions described below while operating in an LBT-LBE mode on an unlicensed radio frequency spectrum band. In some examples, the base station, eNB, or apparatus may perform the functions described below while operating as a secondary serving cell in a carrier aggregation mode for a UE.

At block 3305, the method 3300 may include performing an ECCA on an unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). The operation(s) at block 3305 may be performed using the wireless communication management module 2020, 2120, or 2660 described with reference to FIG. 20, 21, or 26, or the CCA module 2035 or ECCA module 2135 described with reference to FIG. 20 or 21.

At block 3310, the method 3300 may include transmitting at least one grant to a UE. The at least one grant may be associated with the unlicensed radio frequency spectrum band. In some examples, the at least one grant may correspond to a period (e.g., one or more frames) having a plurality of subframes, in which a first portion of the plurality of subframes in the period is semi-statically configured for downlink use and a remaining portion of the plurality of subframes in the period is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both. The operation(s) at block 3310 may be performed using the wireless communication management module 2020, 2120, or 2660 described with reference to FIG. 20, 21, or 26, or the grant transmission module 2140 described with reference to FIG. 21.

At block 3315, the method 3300 may include dynamically determining, based at least in part on at least one grant to a UE, and for a period following the CCA, a timing of a number of uplink subframes for communication over the unlicensed radio frequency spectrum band. The operation(s)

at block 3315 may be performed using the wireless communication management module 2020, 2120, or 2660 described with reference to FIG. 20, 21, or 26, or the uplink subframe timing determination module 2040 or 2145 described with reference to FIG. 20 or 21.

At block 3320, the method 3300 may include transmitting downlink data over the unlicensed radio frequency spectrum band in accordance with the timing of the number of uplink subframes when the CCA performed at block 3305 is successful. In some examples, a base station or eNB may transmit at least one full or fractional signal (e.g., a full or fractional RS or CUBS), after successfully performing the ECCA at block 3305, and before transmitting the downlink data at block 3320, to synchronize a transmission timing of the base station or eNB with a timing of at least one UE configured to operate on the unlicensed radio frequency spectrum band. In some examples, the at least one full or fractional signal may be transmitted to synchronize transmissions of the base station or eNB to a symbol boundary, a slot boundary, or a subframe boundary. The operation(s) at block 3320 may be performed using the wireless communication management module 2020, 2120, or 2660 described with reference to FIG. 20, 21, or 26, or the downlink management module 2045 or 2155 described with reference to FIG. 20 or 21.

At block 3325, the method 3300 may include receiving a preamble from a UE. The preamble may indicate a start of an uplink subframe during the period following the CCA. The operation(s) at block 3325 may be performed using the wireless communication management module 2020, 2120, or 2660 described with reference to FIG. 20, 21, or 26, or the uplink management module 2160 described with reference to FIG. 21.

At block 3330, the method 3300 may include periodically synchronizing a timing of at least one base station or eNB configured to operate on the unlicensed radio frequency spectrum band with a timing of at least one UE configured to operate on the unlicensed radio frequency spectrum band. In some examples, the synchronization may occur at one or more of a symbol boundary (e.g., an OFDM symbol boundary), a slot boundary, or a subframe boundary. In FIG. 33, the synchronization is shown to occur after the operation(s) at block 3325. In other examples, the synchronization may occur at other times before, during, or after the operations of the method 3300. The operation(s) at block 3330 may be performed using the wireless communication management module 2020, 2120, or 2660 described with reference to FIG. 20, 21, or 26, or the synchronization module 2165 described with reference to FIG. 21.

Thus, the method 3300 may provide for wireless communication. It should be noted that the method 3300 is just one implementation and that the operations of the method 3300 may be rearranged or otherwise modified such that other implementations are possible.

Figure 34:
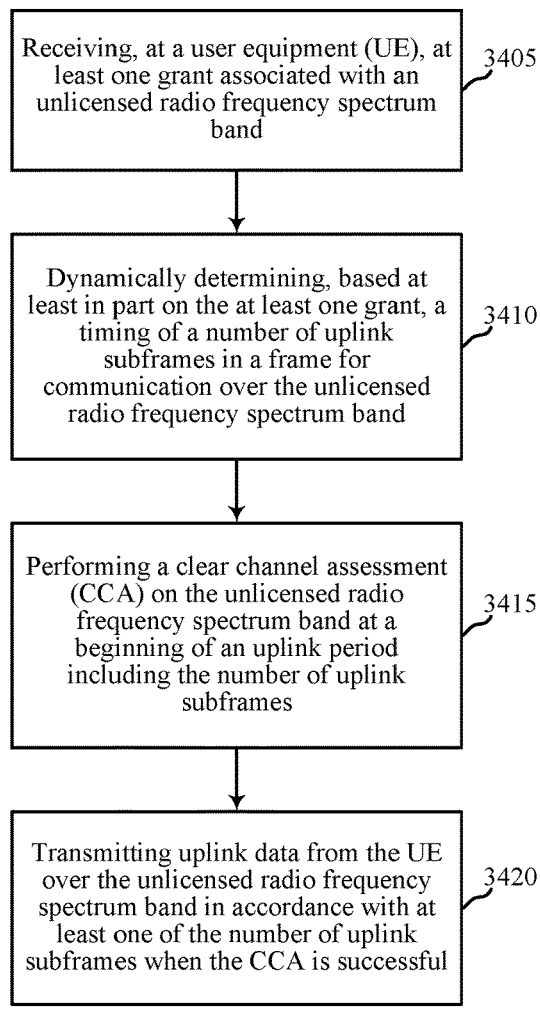
FIG. 34 is a flow chart illustrating an example of a method for wireless communication, in accordance with various aspects of the present disclosure.

FIG. 34 is a flow chart illustrating an example of a method 3400 for wireless communication, in accordance with various aspects of the present disclosure. For clarity, the method 3400 is described below with reference to aspects of one or more of the UEs 115, 255, 260, 265, 270, 1015, 1115, or 2715 described with reference to FIG. 1, 2, 10, 11, or 27, or aspects of the apparatus 2415 or 2515 described with reference to FIG. 24 or 25. In some examples a UE or apparatus may execute one or more sets of codes to control the functional elements of the UE or apparatus to perform the functions described below. In some examples, the UE or apparatus may perform the functions described below while operating in an LBT-LBE mode on an unlicensed radio frequency spectrum band. In some examples, the UE or apparatus may perform the functions described below while communicating with a base station or eNB operating as a secondary serving cell in a carrier aggregation mode for the UE.

At block 3405, the method 3400 may include receiving, at a UE, at least one grant associated with an unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the at least one grant may correspond to a frame having a plurality of subframes, in which a first portion of the plurality of subframes in the frame is semi-statically configured for downlink use and a remaining portion of the plurality of subframes in the frame is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both. The operation(s) at block 3405 may be performed using the wireless communication management module 2420, 2520, or 2760 described with reference to FIG. 24, 25, or 27, or the TDD configuration management module 2435 or 2535 described with reference to FIG. 24 or 25.

At block 3410, the method 3400 may include dynamically determining, based at least in part on the at least one grant, a timing of a number of uplink subframes for communication over the unlicensed radio frequency spectrum band. The operation(s) at block 3410 may be performed using the wireless communication management module 2420, 2520, or 2760 described with reference to FIG. 24, 25, or 27, or the uplink subframe timing determination module 2435 or 2535 described with reference to FIG. 24 or 25.

At block 3415, the method 3400 may include performing a CCA on the unlicensed radio frequency spectrum band at a beginning of an uplink period including the number of uplink subframes. In some examples, the CCA may include an ECCA. The operation(s) at block 3415 may be performed using the wireless communication management module 2420, 2520, or 2760 described with reference to FIG. 24, 25, or 27, or the CCA module 2440 or ECCA module 2550 described with reference to FIG. 24 or 25.

At block 3420, the method 3400 may include transmitting uplink data from the UE over the unlicensed radio frequency spectrum band in accordance with at least one of the number of uplink subframes when the CCA is successful. The operation(s) at block 3420 may be performed using the wireless communication management module 2420, 2520, or 2760 described with reference to FIG. 24, 25, or 27, or the uplink management module 2445 or 2555 described with reference to FIG. 24 or 25.

In some examples, the operations performed at block 3415 or 3420 may only be performed by a UE when a base station or eNB operating as a secondary serving cell for the UE has scheduled the UE to make a transmission to the base station or eNB over the unlicensed radio frequency spectrum band. In some examples, the UE may cause a base station or eNB to schedule the UE to make a transmission over the unlicensed radio frequency spectrum band by transmitting a BSR to a primary serving cell, thereby indicating to the primary serving cell how much data the UE has to transmit. The primary serving cell may be provided by the same base station or eNB that operates as a secondary serving cell for the UE, or by a different base station or eNB.

Thus, the method 3400 may provide for wireless communication. It should be noted that the method 3400 is just one implementation and that the operations of the method 3400 may be rearranged or otherwise modified such that other implementations are possible.

Figure 35:
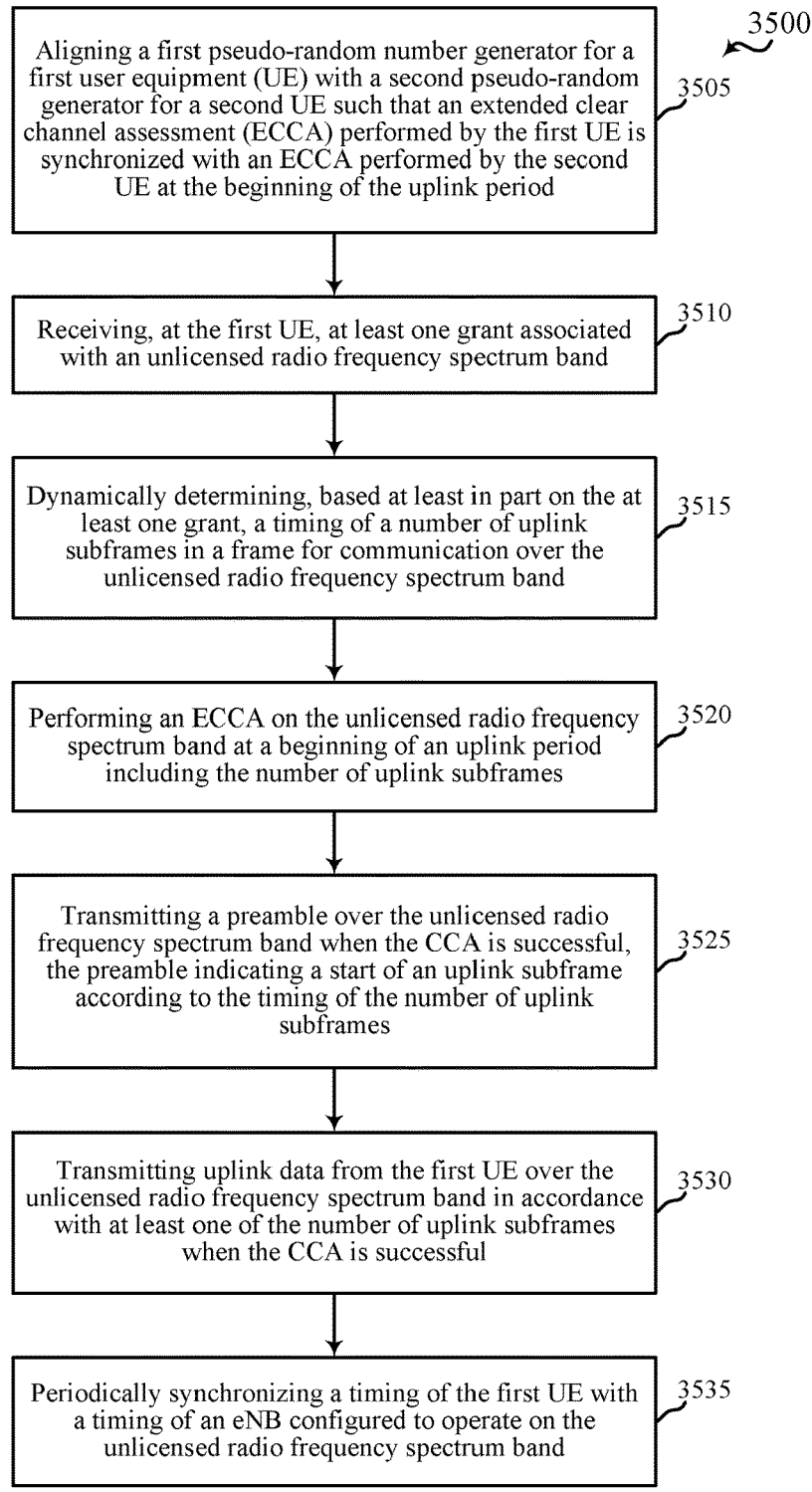
FIG. 35 is a flow chart illustrating an example of a method for wireless communication, in accordance with various aspects of the present disclosure.

FIG. 35 is a flow chart illustrating an example of a method 3500 for wireless communication, in accordance with various aspects of the present disclosure. For clarity, the method 2800 is described below with reference to aspects of one or more of the UEs 115, 255, 260, 265, 270, 1015, 1115, or 2715 described with reference to FIG. 1, 2, 10, 11, or 27, or aspects of the apparatus 2415 or 2515 described with reference to FIG. 24 or 25. In some examples a UE or apparatus may execute one or more sets of codes to control the functional elements of the UE or apparatus to perform the functions described below. In some examples, the UE or apparatus may perform the functions described below while operating in an LBT-LBE mode on an unlicensed radio frequency spectrum band.

At block 3505, the method 3500 may include aligning a first pseudo-random number generator for a first UE with a second pseudo-random generator for a second UE such that an ECCA performed by the first UE is synchronized with an ECCA performed by the second UE at the beginning of an uplink period. In some examples, each of a plurality of UEs within a same operator deployment, where the UEs are scheduled for transmissions to a base station or eNB over an unlicensed radio frequency spectrum band during a frame, may align or synchronize a pseudo-random number generator used by the UE when performing an ECCA with pseudo-random number generators used by each other UE in the plurality of UEs. The synchronization of pseudo-random number generators may cause each of the plurality of UEs to contend for access to the unlicensed radio frequency spectrum band at the same time. In some examples, the aligning may be performed based at least in part on a system time. The operation(s) at block 3505 may be performed using the wireless communication management module 2420, 2520, or 2760 described with reference to FIG. 24, 25, or 27, or the synchronization module 2560 described with reference to FIG. 25.

At block 3510, the method 3500 may include receiving, at the first UE, at least one grant associated with the unlicensed radio frequency spectrum band. In some examples, the unlicensed radio frequency spectrum band may be a radio frequency spectrum band for which apparatuses may need to contend for access because the radio frequency spectrum band is available, at least in part, for unlicensed use (e.g., Wi-Fi use or LTE/LTE-A use in an unlicensed radio frequency spectrum band). In some examples, the at least one grant may correspond to a frame having a plurality of subframes, in which a first portion of the plurality of subframes in the frame is semi-statically configured for downlink use and a remaining portion of the plurality of subframes in the frame is dynamically configured for uplink or downlink use based at least in part on the at least one grant. Neighboring base stations or eNBs that receive one or more of the grants to the UE may decode the one or more grants and refrain from accessing the unlicensed radio frequency spectrum band during a transmission of uplink subframes indicated by the one or more grants. In some examples, the at least one grant to the UE may include an uplink grant, a downlink grant, or both. The operation(s) at block 3405 may be performed using the wireless communication management module 2420, 2520, or 2760 described with reference to FIG. 24, 25, or 27, or the TDD configuration management module 2435 or 2535 described with reference to FIG. 24 or 25.

At block 3515, the method 3500 may include dynamically determining, based at least in part on the at least one grant, a timing of a number of uplink subframes in a frame for communication over the unlicensed radio frequency spectrum band. The operation(s) at block 3515 may be performed using the wireless communication management module 2420, 2520, or 2760 described with reference to FIG. 24, 25, or 27, or the uplink subframe timing determination module 2435 or 2535 described with reference to FIG. 24 or 25.

At block 3520, the method 3500 may include performing an ECCA on the unlicensed radio frequency spectrum band at a beginning of an uplink period including the number of uplink subframes. The operation(s) at block 3520 may be performed using the wireless communication management module 2420, 2520, or 2760 described with reference to FIG. 24, 25, or 27, or the CCA module 2440 or ECCA module 2550 described with reference to FIG. 24 or 25.

At block 3525, the method 3500 may include transmitting a preamble over the unlicensed radio frequency spectrum band when the ECCA is successful. The preamble may indicate a start of an uplink subframe according to the timing of the number of uplink subframes.

At block 3530, the method 3500 may include transmitting uplink data from the UE over the unlicensed radio frequency spectrum band in accordance with at least one of the number of uplink subframes when the ECCA is successful. In some examples, the preamble transmitted at block 3525 may be transmitted in an uplink subframe along with part or all of the uplink data.

In some examples, a UE may transmit at least one full or fractional signal (e.g., a full or fractional RS or CUBS), after successfully performing the ECCA at block 3520, and before transmitting the preamble or uplink data at block 3525 or 3530, to synchronize a transmission timing of the UE to a timing of a base station or eNB configured to operate on the unlicensed radio frequency spectrum band. In some examples, the at least one full or fractional signal may be transmitted to synchronize transmissions of the UE to a symbol boundary (e.g., an SC-FDM symbol boundary or an OFDM symbol boundary), a slot boundary, or a subframe boundary. The operation(s) at block 3525 or 3530 may be performed using the wireless communication management module 2420, 2520, or 2760 described with reference to FIG. 24, 25, or 27, or the uplink management module 2445 or 2555 described with reference to FIG. 24 or 25.

In some examples, the operations performed at block 3520, 3525, or 3530 may only be performed by a UE when a base station or eNB operating as a secondary serving cell for the UE has scheduled the UE to make a transmission to the base station or eNB over the unlicensed radio frequency spectrum band. In some examples, the UE may cause a base station or eNB to schedule the UE to make a transmission over the unlicensed radio frequency spectrum band by transmitting a BSR to a primary serving cell, thereby indicating to the primary serving cell how much data the UE has to transmit. The primary serving cell may be provided by the same base station or eNB that operates as a secondary serving cell for the UE, or by a different base station or eNB.

At block 3535, the method 3500 may include periodically synchronizing a timing of the first UE with a timing of an eNB configured to operate on the unlicensed radio frequency spectrum band. In some examples, the synchronization may occur at one or more of a symbol boundary (e.g., an SC-FDM symbol boundary or an OFDM symbol boundary), a slot boundary, or a subframe boundary. In FIG. 35, the synchronization is shown to occur after the operation(s) at block 3530. In other examples, the synchronization may occur at other times before, during, or after the operations of the method 3500. The operation(s) at block 3535 may be performed using the wireless communication management module 2420, 2520, or 2760 described with reference to FIG. 24, 25, or 27, or the synchronization module 2560 described with reference to FIG. 25.

When the at least one grant includes an uplink grant for a first uplink subframe, and when the ECCA performed at block 3320 is not successful until after a start of the first uplink subframe, the method 3300 may include 1) associating the uplink grant with a second uplink subframe or 2) allowing the uplink grant to expire. The second uplink subframe may immediately follow the first uplink subframe or may be separated from the first uplink subframe by one or more other subframes.

Thus, the method 3300 may provide for wireless communication. It should be noted that the method 3300 is just one implementation and that the operations of the method 3300 may be rearranged or otherwise modified such that other implementations are possible.

The method 3200, 3300, 3400, or 3500 described with reference to FIG. 32, 33, 34, or 35 may be useful for shorter frame durations (e.g., frame durations of 2 ms or 4 ms).

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communication at a UE, comprising:
receiving an indication of a time division duplexing (TDD) configuration comprising an uplink period including a number of uplink subframes;

receiving an uplink grant indicating a first uplink subframe of the number of uplink subframes for an uplink transmission;

performing, on a radio frequency spectrum band, a clear channel assessment (CCA) based at least in part on the uplink period; and transmitting over at least one of the number of uplink subframes when the CCA is successful based at least in part on the uplink grant, wherein the uplink transmission comprises a preamble indicating a start of an uplink subframe of the number of uplink subframes.

2. The method of claim 1, wherein the CCA succeeds prior to the first uplink subframe, and wherein the uplink transmission is transmitted during the first uplink subframe.

3. The method of claim 1, wherein the CCA is unsuccessful until after a start of the first uplink subframe, the method further comprising:

associating the uplink grant with a second uplink subframe, wherein the uplink transmission is transmitted during the second uplink subframe.

4. The method of claim 1, wherein the CCA is unsuccessful until after a start of the first uplink subframe, the method further comprising:

allowing the uplink grant to expire.

5. The method of claim 1, wherein the uplink transmission comprises uplink data that is transmitted following the preamble.

6. The method of claim 1, wherein the CCA is performed at a beginning of, or during, the uplink period.

7. The method of claim 1, wherein the uplink grant comprises the indication of the TDD configuration.

8. The method of claim 1, wherein the radio frequency spectrum band is a contention-based radio frequency spectrum band.

9. The method of claim 1, wherein the uplink grant indicates the first uplink subframe and at least a second uplink subframe of the number of uplink subframes.

10. The method of claim 1, wherein:
the TDD configuration comprises a semi-static TDD configuration selected from a plurality of semi-static TDD configurations; and
the indication of the TDD configuration comprises an index associated with the semi-static TDD configuration.

11. The method of claim 1, wherein the indication of the TDD configuration is received over the radio frequency spectrum band in a first downlink subframe of a frame.

12. The method of claim 1, further comprising:
transitioning from a first TDD configuration to a second TDD configuration during a frame, wherein the indication of the TDD configuration indicates both the first TDD configuration and the second TDD configuration for the frame.

13. The method of claim 1, further comprising:
periodically synchronizing a transmission timing of the UE with a timing of an evolved Node B (eNB) configured to operate on the radio frequency spectrum band.

14. The method of claim 1, wherein
the UE comprises a first UE, and
wherein the CCA comprises an extended CCA (ECCA), the method further comprising:
aligning a first pseudo-random number generator for the first UE with a second pseudo-random generator for a second UE such that the ECCA performed by the first UE is synchronized with an ECCA performed by the second UE at the beginning of the uplink period.

15. The method of claim 1, further comprising:
dynamically determining, based at least in part on the uplink grant, a timing of the number of uplink subframes in a frame for communication over the radio frequency spectrum band, wherein performing the CCA comprises performing a CCA on the radio frequency spectrum band at a beginning of the uplink period.

16. The method of claim 15, wherein a first portion of a plurality of subframes in the frame is semi-statically configured for downlink use and a remaining portion of the plurality of subframes in the frame is dynamically configured for uplink or downlink use based at least in part on the uplink grant.

17. The method of claim 15, wherein a successful CCA indicates that subframes following the CCA and prior to the first uplink subframe indicated by the uplink grant are downlink subframes.

18. A method for wireless communication at a base station, comprising:
performing a clear channel assessment (CCA) on a radio frequency spectrum band;
transmitting, for a period following the CCA, an indication of a time division duplexing (TDD) configuration comprising an uplink period including a number of uplink subframes;
transmitting an uplink grant indicating a first uplink subframe of the number of uplink subframes for an uplink transmission; and
receiving, from a UE, a preamble indicating a start of an uplink subframe of the number of uplink subframes.

19. The method of claim 18, wherein the preamble is received after a CCA performed by the UE is successful.

20. The method of claim 18, wherein the radio frequency spectrum band is a contention-based radio frequency spectrum band.

21. The method of claim 18, further comprising:
selecting the TDD configuration from a plurality of predetermined semi-static TDD configurations;
wherein transmitting the indication of the TDD configuration comprises transmitting an index associated with the selected TDD configuration.

22. The method of claim 18, wherein the indication of the TDD configuration is transmitted over the radio frequency spectrum band in a first downlink subframe of a frame associated with the CCA.

23. The method of claim 18, further comprising:
transitioning from a first TDD configuration to a second TDD configuration during a frame associated with the CCA;
wherein the indication of the TDD configuration indicates both the first TDD configuration and the second TDD configuration.

24. The method of claim 18, further comprising:
periodically synchronizing a transmission timing of at least one evolved Node B (eNB) configured to operate on the radio frequency spectrum band with a timing of at least one user equipment (UE) configured to operate on the radio frequency spectrum band.

25. The method of claim 24, wherein the synchronizing occurs at one or more of:
an orthogonal frequency division multiplexing (OFDM) symbol boundary, a slot boundary, or a subframe boundary.

26. The method of claim 18, wherein the TDD configuration comprises a downlink period, the method further comprising:

transmitting downlink data over the radio frequency spectrum band in accordance with the TDD configuration when the CCA is successful.

27. The method of claim 26, further comprising:
dynamically determining, based at least in part on the uplink grant to the UE, and for the period following the CCA, a timing of a number of downlink subframes for communication over the radio frequency spectrum band; the method further comprising
transmitting downlink data over the radio frequency spectrum band in accordance with the timing of the number of downlink subframes when the CCA is successful.

28. The method of claim 27, wherein a first portion of a plurality of subframes in the period following the CCA is semi-statically configured for downlink use and a remaining portion of the plurality of subframes in the period following the CCA is dynamically configured for uplink or downlink use based at least in part on the uplink grant.

29. The method of claim 18, wherein a successful CCA indicates that subframes following the CCA and prior to the first uplink subframe indicated by the uplink grant are downlink subframes.

30. A method for wireless communication at a first base station, comprising:
receiving, from a second base station, an indication of a time division duplexing (TDD) configuration for a period following a clear channel assessment (CCA), wherein the TDD configuration comprises an uplink period including a number of uplink subframes;
receiving an uplink grant indicating a first uplink subframe of the number of uplink subframes for an uplink transmission;
receiving, from a UE, a preamble indicating a start of an uplink subframe of the number of uplink subframes; and
refraining from accessing a radio frequency spectrum band during a transmission of the number of uplink subframes.

31. The method of claim 30, wherein the preamble is received after a CCA performed by the UE is successful.

32. The method of claim 30, wherein the radio frequency spectrum band is a contention-based radio frequency spectrum band.

33. The method of claim 30, further comprising:
decoding the uplink grant; and
dynamically determining, based at least in part on the uplink grant, a timing of the number of uplink subframes in a frame for communication over the radio frequency spectrum band.

34. The method of claim 30, wherein refraining from accessing comprises:
refraining from performing a CCA based at least in part on the TDD configuration.

35. An apparatus for wireless communication, comprising:
a processor; and
memory coupled to the processor, wherein the processor is configured to:
receive an indication of a time division duplexing (TDD) configuration comprising an uplink period including a number of uplink subframes;
receive an uplink grant indicating a first uplink subframe of the number of uplink subframes for an uplink transmission;
perform, on a radio frequency spectrum band, a clear channel assessment (CCA) based at least in part on the uplink period; and
transmit over at least one of the number of uplink subframes when the CCA is successful based at least in part on the uplink grant, wherein the uplink transmission comprises a preamble indicating a start of an uplink subframe of the number of uplink subframes.

36. The apparatus of claim 35, wherein:
the TDD configuration comprises a semi-static TDD configuration selected from a plurality of semi-static TDD configurations; and
the indication of the TDD configuration comprises an index associated with the semi-static TDD configuration.

37. The apparatus of claim 35, wherein the processor is configured to:
transition from a first TDD configuration to a second TDD configuration during a frame, wherein the indication of the TDD configuration indicates both the first TDD configuration and the second TDD configuration for the frame.

38. The apparatus of claim 35, wherein the CCA succeeds prior to the first uplink subframe, and wherein the uplink transmission is transmitted during the first uplink subframe.

39. The apparatus of claim 35, wherein the CCA is unsuccessful until after a start of the first uplink subframe, wherein the processor is configured to:
associate the uplink grant with a second uplink subframe, wherein the uplink transmission is transmitted during the second uplink subframe.

40. The apparatus of claim 35, wherein the CCA is unsuccessful until after a start of the first uplink subframe, wherein the processor is configured to:
allow the uplink grant to expire.

41. The apparatus of claim 35, wherein the uplink transmission comprises uplink data that is transmitted following the preamble.

42. The apparatus of claim 35, wherein the CCA is performed at a beginning of, or during, the uplink period.

43. The apparatus of claim 35, wherein the uplink grant comprises the indication of the TDD configuration.

44. The apparatus of claim 35, wherein the radio frequency spectrum band is a contention-based radio frequency spectrum band.

* * * * *